United States Patent
Hoshino et al.

(10) Patent No.: US 12,152,188 B2
(45) Date of Patent: *Nov. 26, 2024

(54) POLARIZER AND IMAGE DISPLAY DEVICE

(71) Applicant: FUJIFILM Corporation, Tokyo (JP)

(72) Inventors: Wataru Hoshino, Kanagawa (JP); Hiroshi Matsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 17/494,307

(22) Filed: Oct. 5, 2021

(65) Prior Publication Data

US 2022/0025266 A1 Jan. 27, 2022

Related U.S. Application Data

(63) Continuation of application No. PCT/JP2020/013785, filed on Mar. 26, 2020.

(30) Foreign Application Priority Data

Apr. 12, 2019 (JP) ................. 2019-076567

(51) Int. Cl.
*G02F 1/1333* (2006.01)
*C09K 19/38* (2006.01)
*C09K 19/60* (2006.01)
*G02B 5/30* (2006.01)
*G02F 1/1335* (2006.01)

(52) U.S. Cl.
CPC ........ *C09K 19/3852* (2013.01); *C09K 19/601* (2013.01); *G02B 5/3016* (2013.01); *G02F 1/133528* (2013.01)

(58) Field of Classification Search
CPC ............ C09K 19/3804; C09K 19/3852; C09K 19/601; C09K 2019/0448; C09K 2019/0444; G02B 5/3016; G02F 1/133528
See application file for complete search history.

(56) References Cited

U.S. PATENT DOCUMENTS

| | | | | |
|---|---|---|---|---|
| 5,989,461 A | * | 11/1999 | Coates ................. | G02B 5/3075 252/585 |
| 11,339,329 B2 | * | 5/2022 | Hoshino .............. | C09K 19/601 |
| 11,467,442 B2 | * | 10/2022 | Matsuyama ............. | G09F 9/30 |
| 11,789,302 B2 | * | 10/2023 | Hoshino ................ | C09K 19/60 349/183 |
| 2018/0346633 A1 | | 12/2018 | Hoshino et al. | |
| 2019/0101676 A1 | | 4/2019 | Katou et al. | |
| 2019/0218460 A1 | | 7/2019 | Suzuki et al. | |
| 2019/0322937 A1 | | 10/2019 | Matsuyama et al. | |
| 2020/0033663 A1 | | 1/2020 | Hoshino et al. | |
| 2020/0172810 A1 | | 6/2020 | Matsuyama et al. | |
| 2021/0003884 A1 | * | 1/2021 | Hoshino ................ | G02B 5/305 |
| 2021/0149247 A1 | * | 5/2021 | Saito ..................... | H01L 51/50 |
| 2022/0025266 A1 | * | 1/2022 | Hoshino .............. | C09K 19/601 |
| 2022/0204856 A1 | * | 6/2022 | Kato .................. | C09K 19/3491 |
| 2022/0213385 A1 | * | 7/2022 | Hoshino ................ | C09D 4/00 |
| 2022/0389319 A1 | * | 12/2022 | Shiga .................. | G02B 5/3016 |
| 2023/0028750 A1 | * | 1/2023 | Matsuyama ......... | G02B 5/3016 |

FOREIGN PATENT DOCUMENTS

| | | | |
|---|---|---|---|
| WO | 2017/154907 A1 | 9/2017 | |
| WO | 2017/170036 A1 | 10/2017 | |
| WO | 2018/062068 A1 | 4/2018 | |
| WO | 2018/124198 A1 | 7/2018 | |
| WO | WO-2018199096 A1 * | 11/2018 | ............ C09K 19/60 |
| WO | 2019/035468 A1 | 2/2019 | |
| WO | WO-2020179864 A1 * | 9/2020 | ............... G02B 5/30 |

OTHER PUBLICATIONS

International Search Report issued in PCT/JP2020/013785 on Jun. 30, 2020.
Written Opinion issued in PCT/JP2020/013785 on Jun. 30, 2020.
International Preliminary Report on Patentability completed by WIPO on Sep. 28, 2021 in connection with International Patent Application No. PCT/JP2020/013785.
Office Action, issued by the China National Intellectual Property Administration on Mar. 1, 2023, in Connection with Chinese Patent Application No. 202080028154.5.
Office Action, issued by the China National Intellectual Property Administration on Jan. 19, 2024, in Connection with Chinese Patent Application No. 202080028154.5.

* cited by examiner

*Primary Examiner* — Geraldina Visconti
(74) *Attorney, Agent, or Firm* — Edwards Neils LLC; Jean C. Edwards, Esq.

(57) ABSTRACT

Provided is a polarizer-forming composition from which a polarizer with a high degree of alignment and excellent heat resistance can be formed, a polarizer, and an image display device. The polarizer-forming composition includes a liquid crystal compound, and a dichroic material, in which the liquid crystal compound is a polymer liquid crystal compound, and a content of a component having a number average molecular weight of 1000 or less which is contained in the polymer liquid crystal compound is in a range of 0.10% to 5.0% by mass.

6 Claims, No Drawings

POLARIZER AND IMAGE DISPLAY DEVICE

CROSS-REFERENCE TO RELATED APPLICATIONS

This application is a Continuation of PCT International Application No. PCT/JP2020/013785 filed on Mar. 26, 2020, which was published under PCT Article 21(2) in Japanese, and which claims priority under 35 U.S.C. § 119(a) to Japanese Patent Application No. 2019-076567 filed on Apr. 12, 2019. The above applications are hereby expressly incorporated by reference, in their entirety, into the present application.

BACKGROUND OF THE INVENTION

1. Field of the Invention

The present invention relates to a polarizer and an image display device.

2. Description of the Related Art

In the related art, in a case where an attenuation function, a polarization function, a scattering function, a light-shielding function of irradiation light including laser light or natural light is required, a device that is operated according to principles different for each function is used. Therefore, products corresponding to the above-described functions are also produced by production processes different for each function.

For example, a linear polarizer or a circular polarizer is used in an image display device (for example, a liquid crystal display device) to control optical rotation or birefringence in display. Further, a circular polarizer is used in an organic light emitting diode (OLED) to prevent reflection of external light.

In the related art, iodine has been widely used as a dichroic material in these polarizers, but a polarizer that uses an organic dye in place of iodine as a dichroic material has also been examined.

For example, WO2017/154907A discloses a polarizer-forming composition which contains a polymer liquid crystal compound and a dichroic material.

SUMMARY OF THE INVENTION

As a result of preparation of a polarizer with reference to the examples of WO2017/154907A and evaluation of the degree of alignment thereof which have been conducted by the present inventors under the above-described circumstance, it was clarified that there is room for improvement of the degree of alignment and heat resistance in consideration of improvement of the performance of an image display device or the like expected in the future.

Therefore, an object of the present invention is to provide a polarizer-forming composition from which a polarizer with a high degree of alignment and excellent heat resistance can be formed, a polarizer, and an image display device.

As a result of intensive examination on the above-described problems, the present inventors found that in a case where a polarizer-forming composition obtained by adjusting the content of a component having a number average molecular weight of 1000 or less, which is contained in a polymer liquid crystal compound, to be in a range of 0.10% to 5.0% by mass is used, the degree of alignment of a polarizer to be formed increases and the heat resistance is enhanced, thereby completing the present invention.

That is, the present inventors found that the above-described problems can be solved by employing the following configurations.

[1] A polarizer-forming composition comprising: a liquid crystal compound; and a dichroic material, in which the liquid crystal compound is a polymer liquid crystal compound, and a content of a component having a number average molecular weight of 1000 or less which is contained in the polymer liquid crystal compound is in a range of 0.10% to 5.0% by mass.

[2] The polarizer-forming composition according to [1], in which the content of the component having a number average molecular weight of 1000 or less which is contained in the polymer liquid crystal compound is in a range of 0.15% to 1.5% by mass.

[3] A polarizer which is formed of the polarizer-forming composition according to [1] or [2].

[4] An image display device comprising the polarizer according to [3].

As shown below, according to the present invention, it is possible to provide a polarizer-forming composition from which a polarizer with a high degree of alignment and excellent heat resistance can be formed, a polarizer, and an image display device.

DESCRIPTION OF THE PREFERRED EMBODIMENTS

Hereinafter, the present invention will be described in detail.

The description of constituent elements described below may be made based on typical embodiments of the present invention, but the present invention is not limited to such embodiments.

In addition, in the present specification, a numerical range shown using "to" indicates a range including numerical values described before and after "to" as a lower limit and an upper limit.

Further, in the present specification, parallel, orthogonal, horizontal, and vertical do not indicate parallel, orthogonal, horizontal, and vertical in a strict sense, but respectively indicate a range of parallel ±5°, a range of orthogonal ±5°, a range of horizontal ±5°, and a range of vertical ±5°.

Further, in the present specification, materials corresponding to respective components may be used alone or in combination of two or more kinds thereof. Here, in a case where two or more kinds of materials corresponding to respective components are used in combination, the content of the components indicates the total content of the combined materials unless otherwise specified.

Further, in the present specification, "(meth)acrylate" is a notation representing "acrylate" or "methacrylate", "(meth) acryl" is a notation representing "acryl" or "methacryl", and "(meth)acryloyl" is a notation representing "acryloyl" or "methacryloyl".

[Polarizer-Forming Composition]

A polarizer-forming composition of the present invention is a polarizer-forming composition containing a liquid crystal compound and a dichroic material.

Further, the liquid crystal compound contained in the polarizer-forming composition of the present invention is a polymer liquid crystal compound.

Further, the content of the component having a number average molecular weight of 1000 or less which is contained in the polymer liquid crystal compound is in a range of 0.10% to 5.0% by mass.

In the present invention, as described above, in a case where a polarizer-forming composition obtained by adjusting the content of the component having a number average molecular weight of 1000 or less which is contained in the polymer liquid crystal compound to be in a range of 0.10% to 5.0% by mass is used, the degree of alignment of the polarizer increases, and the heat resistance is also enhanced.

Although the details of the reason are not yet clear, the present inventors assume that the reason is as follows.

First, the present inventors found that the degree of alignment of the polarizer decreases in a case where the compatibility between the polymer liquid crystal compound and the dichroic material is extremely high, and the heat resistance of the polarizer is deteriorated in a case where the compatibility is extremely low. That is, the present inventors newly know that the degree of alignment and the heat resistance of the polarizer are greatly affected by the compatibility between the polymer liquid crystal compound and the dichroic material.

Therefore, in the present invention, it is assumed that in a case where the content of the component having a number average molecular weight of 1000 or less which is contained in the polymer liquid crystal compound is in a range of 0.10% to 5.0% by mass, the compatibility between the polymer liquid crystal compound and the dichroic material is appropriately adjusted, and thus the degree of alignment of the polarizer to be formed increases and the heat resistance thereof is enhanced.

Hereinafter, each component contained in the polarizer-forming composition of the present invention will be described.

[Liquid Crystal Compound]

The liquid crystal compound contained in the polarizer-forming composition of the present invention is a polymer liquid crystal compound.

Here, the "polymer liquid crystal compound" indicates a liquid crystal compound having a repeating unit in the chemical structure.

Further, as the liquid crystal compound, the polymer liquid crystal compound may be used alone or in combination of two or more kinds thereof.

Further, from the viewpoint of further increasing the degree of alignment of the polarizer to be formed, the content of the liquid crystal compound is preferably in a range of 10 to 99 parts by mass, more preferably in a range of 15 to 98 parts by mass, and still more preferably in a range of 20 to 96 parts by mass with respect to 100 parts by mass which is the content of the dichroic material of the polarizer-forming composition of the present invention.

In the present invention, the content of the component having a number average molecular weight of 1000 or less which is contained in the polymer liquid crystal compound is in a range of 0.10% to 5.0% by mass.

Here, the number average molecular weight (Mn) and the weight-average molecular weight (Mw) described below are values measured under the following conditions using a gel permeation chromatography (GPC) method, and the content of the component having a number average molecular weight of 1000 or less is a value obtained by calculating an integrated value of a number average molecular weight of 1000 or less from the molecular weight distribution curve of the number average molecular weight belonging to the polymer liquid crystal compound.

Solvent (eluent): tetrahydrofuran
Equipment name: TOSOH HLC-8220GPC
Column: Connect and use TOSOH TSKgel Super HZM-H, HZ4000, and HZ2000
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

Further, from the viewpoint of further increasing the degree of alignment of the polarizer to be formed and further improving the heat resistance thereof, the content of the component having a number average molecular weight of 1000 or less which is contained in the polymer liquid crystal compound is preferably in a range of 0.15% to 1.5% by mass.

In the present invention, from the viewpoint of easily handling the polymer liquid crystal compound, further increasing the degree of alignment of the polarizer to be formed, and further improving the heat resistance thereof, the weight-average molecular weight (Mw) of the polymer liquid crystal compound is preferably in a range of 1000 to 500000 and more preferably in a range of 2000 to 300000.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and more preferably 2000 or greater and less than 10000.

<Substituent W>

A substituent W used in the description of the polymer liquid crystal compound represents the following group.

Specific examples of the substituent W include a halogen atom, an alkyl group having 1 to 20 carbon atoms, a halogenated alkyl group having 1 to 20 carbon atoms, a cycloalkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (such as an anilino group, the same applies hereinafter), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—$B(OH)_2$), a phosphate group (—$OPO(OH)_2$), a sulfate group (—$OSO_3H$), and other known substituents.

Further, the details of the substituent are described in paragraph [0023] of JP2007-234651A.

Further, the substituent W may be a group represented by Formula (W1).

*-LW-SPW-Q  (W1)

In Formula (W1), LW represents a single bond or a divalent linking group, SPW represents a divalent spacer group, Q represents the same group as the group represented by Q1 or Q2 in Formula (LC), and * represents a bonding position.

Examples of the divalent linking group represented by one embodiment of LW include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (here, g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=(Z')—C(O)N(Z")—, —N(Z")—C(O)—C(Z)=C(Z')—, —C(Z)—C(Z')—C(O)—S—, —S—C(O)—C(Z)=C(Z')—, —C(Z)=N—N=C(Z')— (here, Z, Z', and Z" each independently represent a hydrogen atom, an alkyl group having 1 to 4 carbon atoms, a cycloalkyl group, an aryl group, a cyano group, or a halogen atom), —C=C—, —N=N—, —S—, —S(O)—, —S(O)(O)—, —(O)S(O)O—, —O(O)S(O)O—, —SC(O)—, and —C(O)S—. LW may represent a group obtained by combining two or more of these groups.

Examples of the spacer group represented by SPW include a single bond, a linear, branched, or cyclic alkylene group having 1 to 50 carbon atoms, and a heterocyclic group having 1 to 20 carbon atoms.

Here, the carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (here, g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)—C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z" each independently represent a hydrogen atom, an alkyl group having 1 to 4 carbon atoms, a cycloalkyl group, an aryl group, a cyano group, or a halogen atom), —C=C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups (hereinafter, the group substituting a carbon atom will be referred to as "SP-C").

Further, the hydrogen atoms of the alkylene group and the heterocyclic group may be substituted with a halogen atom, a cyano group, —Z$^H$, —O—, —OZ$^H$, —COOH, —C(O)Z$^H$, —C(O)OZ$^H$, —OC(O)Z$^H$, —OC(O)OZ$^H$, —NZ$^H$Z$^{H'}$, —NZ$^H$C(O)Z$^{H'}$, —NZ$^H$C(O)OZ$^{H'}$, —C(O)NZ$^H$Z$^{H'}$, —OC(O)NZ$^H$Z$^{H'}$, —NZ$^H$C(O)NZ$^{H'}$OZ$^{H''}$, —SH, —SZ$^H$, —C(S)Z$^H$, —C(O)SZ$^H$, or —SC(O)Z$^H$ (hereinafter, the group substituting a hydrogen atom is also abbreviated as "SP-H"). Here, Z$^H$ and Z$^{H'}$ each independently represent an alkyl group having 1 to 10 carbon atoms, a halogenated alkyl group, or -L-CL. Further, L represents a single bond or a linking group, and specific examples of the linking group are the same as those for LW and SPW described above. Further, CL represents a crosslinkable group, and examples thereof include a group represented by Q1 or Q2 in Formula (LC) described below. Among the examples, a group represented by any of Formulae (P-1) to (P-30) is preferable.

<Polymer Liquid Crystal Compound>

A polymer of a liquid crystal compound represented by Formula (LC) is preferable as the polymer liquid crystal compound.

Q1-S1-MG-S2-Q2  (LC)

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group, an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), or a crosslinkable group represented by any of Formulae (P-1) to (P-30), and it is preferable that at least one of Q1 or Q2 represents a crosslinkable group represented by any of Formulae (P-1) to (P-30).

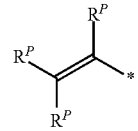

(P-1)

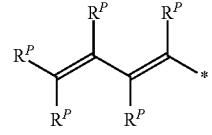

(P-2)

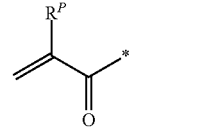

(P-3)

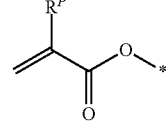

(P-4)

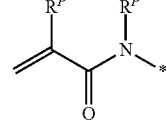

(P-5)

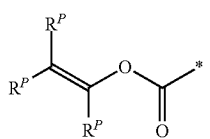 (P-6)
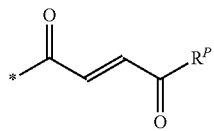 (P-7)
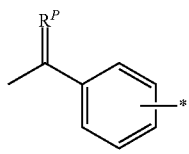 (P-8)
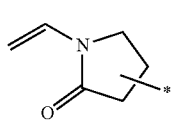 (P-9)
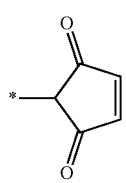 (P-10)
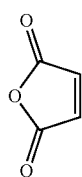 (P-11)
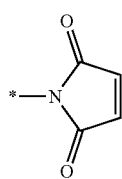 (P-12)
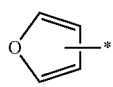 (P-13)
 (P-14)
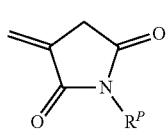 (P-15)
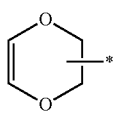 (P-16)
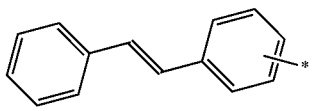 (P-17)
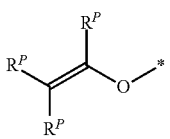 (P-18)
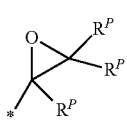 (P-19)
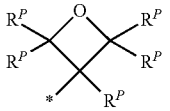 (P-20)
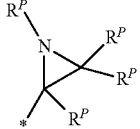 (P-21)
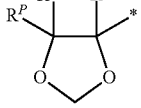 (P-22)
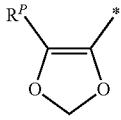 (P-23)
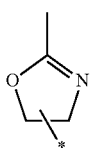 (P-24)
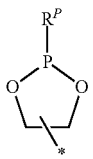 (P-25)
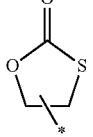 (P-26)
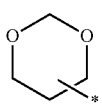 (P-27)

-continued

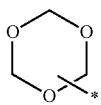
(P-28)

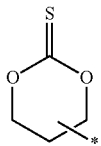
(P-29)

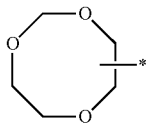
(P-30)

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group, an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and a plurality of $R^P$'s may be the same as or different from each other.

A radically polymerizable group or a cationically polymerizable group is preferable as the crosslinkable group.

As the radically polymerizable group, a vinyl group represented by Formula (P-1), a butadiene group represented by Formula (P-2), a (meth)acryl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable.

As the cationically polymerizable group, a vinyl ether group represented by Formula (P-18), an epoxy group represented by Formula (P-19), or an oxetanyl group represented by Formula (P-20) is preferable.

In Formula (LC), S1 and S2 represent a divalent spacer group, and preferred embodiments of S1 and S2 include the same structures as those for SPW in Formula (W1), and thus the description thereof will not be repeated.

In Formula (LC), MG represents a mesogen group.

The mesogen group represented by MG is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and can refer to, for example, particularly description on pages 7 to 16 of "FlussigeKristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee.

The mesogen group represented by MG has preferably 2 to 10 cyclic structures and more preferably 3 to 7 cyclic structures.

Specific examples of the cyclic structure include an aromatic hydrocarbon group, a heterocyclic group, and an alicyclic group.

From the viewpoints of exhibiting the liquid crystallinity, adjusting the liquid crystal phase transition temperature, and the availability of raw materials and synthetic suitability, as the mesogen group represented by MG, a group represented by Formula (MG-A) or Formula (MG-B) is preferable, and a group represented by Formula (MG-B) is more preferable.

$$*\!-\!(\mathrm{A1})_{\overline{a1}}\!-\!* \qquad \text{(MG-A)}$$

$$*\!-\!(\mathrm{A2}\!-\!\mathrm{LA1})_{\overline{a2}}\mathrm{A3}\!-\!* \qquad \text{(MG-B)}$$

In Formula (MG-A), A1 represents a divalent group selected from the group consisting of an aromatic hydrocarbon group, a heterocyclic group, and an alicyclic group. These groups may be substituted with a substituent such as the substituent W described above.

It is preferable that the divalent group represented by A1 is a 4- to 15-membered ring. Further, the divalent group represented by A1 may be a monocycle or a fused ring.

Further, * represents a bonding position with respect to S1 or S2.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

The divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group, and the carbon atoms thereof may be substituted with —O—, —Si(CH$_3$)$_2$—, —N(Z)—, —C(O)— (here, Z represents a hydrogen atom, an alkyl group having 1 to 4 carbon atoms, a cycloalkyl group, an aryl group, a cyano group, or a halogen atom), —S—, —C(S)—, —S(O)—, —SO$_2$—, or a group obtained by combining two or more of these groups.

In Formula (MG-A), a1 represents an integer of 2 to 10. The plurality of A1's may be the same as or different from each other.

In Formula (MG-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (MG-A), and thus description thereof will not be repeated.

In Formula (MG-B), a2 represents an integer of 1 to 10, and in a case where a2 represents an integer of 2 to 10, a plurality of A2's may be the same as or different from each other, and a plurality of LA1's may be the same as or different from each other. It is more preferable that a2 represents 2 or greater.

In Formula (MG-B), LA1 represents a single bond or a divalent linking group.

Examples of the divalent linking group represented by one embodiment of LA1 are the same as those for LW described above, and thus the description thereof will not be repeated.

Specific examples of MG include the following structures. In the following structures, the hydrogen atoms on the aromatic hydrocarbon group, the heterocyclic group, and the alicyclic group may be substituted with the substituent W described above.

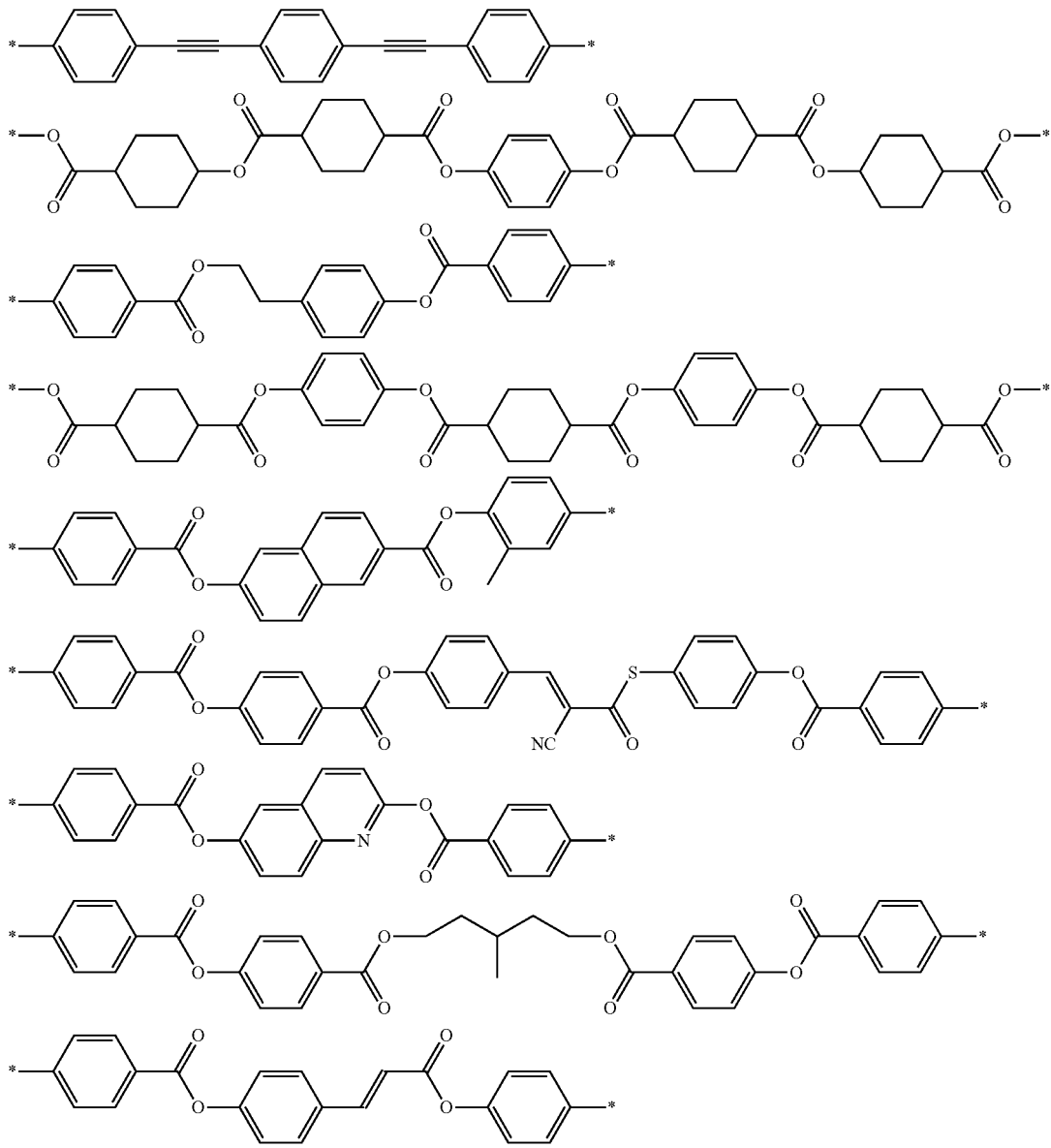

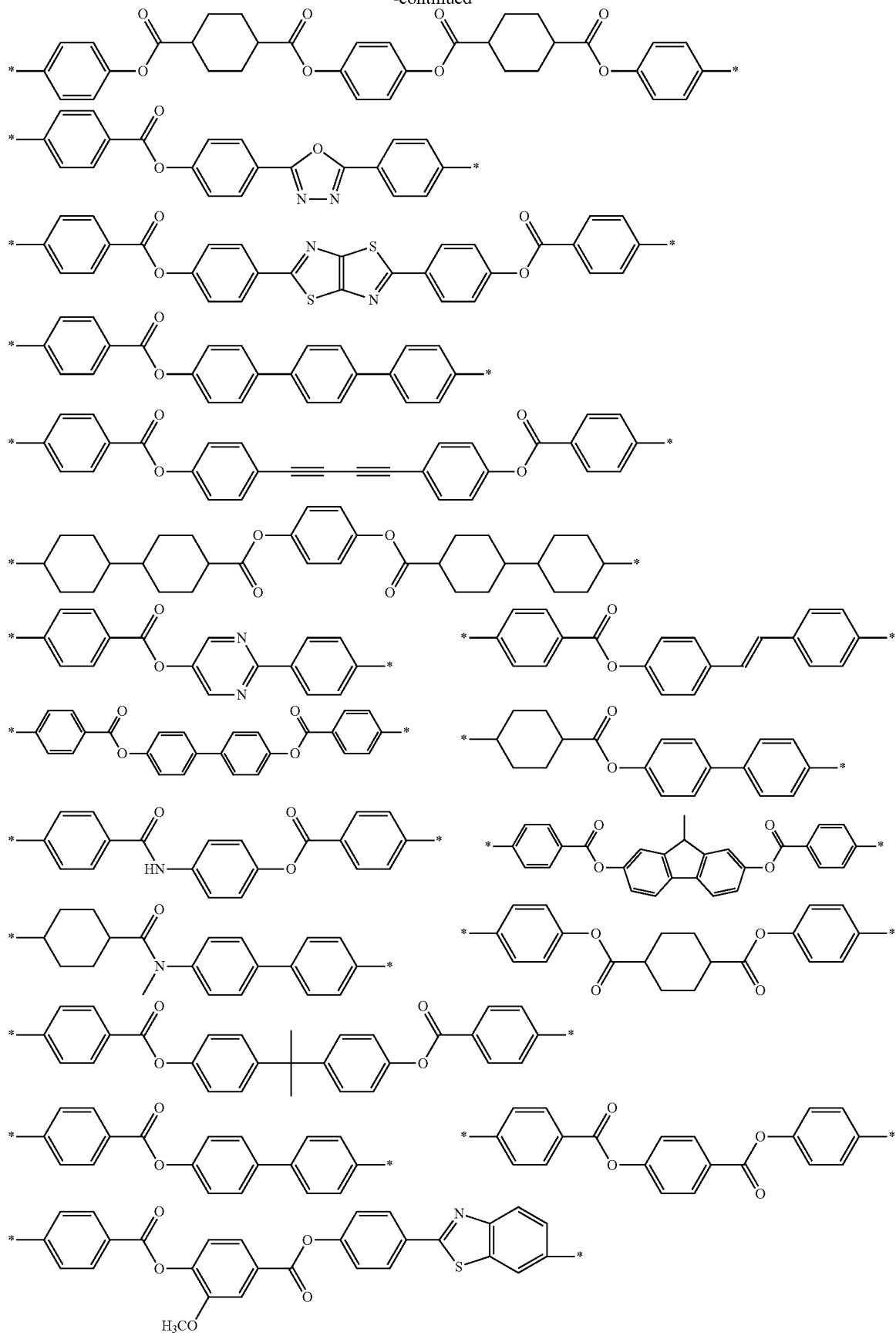

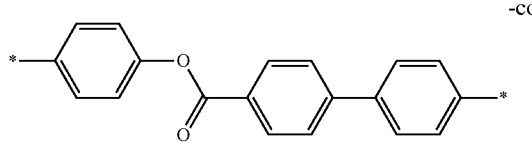
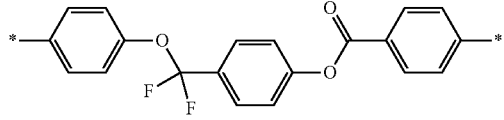
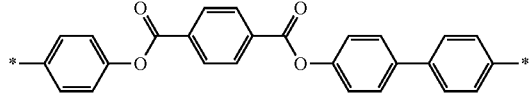
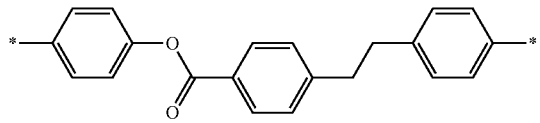
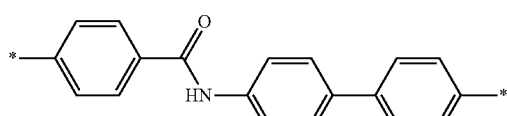
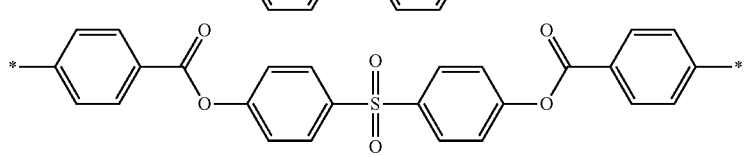
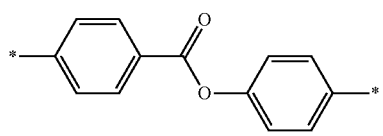
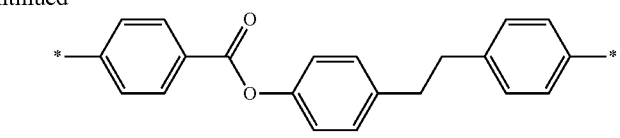
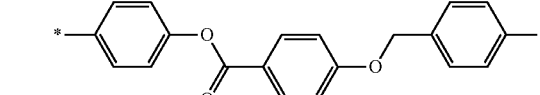
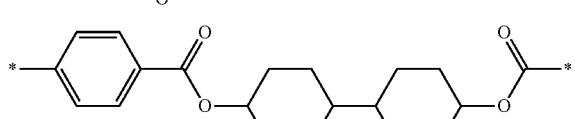
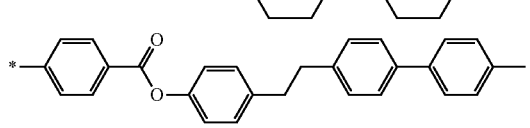
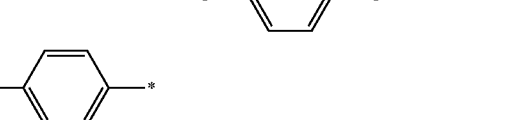
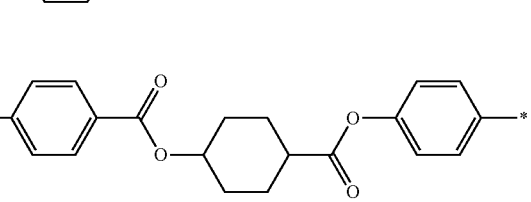
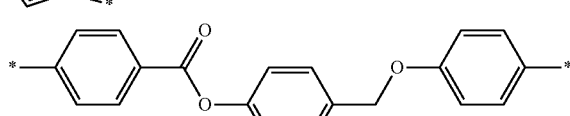
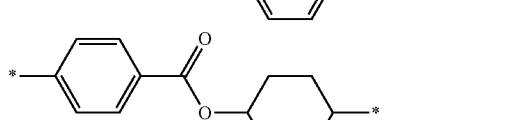
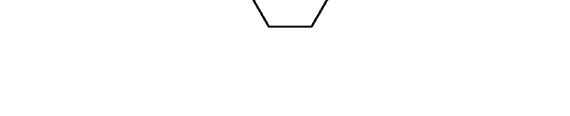
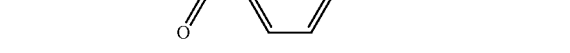
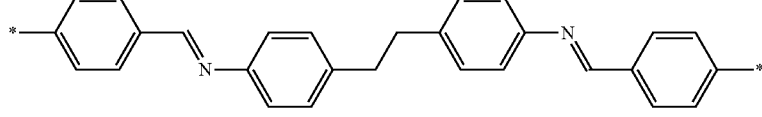
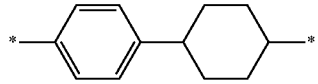
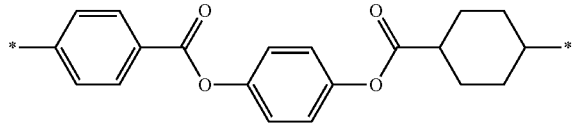

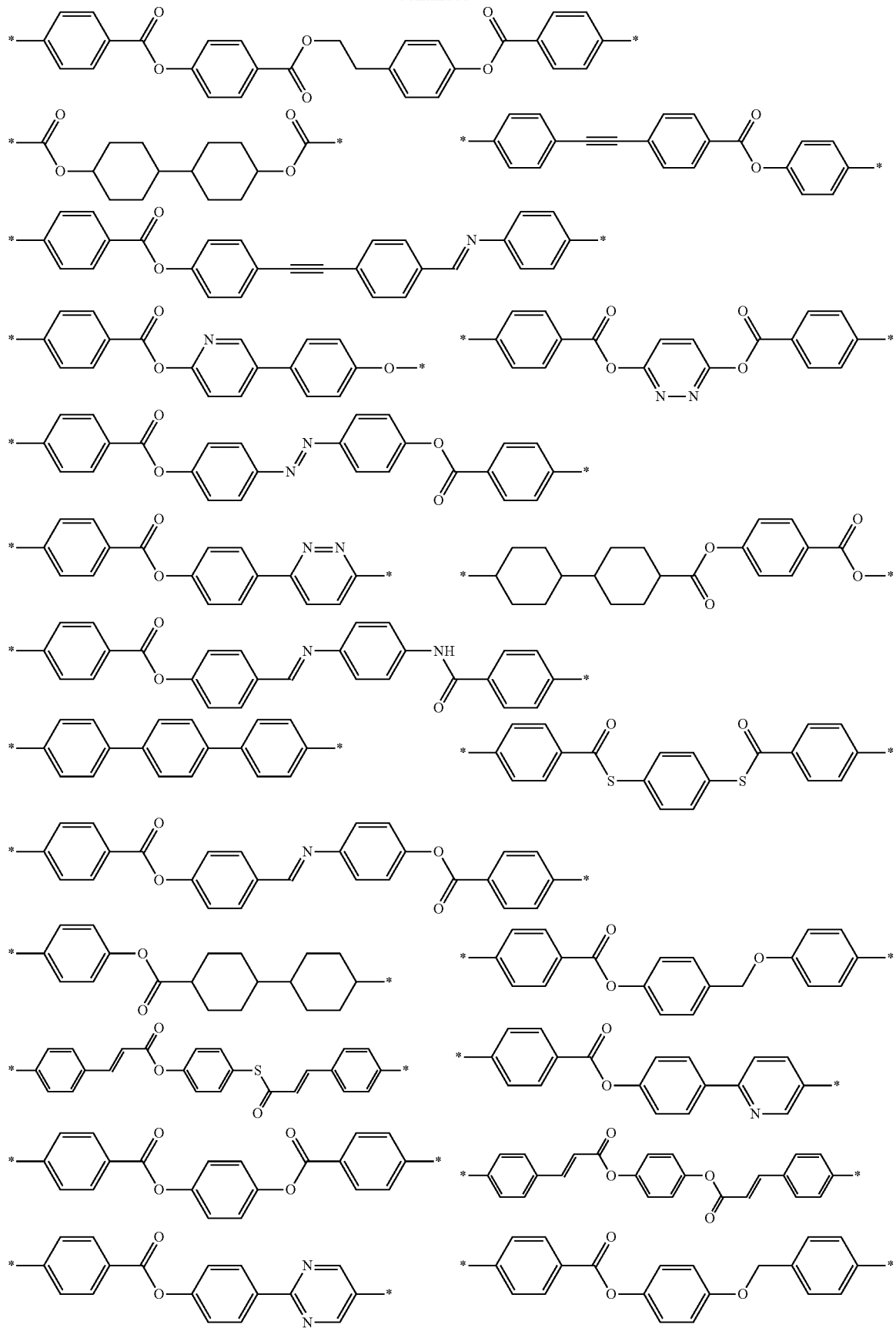

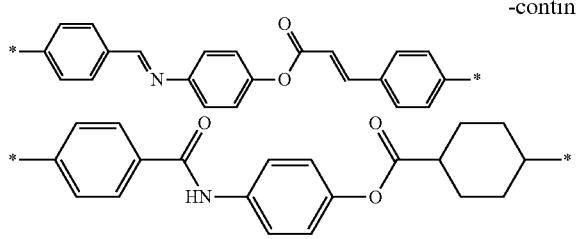
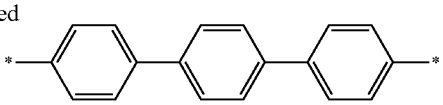

In the present invention, from the viewpoint of further improving the degree of polarization, the polymer liquid crystal compound is preferably a side chain type polymer liquid crystal compound and more preferably a polymer having a repeating unit represented by Formula (1) (hereinafter, also referred to as a "repeating unit (1)").

In Formula (1), PC1 represents a main chain of the repeating unit. L1 represents a single bond or a divalent linking group, SP1 represents a spacer group, MG1 represents a mesogen group, and T1 represents a terminal group.

Specific examples of the main chain of the repeating unit represented by PC1 include groups represented by Formulae (P1-A) to (P1-D). Among these, from the viewpoints of diversity and handleability of a monomer serving as a raw material, a group represented by Formula (P1-A) is preferable.

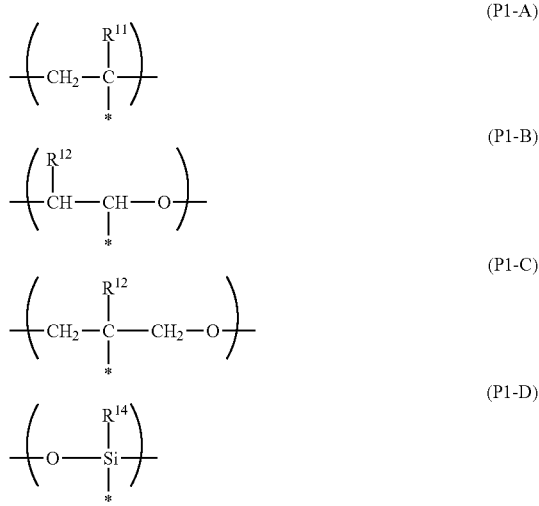

In Formulae (P1-A) to (P1-D), "*" represents a bonding position with respect to L1 in Formula (1).

In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to S.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound having the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$—. In the formula, $R^{14}$ has the same definition as that for $R^{14}$ in (P1-D), and a plurality of $R^{15}$'s each independently represent a hydrogen atom or an alkyl group having 1 to 10 carbon atoms.

Examples of L1 include the same linking groups as those for LW described above, and preferred embodiments thereof include —C(O)O—, —OC(O)—, —O—, —S—, —C(O)NR$^{16}$—, —NR$^{16}$C(O)—, —S(O)$_2$—, and —NR$^{16}$R$^{17}$—. In the formulae, $R^{16}$ and $R^{17}$ each independently represent a hydrogen atom or an alkyl group having 1 to 6 carbon atoms which may have a substituent (for example, the substituent W described above). In the specific examples of the divalent linking group described above, the bonding site on the left side is bonded to PC1 and the bonding site on the right side is bonded to SP1.

In a case where PC1 represents a group represented by Formula (P1-A), it is preferable that L1 represents a group represented by —C(O)O— or —C(O)NR$^{16}$—.

In a case where PC1 represents a group represented by any of Formulae (P1-B) to (P1-D), it is preferable that L1 represents a single bond.

Examples of the spacer group represented by SP1 are the same groups as those for S1 and S2 described above, and from the viewpoint of the degree of alignment, a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Further, the alkylene group described above may contain —O—, —S—, —O—CO—, —CO—O—, —O—CO—O—, —O—CNR—, or —S(O)$_2$—. Here, R represents an alkyl group having 1 to 10 carbon atoms.

From the viewpoints of easily exhibiting liquid crystallinity and the availability of raw materials, it is more preferable that the spacer group represented by SP1 is a group having at least one structure selected from the group consisting of an oxyethylene structure, an oxypropylene structure, a polysiloxane structure, and an alkylene fluoride structure.

Here, as the oxyethylene structure represented by SP1, a group represented by *—$(CH_2—CH_2O)_{n1}$—* is preferable. In the formula, n1 represents an integer of 1 to 20, and * represents a bonding position with respect to L1 or MG1. n1 represents preferably an integer of 2 to 10, more preferably an integer of 2 to 4, and most preferably 3.

Here, a group represented by *—$(CH(CH_3)—CH_2O)_{n2}$—* is preferable as the oxypropylene structure represented by SP1. In the formula, n2 represents an integer of 1 to 3, and * represents a bonding position with respect to L1 or MG1.

Further, a group represented by *—$(Si(CH_3)_2—O)_{n3}$—* is preferable as the polysiloxane structure represented by SP1. In the formula, n3 represents an integer of 6 to 10, and * represents a bonding position with respect to L1 or MG1.

Further, a group represented by *—$(CF_2—CF_2)_{n4}$—* is preferable as the alkylene fluoride structure represented by SP1. In the formula, n4 represents an integer of 6 to 10, and * represents a bonding position with respect to L1 or MG1.

Examples of the terminal group represented by T1 include a hydrogen atom, a halogen atom, a cyano group, a nitro group, a hydroxy group, —SH, a carboxyl group, a boronic acid group, —$SO_3H$—, —$PO_3H_2$—, —$NR^{11}R^{12}$— (here, $R^{11}$ and $R^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the crosslinkable group-containing group include -L-CL. Further, L represents a single bond or a linking group, and specific examples of the linking group are the same as those for LW and SPW described above. Further, CL represents a crosslinkable group, and examples thereof include a group represented by Q1 or Q2 in Formula (LC), and a group represented by any of Formulae (P-1) to (P-30) is preferable.

Further, T1 may represent a group obtained by combining two or more of these groups.

T1 represents preferably an alkoxy group having 1 to 10 carbon atoms, more preferably an alkoxy group having 1 to 5 carbon atoms, and still more preferably a methoxy group. These terminal groups may be further substituted with these groups or the polymerizable groups described in JP2010-244038A.

The number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the polarizer is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

(log P value)

In Formula (1), a difference ($|\log P_1 - \log P_2|$) between the log P value of PC1, L1, and SP1 (hereinafter, also referred to as "log $P_1$") and the log P value of MG1 (hereinafter, also referred to as "log $P_2$") is preferably 4 or greater. Further, from the viewpoint of further improving the degree of alignment of the polarizer, the difference thereof is more preferably 4.25 or greater and still more preferably 4.5 or greater.

Further, from the viewpoints of adjusting the liquid crystal phase transition temperature and the synthetic suitability, the upper limit of the difference is preferably 15 or less, more preferably 12 or less, and still more preferably 10 or less.

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

The log $P_1$ indicates the log P value of PC1, L1, and SP1 as described above. The "log P value of PC1, L1, and SP1" indicates the log P value of a structure in which PC1, L1, and SP1 are integrated and is not the sum of the log P values of PC1, L1, and SP1. Specifically, the log $P_1$ is calculated by inputting a series of structural formulae of P1 to SP1 in Formula (1) into the above-described software.

In the calculation of the log $P_1$, in regard to the part of the group represented by PC1 in the series of structural formulae of PC1 to SP1, the structure of the group itself represented by PC1 (for example, Formulae (P1-A) to (P1-D) described above) may be used or a structure of a group that can be PC1 after polymerization of a monomer used to obtain the repeating unit represented by Formula (1) may be used.

Here, specific examples of the latter (the group that can be PC1) are as follows. In a case where PC1 is obtained by polymerization of (meth)acrylic acid ester, PC1 represents a group represented by $CH_2=C(R^1)$— (R' represents a hydrogen atom or a methyl group). Further, PC1 represents ethylene glycol in a case where PC1 is obtained by polymerization of ethylene glycol, and PC1 represents propylene glycol in a case where PC1 is obtained by polymerization of propylene glycol. Further, in a case where PC1 is obtained by polycondensation of silanol, PC1 represents silanol (a compound represented by Formula $Si(R^2)_3(OH)$, and a plurality of $R^2$'s each independently represent a hydrogen atom or an alkyl group, where at least one of the plurality of $R^2$'s represents an alkyl group).

The log $P_1$ may be smaller than the log $P_2$ or greater than the log $P_2$ in a case where the difference between log $P_1$ and log $P_2$ described above is 4 or greater.

Here, the log P value of a general mesogen group (the log $P_2$ described above) tends to be in a range of 4 to 6. In a case where the log $P_1$ is smaller than the log $P_2$, the value of log $P_1$ is preferably 1 or less and more preferably 0 or less. Further, in a case where the log $P_1$ is greater than the log P2, the value of log $P_1$ is preferably 8 or greater and more preferably 9 or greater.

In a case where PC1 in Formula (1) is obtained by polymerization of (meth)acrylic acid ester and the log $P_1$ is smaller than the log P2, the log P value of SP1 in Formula (1) is preferably 0.7 or less and more preferably 0.5 or less. Further, in a case where PC1 in Formula (1) is obtained by polymerization of (meth)acrylic acid ester and the log $P_1$ is greater than the log P2, the log P value of SP1 in Formula (1) is preferably 3.7 or greater and more preferably 4.2 or greater.

Further, examples of the structure having a log P value of 1 or less include an oxyethylene structure and an oxypropylene structure. Examples of the structure having a log P value of 6 or greater include a polysiloxane structure and an alkylene fluoride structure.

From the viewpoint of improving the degree of alignment, it is preferable that the side-chain type polymer liquid crystal compound has a repeating unit having an electron-donating property and/or an electron-withdrawing property at the terminal.

More specifically, it is more preferable that the side-chain type polymer liquid crystal compound has a repeating unit (21) containing a mesogen group and an electron-withdrawing group present at the terminal of the mesogen group and having a σp value of greater than 0 and a repeating unit (22) containing a mesogen group and a group present at the terminal of the mesogen group and having a σp value of 0 or less. As described above, in a case where the polymer liquid crystal compound has the repeating unit (21) and the repeating unit (22), the degree of alignment of the polarizer to be formed using the polymer liquid crystal compound is further improved as compared with a case where the polymer liquid crystal compound has only one of the repeating unit (21) or the repeating unit (22). The details of the reason for this are not clear, but it is assumed as follows.

That is, it is assumed that since the opposite dipole moments generated in the repeating unit (21) and the repeating unit (22) interact between molecules, the interaction between the mesogen groups in the minor axis direction is strengthened, and the orientation in which the liquid crystals are aligned is more uniform, and as a result, the degree of order of the liquid crystals is considered to be high. In this manner, it is assumed that the aligning properties of the dichroic material are enhanced, and thus the degree of alignment of the polarizer to be formed increases.

Further, the repeating units (21) and (22) may be the repeating units represented by Formula (1).

The repeating unit (21) contains a mesogen group and an electron-withdrawing group present at the terminal of the mesogen group and having a σp value of greater than 0.

The electron-withdrawing group is a group that is positioned at the terminal of the mesogen group and has a σp value of greater than 0. Examples of the electron-withdrawing group (a group having a σp value of greater than 0) include a group represented by EWG in Formula (LCP-21) described below, and specific examples thereof are also the same as those described below.

The σp value of the electron-withdrawing group described above is greater than 0. From the viewpoint of further increasing the degree of alignment of the polarizer, the σp value is preferably 0.3 or greater and more preferably 0.4 or greater. From the viewpoint that the uniformity of alignment is excellent, the upper limit of the σp value of the electron-withdrawing group is preferably 1.2 or less and more preferably 1.0 or less.

The σp value is a Hammett's substituent constant σp value (also simply abbreviated as a "σp value") and is a parameter showing the strength of electron-donating property and the electron-withdrawing property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para position of benzoic acid.

As the Hammett's substituent constant σp value of each group in the present specification, the values described in the document "Hansch et al., Chemical Reviews, 1991, Vol, 91, No. 2, pp. 165 to 195" are employed. Further, the Hammett's substituent constant σp values can be calculated for groups whose Hammett's substituent constant σp values are not described in the document described above using software "ACD/ChemSketch (ACD/Labs 8.00 Release Product Version: 8.08)" based on a difference between the pKa of benzoic acid and the pKa of a benzoic acid derivative having a substituent at the para position.

The repeating unit (21) is not particularly limited as long as the repeating unit (21) contains, at a side chain thereof, a mesogen group and an electron-withdrawing group present at the terminal of the mesogen group and having a σp value of greater than 0, and from the viewpoint of further increasing the degree of alignment of the polarizer, it is preferable that the repeating unit (21) is a repeating unit represented by Formula (LCP-21).

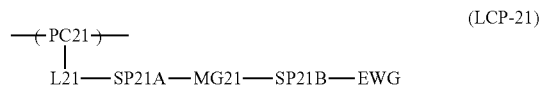

(LCP-21)

In Formula (LCP-21), PC21 represents the main chain of the repeating unit and more specifically the same structure as that for PC1 in Formula (1), L21 represents a single bond or a divalent linking group and more specifically the same structure as that for L1 in Formula (1), SP21A and SP21B each independently represent a spacer group and more specifically the same structure as that for SP1 in Formula (1), MG21 represents a mesogen structure and more specifically a mesogen group MG in Formula (LC), and EWG represents an electron-withdrawing group having a σp value of greater than 0.

The spacer group represented by SP21A and SP21B is a group represented by Formulae S1 and S2, and a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may contain —O—, —O—CO—, —CO—O—, or —O—CO—O—.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that the spacer group represented by SP21B is a single bond or a linear or branched alkylene group having 2 to 20 carbon atoms. Here, the alkylene group may contain —O—, —O—CO—, —CO—O—, or —O—CO—O—.

Among these, from the viewpoint of further increasing the degree of alignment of the polarizer, a single bond is preferable as the spacer group represented by SP21B. In other words, it is preferable that the repeating unit 21 has a structure in which EWG that represents an electron-withdrawing group in Formula (LCP-21) is directly linked to MG21 that represents a mesogen group in Formula (LCP-21). In this manner, it is assumed that in a case where the electron-withdrawing group is directly linked to the mesogen group, the intermolecular interaction due to an appropriate dipole moment works more effectively in the polymer liquid crystal compound, and the orientation in which the liquid crystals are aligned is more uniform, and as a result, the degree of order of the liquid crystals and the degree of alignment are considered to be high.

EWG represents an electron-withdrawing group having a σp value of greater than 0. Examples of the electron-withdrawing group having a σp value of greater than 0 includes an ester group (specifically, a group represented by *—C(O)OR$^E$), a (meth)acryloyl group, a (meth)acryloyloxy group, a carboxy group, a cyano group, a nitro group, a sulfo group, —S(O)(O)—OR$^E$, —S(O)(O)—R$^E$, —O—S(O)(O)—R$^E$, an acyl group (specifically, a group represented by *—C(O)R$^E$), an acyloxy group (specifically, a group represented by *—OC(O)R$^E$), an isocyanate group (—N=C(O)), *—C(O)N(R$^F$)$_2$, a halogen atom, and an alkyl group substituted with any of these groups (preferably having 1 to 20 carbon atoms). In each of the above-described groups, * represents a bonding position with respect to SP21B. R$^F$ represents an alkyl group having 1 to 20 carbon atoms (preferably 1 to 4 carbon atoms and more preferably 1 or 2 carbon atoms). R$^F$'s each independently represents a hydrogen atom or an alkyl group having 1 to 20 carbon atoms (preferably 1 to 4 carbon atoms and more preferably 1 or 2 carbon atoms).

Among the above-described groups, it is preferable that EWG represents a group represented by *—C(O)O—R$^E$, a (meth)acryloyloxy group, a cyano group, or a nitro group. From the viewpoint that the polymer liquid crystal compound and the dichroic material can be uniformly aligned while a high degree of alignment of the polarizer is maintained, the content of the repeating unit (21) is preferably 50% by mass or less, more preferably 40% by mass or less, and particularly preferably 35% by mass or less with respect to the total mass (100% by mass) of the polymer liquid crystal compound.

The lower limit of the content of the repeating unit (21) is preferably 1% by mass or greater and more preferably 3% by mass or greater.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (21). In a case where the polymer liquid crystal compound has two or more kinds of repeating units (21), there is an advantage in that the solubility of the polymer liquid crystal compound in a solvent is improved and the liquid crystal phase transition temperature is likely to be adjusted. In the case where the polymer liquid crystal compound has two or more kinds of repeating units (21), it is preferable that the total amount thereof is in the above-described range.

In the case where the polymer liquid crystal compound has two or more kinds of repeating units (21), a repeating unit (21) that does not contain a crosslinkable group in EWG and a repeating unit (21) that contains a polymerizable group in EWG may be used in combination. In this manner, the curability of the polarizer is further improved. Further, preferred examples of the crosslinkable group include a vinyl group, an upper butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group.

In this case, from the viewpoint of the balance between the curability and the degree of alignment of the polarizer, the content of the repeating unit (21) containing a polymerizable group in EWG is preferably in a range of 1% to 30% by mass with respect to the total mass of the polymer liquid crystal compound.

Hereinafter, examples of the repeating unit (21) will be described, but the repeating unit (21) is not limited to the following repeating units.

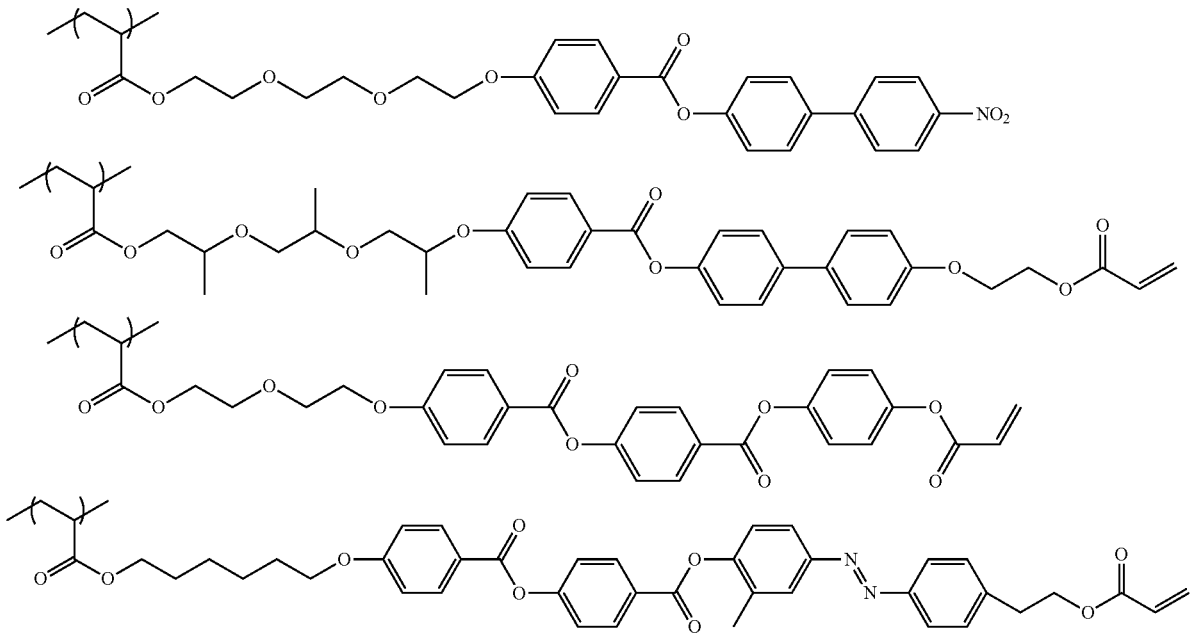

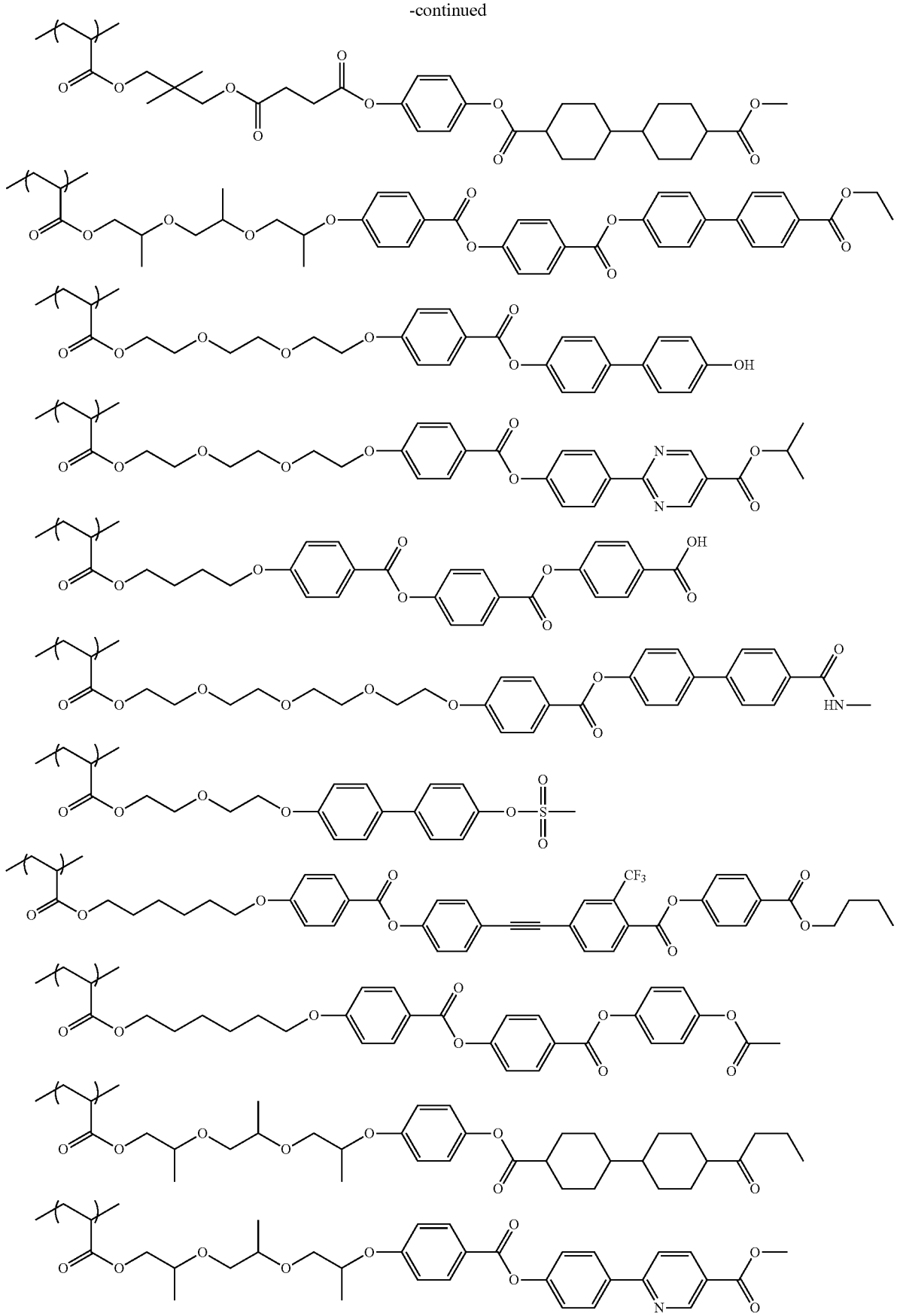

-continued

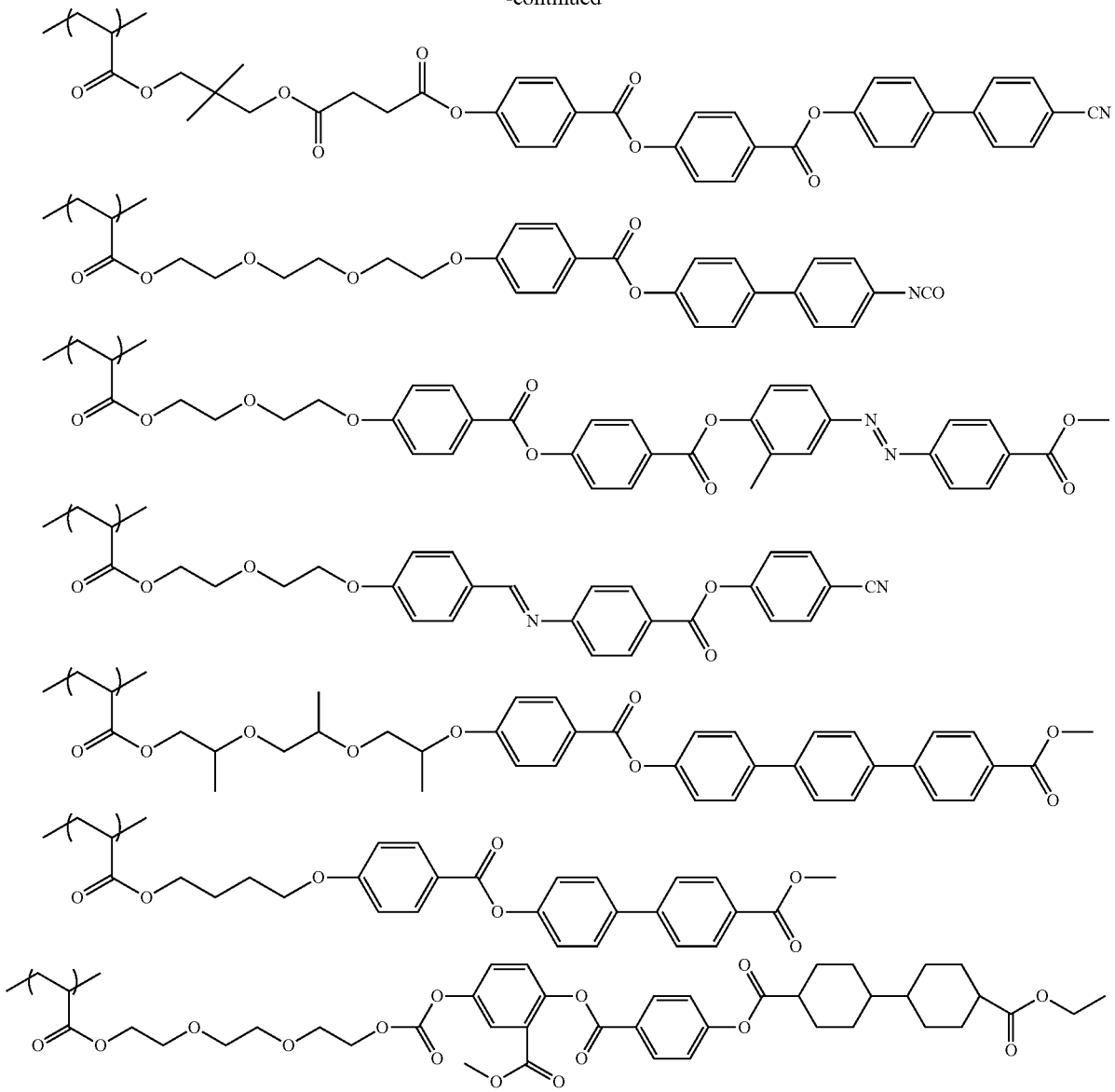

As a result of intensive examination on the composition (content ratio) and the electron-donating property and the electron-withdrawing property of the terminal groups of the repeating unit (21) and the repeating unit (22), the present inventors found that the degree of alignment of the polarizer is further increased by decreasing the content ratio of the repeating unit (21) in a case where the electron-withdrawing property of the electron-withdrawing group of the repeating unit (21) is high (that is, in a case where the σp value is large), and the degree of alignment of the polarizer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is assumed as follows. That is, it is assumed that since the intermolecular interaction due to an appropriate dipole moment works in the polymer liquid crystal compound, the orientation in which the liquid crystals are aligned is more uniform, and as a result, the degree of order of the liquid crystals and the degree of alignment of the polarizer are considered to be high.

Specifically, the product of the σp value of the electron-withdrawing group (EWG in Formula (LCP-21)) in the repeating unit (21) and the content ratio (on a mass basis) of the repeating unit (21) in the polymer liquid crystal compound is preferably in a range of 0.020 to 0.150, more preferably in a range of 0.050 to 0.130, and particularly preferably in a range of 0.055 to 0.125. In a case where the product thereof is in the above-described range, the degree of alignment of the polarizer further increases.

The repeating unit (22) contains a mesogen group and a group present at the terminal of the mesogen group and having a σp value of 0 or less. In a case where the polymer liquid crystal compound has the repeating unit (22), the polymer liquid crystal compound and the dichroic material can be uniformly aligned.

The mesogen group is a group showing the main skeleton of a liquid crystal molecule that contributes to liquid crystal formation, and the details thereof are as described in the section of MG in Formula (LCP-22) described below, and specific examples thereof are also the same as described below.

The above-described group is positioned at the terminal of the mesogen group and has a σp value of 0 or less. Examples of the above-described group (a group having a σp value of 0 or less) includes a hydrogen atom having a σp value of 0 and a group (electron-donating group) having a σp value of less than 0 and represented by T22 in Formula (LCP-22) described below. Among the above-described groups, specific example of the group having a σp value of less than 0 (electron-donating group) are the same as those for T22 in Formula (LCP-22) described below.

The σp value of the above-described group is 0 or less, and from the viewpoint that the uniformity of alignment is more excellent, the σp value is preferably less than 0, more preferably −0.1 or less, and particularly preferably −0.2 or less. The lower limit of the σp value of the above-described group is preferably −0.9 or greater and more preferably −0.7 or greater.

The repeating unit (22) is not particularly limited as long as the repeating unit (22) contains, at a side chain thereof, a mesogen group and a group present at the terminal of the mesogen group and having a σp value of 0 or less, and from the viewpoint of further increasing the uniformity of alignment of liquid crystals, it is preferable that the repeating unit (22) is a repeating unit represented by Formula (PCP-22) which does not correspond to a repeating unit represented by Formula (LCP-21).

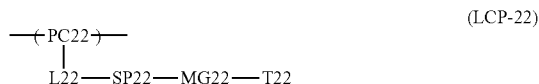
(LCP-22)

In Formula (LCP-22), PC22 represents the main chain of the repeating unit and more specifically the same structure as that for PC1 in Formula (1), L22 represents a single bond or a divalent linking group and more specifically the same structure as that for L1 in Formula (1), SP22 represents a spacer group and more specifically the same structure as that for SP1 in Formula (1), MG22 represents a mesogen structure and more specifically the mesogen group MG in Formula (LC), and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the degree of alignment of the polarizer is further improved. Here, the "main chain" in T22 indicates the longest molecular chain bonded to MG22, and the number of hydrogen atoms is not included in the number of atoms in the main chain of T22. For example, the number of atoms in the main chain is 4 in a case where T22 represents an n-butyl group, and the number of atoms in the main chain is 3 in a case where T22 represents a sec-butyl group.

Hereinafter, examples of the repeating unit (22) will be described, but the repeating unit (22) is not limited to the following repeating units.

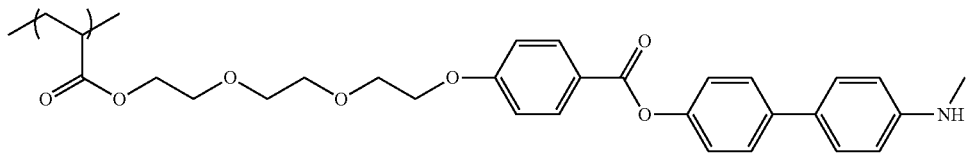

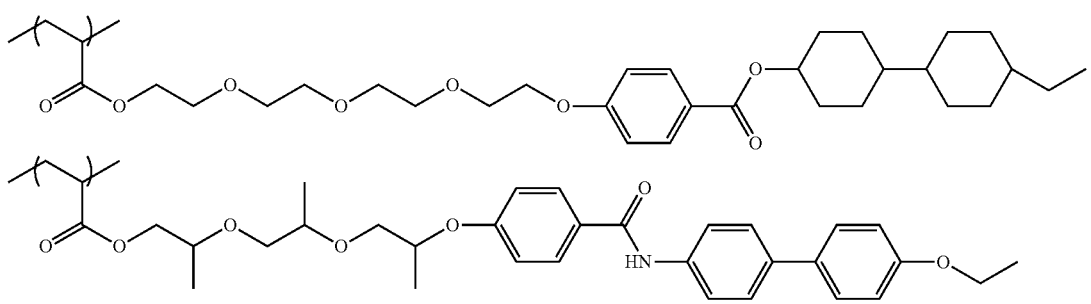

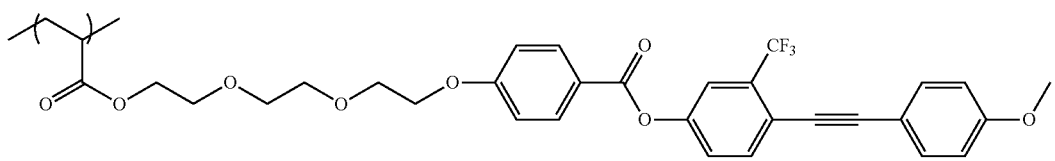

-continued
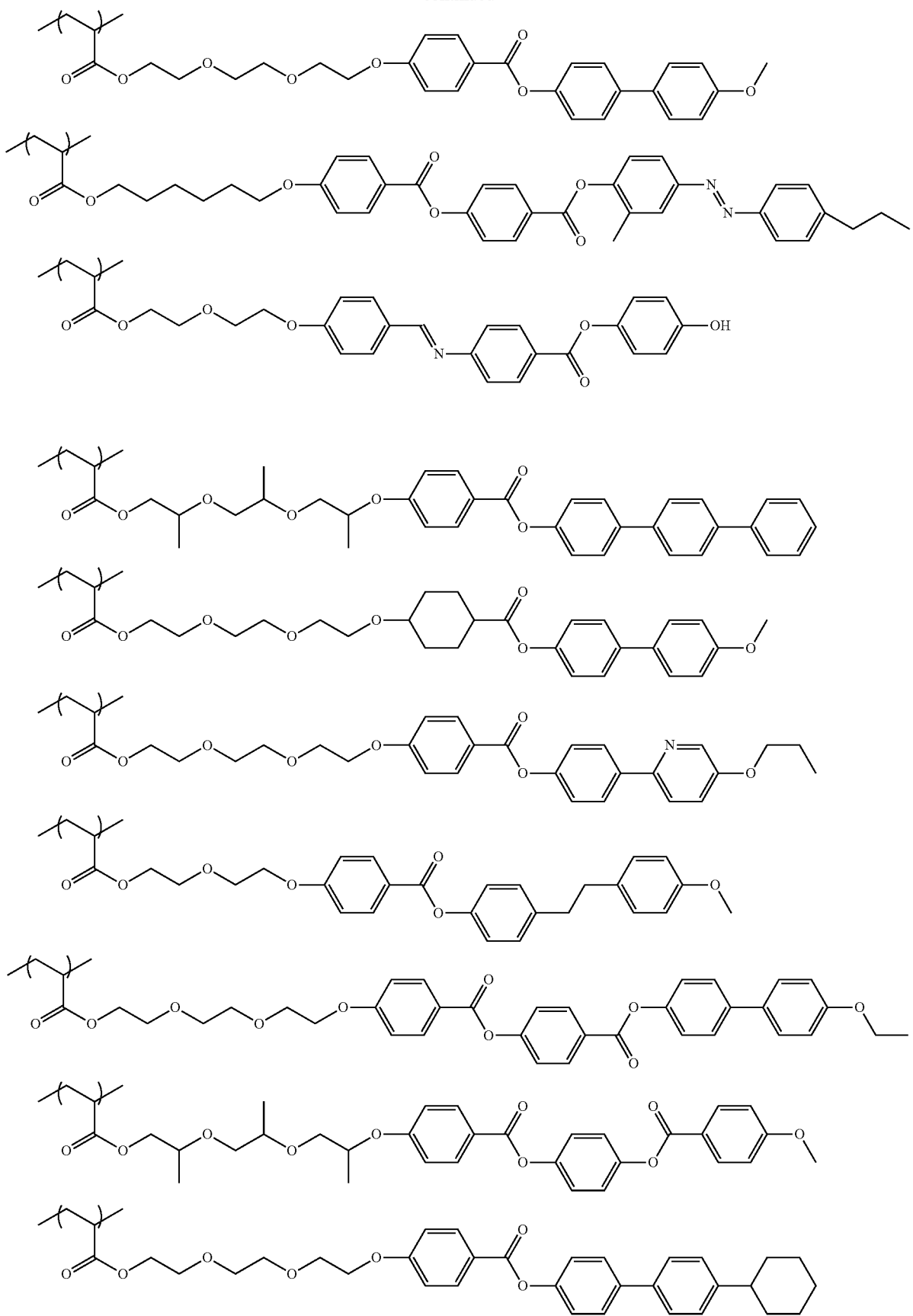

-continued

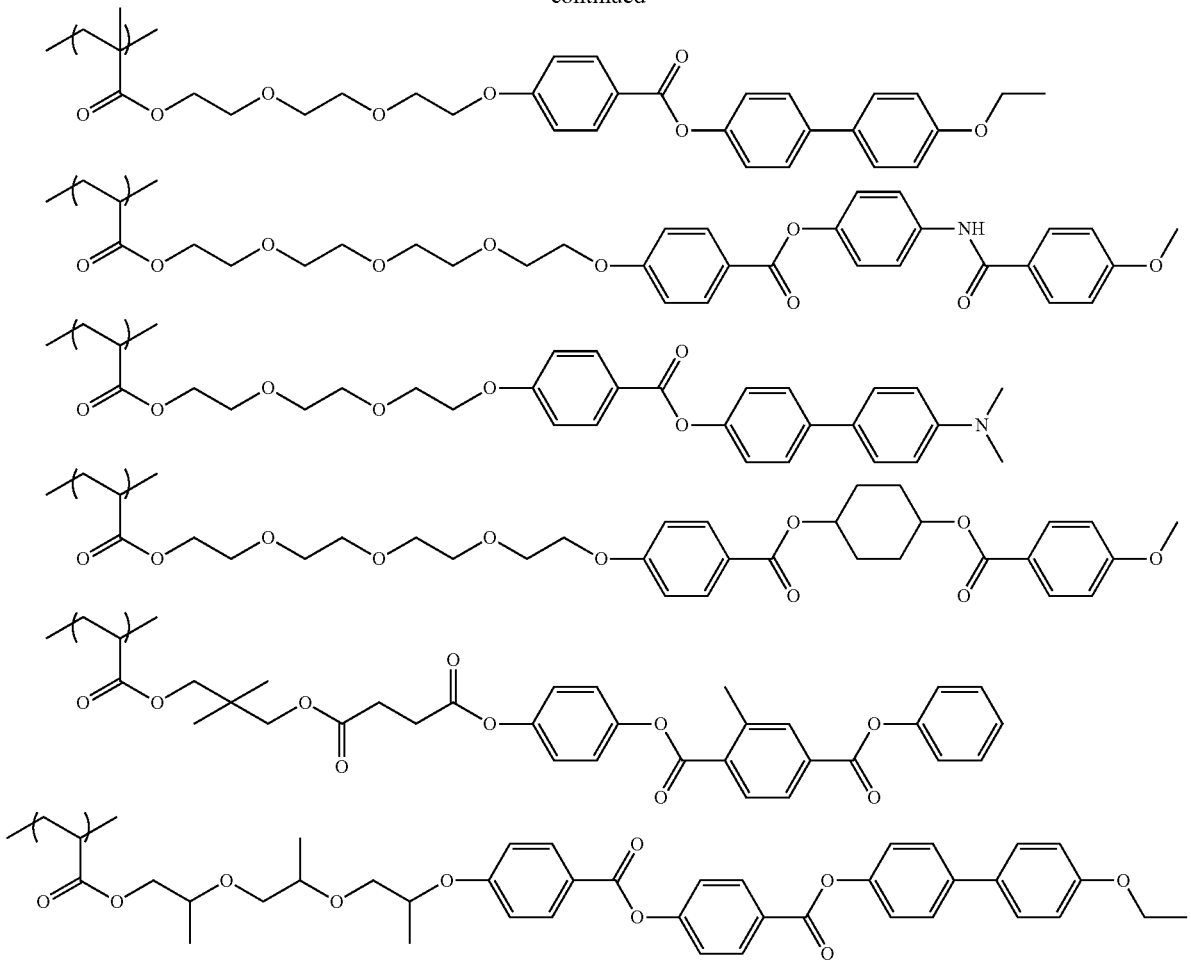

It is preferable that the structures of the repeating unit (21) and the repeating unit (22) have a part in common. It is assumed that the liquid crystals are uniformly aligned as the structures of repeating units are more similar to each other. In this manner, the degree of alignment of the polarizer is further increased.

Specifically, from the viewpoint of further increasing the degree of alignment of the polarizer, it is preferable to satisfy at least one of a condition that SP21 of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22), more preferable to satisfy two or more of the conditions, and particularly preferable to satisfy all the conditions.

From the viewpoint that the uniformity of alignment is excellent, the content of the repeating unit (22) is preferably 50% by mass or greater, more preferably 55% or greater, and particularly preferably 60% or greater with respect to the total mass (100% by mass) of the polymer liquid crystal compound.

From the viewpoint of improving the degree of alignment, the upper limit of the content of the repeating unit (22) is preferably 99% by mass or less and more preferably 97% by mass or less.

The polymer liquid crystal compound may have only one or two or more kinds of repeating units (22). In a case where the polymer liquid crystal compound has two or more kinds of repeating units (22), there is an advantage in that the solubility of the polymer liquid crystal compound in a solvent is improved and the liquid crystal phase transition temperature is likely to be adjusted. In a case where the polymer liquid crystal compound has two or more kinds of repeating units (22), it is preferable that the total amount thereof is in the above-described range.

From the viewpoint of improving the solubility in a general-purpose solvent, the side-chain type polymer liquid crystal compound may have a repeating unit (3) that does not contain a mesogen. Particularly in order to improve the solubility while suppressing a decrease in the degree of alignment, it is preferable that the side-chain type polymer liquid crystal compound has a repeating unit having a molecular weight of 280 or less as the repeating unit (3) that does not contain a mesogen. As described above, the reason why the solubility is improved while a decrease in the degree of alignment is suppressed by allowing the side-chain type polymer liquid crystal compound to have a repeating unit having a molecular weight of 280 or less which does not contain a mesogen is assumed as follows. That is, it is considered that in a case where the polymer liquid crystal compound has a repeating unit (3) that does not contain a mesogen in a molecular chain thereof, since a solvent is likely to enter the polymer liquid crystal compound, the solubility is improved, but the degree of alignment is decreased in the case of the non-mesogenic repeating unit (3). However, it is assumed that since the molecular weight of the repeating unit is small, the alignment of the repeating unit (1), the repeating unit (21), or the repeating unit (22) containing a mesogen group is unlikely to be disturbed, and thus a decrease in the degree of alignment can be suppressed.

It is preferable that the repeating unit (3) is a repeating unit having a molecular weight of 280 or less.

The molecular weight of the repeating unit (3) does not indicates the molecular weight of the monomer used to obtain the repeating unit (3), but indicates the molecular weight of the repeating unit (3) in a state of being incorporated into the polymer liquid crystal compound by polymerization of the monomer.

The molecular weight of the repeating unit (3) is 280 or less, preferably 180 or less, and more preferably 100 or less. The lower limit of the molecular weight of the repeating unit (3) is commonly 40 or greater and more preferably 50 or greater. In a case where the molecular weight of the repeating unit (3) is 280 or less, a polarizer having excellent solubility of the polymer liquid crystal compound and a high degree of alignment can be obtained.

Further, in a case where the molecular weight of the repeating unit (3) is greater than 280, the alignment of the liquid crystals in the portion of the repeating unit (LCP-1), the repeating unit (21), or the repeating unit (22) is disturbed, and thus the degree of alignment is decreased. Further, since the solvent is unlikely to enter the polymer liquid crystal compound, the solubility of the polymer liquid crystal compound is decreased.

Specific examples of the repeating unit (3) include a repeating unit (hereinafter, also referred to as a "repeating unit (3-1)") that does not contain a crosslinkable group (for example, an ethylenically unsaturated group) and a repeating unit (hereinafter, also referred to as a "repeating unit (3-2)") that contains a crosslinkable group.

(Repeating Unit (3-1))

Specific examples of the monomer used for polymerization of the repeating unit (3-1) include acrylic acid [72.1], α-alkylacrylic acids (such as methacrylic acid [86.1] and itaconic acid [130.1]), esters and amides derived therefrom (such as N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxyethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194.3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.2]), maleic acid [116.1], fumaric acid [116.1], p-styrenesulfonic acid [184.1], acrylonitrile [53.1], methacrylonitrile [67.1], dienes (such as butadiene [54.1], cyclopentadiene [66.1], and isoprene [68.1]), aromatic vinyl compounds (such as styrene [104.2], p-chlorostyrene [138.6], t-butylstyrene [160.3], and α-methylstyrene [118.2]), N-vinylpyrrolidone [111.1], N-vinyloxazolidone [113.1], N-vinyl succinimide [125.1], N-vinylformamide [71.1], N-vinyl-N-methylformamide [85.1], N-vinylacetamide [85.1], N-vinyl-N-methylacetamide [99.1], 1-vinylimidazole [94.1], 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1]. Further, the numerical values in the parentheses indicate the molecular weights of the monomers.

The above-described monomers may be used alone or in combination of two or more kinds thereof.

Among the above-described monomers, acrylic acid, α-alkylacrylic acids, esters and amides derived therefrom, acrylonitrile, methacrylonitrile, and aromatic vinyl compounds are preferable.

As monomers other than the above-described monomers, the compounds described in Research Disclosure No. 1955 (July, 1980) can be used.

Hereinafter, specific examples of the repeating unit (3-1) and the molecular weights thereof will be described, but the present invention is not limited to these specific examples.

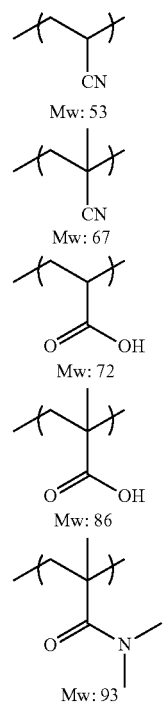

-continued

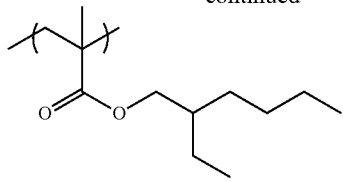

Mw: 184

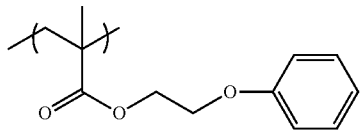

Mw: 192

(Repeating Unit (3-2))

Specific examples of the crosslinkable group in the repeating unit (3-2) include the groups represented by Formulae (P-1) to (P-30). Among these, a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, and an oxetanyl group are more preferable.

From the viewpoint of easily performing polymerization, it is preferable that the repeating unit (3-2) is a repeating unit represented by Formula (3).

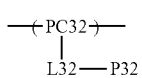

(3)

In Formula (3), PC32 represents the main chain of the repeating unit and more specifically the same structure as that for PC1 in Formula (LCP-1), L32 represents a single bond or a divalent linking group and more specifically the same structure as that for L1 in Formula (LCP-1), and P32 represents a group represented by any of Formulae (P-1) to (P-30).

Hereinafter, specific examples of the repeating unit (3-2) and the molecular weights thereof will be described, but the present invention is not limited to these specific examples.

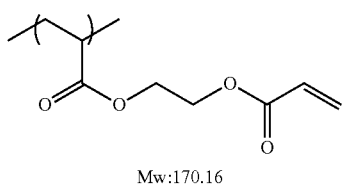

Mw:170.16

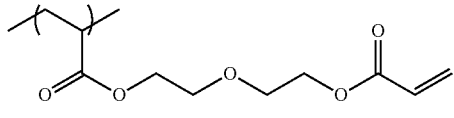

Mw:214.22

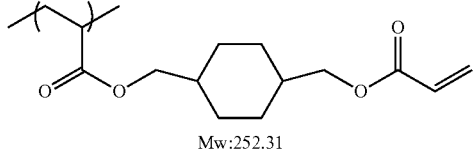

Mw:252.31

-continued

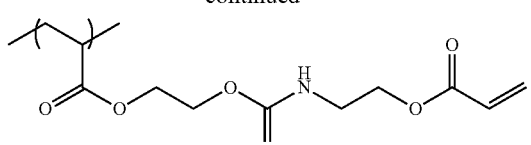

Mw:257.24

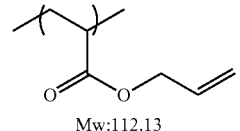

Mw:112.13

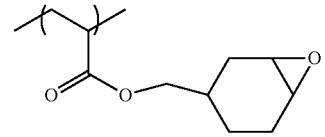

Mw:182.22

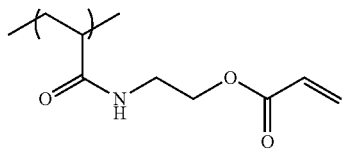

Mw:169.18

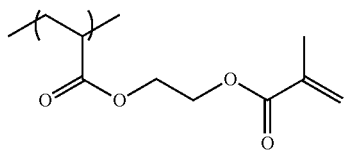

Mw:184.19

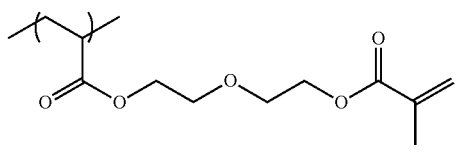

Mw:228.24

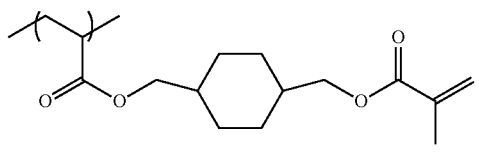

Mw:226.34

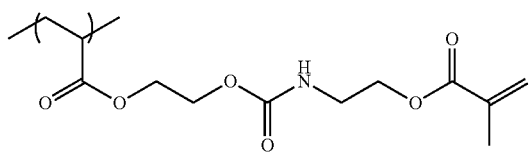

Mw:271.27

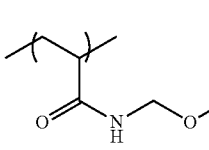

Mw:151.15

Mw:126.16

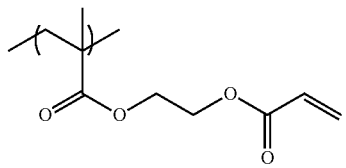

Mw:184.19

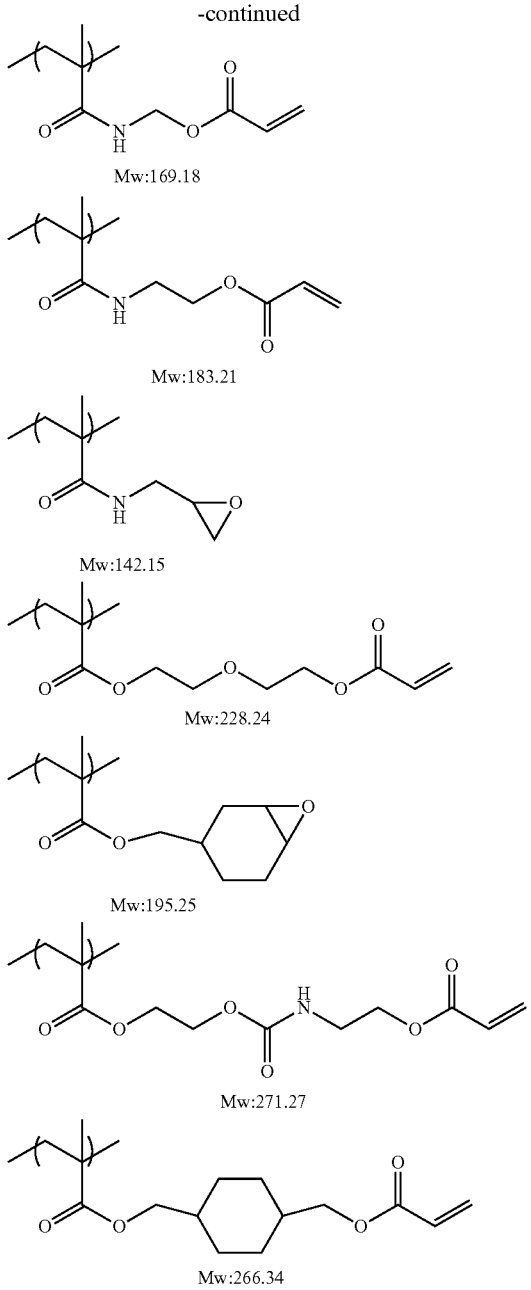

The content of the repeating unit (3) is preferably less than 14% by mass, more preferably 7% by mass or less, and still more preferably 5% by mass or less with respect to the total mass (100% by mass) of the polymer liquid crystal compound. The lower limit of the content of the repeating unit (3) is preferably 2% by mass or greater and more preferably 3% by mass or greater. In a case where the content of the repeating unit (3) is less than 14% by mass, the degree of alignment of the polarizer is further improved. In a case where the content of the repeating unit (3) is 2% by mass or greater, the solubility of the polymer liquid crystal compound is further improved.

The polymer liquid crystal compound may have only one or two or more kinds of repeating units (3). In a case where the polymer liquid crystal compound has two or more kinds of repeating units (3), it is preferable that the total amount thereof is in the above-described range.

From the viewpoint of improving the adhesiveness and planar uniformity, the side-chain type polymer liquid crystal compound may have a repeating unit (4) having a flexible structure with a long molecular chain (SP4 in Formula (4) described below). The reason for this is assumed as follows.

That is, in a case where the side-chain type polymer liquid crystal compound has such a flexible structure having a long molecular chain, entanglement of the molecular chains constituting the polymer liquid crystal compound is likely to occur, and aggregation destruction of the polarizer (specifically, destruction of the polarizer itself) is suppressed. As a result, the adhesiveness between the polarizer and an underlayer (for example, a base material or an alignment film) is assumed to be improved. Further, it is considered that a decrease in planar uniformity occurs due to the low compatibility between the dichroic material and the polymer liquid crystal compound. That is, it is considered that in a case where the compatibility between the dichroic material and the polymer liquid crystal compound is not sufficient, a planar defect (alignment defect) having the dichroic material to be precipitated as a nucleus occurs. Meanwhile, it is assumed that in the case where the polymer liquid crystal compound has such a flexible structure having a long molecular chain, a polarizer in which precipitation of the dichroic material is suppressed and the planar uniformity is excellent is obtained. Here, the "planar uniformity is excellent" indicates that the alignment defect occurring in a case where the liquid crystal composition containing the polymer liquid crystal compound is repelled on the underlayer (for example, the base material or the alignment film) is less likely to occur.

The repeating unit (4) is a repeating unit represented by Formula (4).

(4)

In Formula (4), PC4 represents the main chain of the repeating unit and more specifically the same structure as that for PC1 in Formula (1), L4 represents a single bond or a divalent linking group and more specifically the same structure as that for L1 in Formula (1) (preferably a single bond), and T4 represents a terminal group and more specifically T1 in Formula (1).

In Formula (4), SP4 represents an alkylene group having 10 or more atoms in the main chain. Here, one or more —$CH_2$— constituting the alkylene group represented by SP4 may be substituted with "SP-C" described above and particularly preferably at least one group selected from the group consisting of —O—, —S—, —N($R^{21}$)—, —C(=O)—, —C(=S)—, —C($R^{22}$)=C($R^{23}$)—, an alkynylene group, —Si($R^{24}$)($R^{25}$)—, —N=N—, —C($R^{26}$)—N—N=C($R^{27}$)—, —C($R^{28}$)=N—, and —S(=O)$_2$—. In addition, $R^{21}$ to $R^{28}$ each independently represent a hydrogen atom, a halogen atom, a cyano group, a nitro group, or a linear or branched alkyl group having 1 to 10 carbon atoms. Further, the hydrogen atoms contained in one or more —$CH_2$— constituting the alkylene group represented by SP4 may be substituted with "SP-H" described above.

Specific examples and preferred embodiments of T4 in Formula (4) are the same as those for T1 in Formula (1), and thus description thereof will not be repeated.

Specific examples and preferred embodiments of PC4 are the same as those for PC1 in Formula (1), and thus description thereof will not be repeated.

Specific examples of the divalent alicyclic group which may have a substituent represented by L4 are the same as those for the divalent alicyclic group described in the section of A1 in Formula (M1-A), and thus the description thereof will not be repeated. Further, examples of the substituent include the above-described substituent W. Among the examples, a fluorine atom, a chlorine atom, an alkyl group, a cyano group, a hydroxy group, a carboxy group, an alkoxy group, a nitro group, an acyloxy group, an amino group, a mercapto group, an alkylthio group, an alkylsulfonyl group, an alkylsulfonylamino group, a sulfo group, an alkylsulfinyl group, or an alkoxycarbonyl group is preferable.

Examples of the divalent aromatic group which may have a substituent represented by LA include a divalent aromatic hydrocarbon group and a divalent aromatic heterocyclic group. Specific examples and preferred embodiments of the divalent aromatic hydrocarbon group are the same as those for the divalent aromatic hydrocarbon group described in the section of A1 in Formula (M1-A), and thus the description thereof will not be repeated. Further, specific examples and preferred embodiments of the divalent aromatic heterocyclic group are the same as those for the divalent aromatic heterocyclic group described in the section of A1 in Formula (M1-A), and thus the description thereof will not be repeated. Further, examples of the substituent include the above-described substituent W. Among the examples, a fluorine atom, a chlorine atom, an alkyl group, a cyano group, a hydroxy group, a carboxy group, an alkoxy group, a nitro group, an acyloxy group, an amino group, a mercapto group, an alkylthio group, an alkylsulfonyl group, an alkylsulfonylamino group, a sulfo group, an alkylsulfinyl group, or an alkoxycarbonyl group is preferable.

It is preferable that L4 represents a single bond.

SP4 represents an alkylene group having 10 or more atoms in the main chain. One or more —$CH_2$— constituting the alkylene group may be substituted with "SP-C" described above, and the hydrogen atoms contained in one or more —$CH_2$— constituting the alkylene group may be substituted with "SP-H" described above.

The number of atoms in the main chain of SP4 is 10 or greater, and from the viewpoint of obtaining a polarizer in which at least one of the adhesiveness or the planar uniformity is more excellent, the number thereof is preferably 15 or greater and more preferably 19 or greater. Further, from the viewpoint of obtaining a polarizer with a more excellent degree of alignment, the upper limit of the number of atoms in the main chain of SP2 is preferably 70 or less, more preferably 60 or less, and particularly preferably 50 or less.

Here, the "main chain" in SP4 indicates a partial structure required for directly linking LA and T4 to each other, and the "number of atoms in the main chain" indicates the number of atoms constituting the partial structure. In other words, the "main chain" in SP4 is a partial structure in which the number of atoms linking L4 and T4 to each other is the smallest. For example, the number of atoms in the main chain in a case where SP4 represents a 3,7-dimethyldecanyl group is 10, and the number of atoms in the main chain in a case where SP4 represents a 4,6-dimethyldodecanyl group is 12. Further, in Formula (4-1), the inside of the frame shown by the dotted quadrangle corresponds to SP4, and the number of atoms in the main chain of SP4 (corresponding to the total number of atoms circled by the dotted line) is 11.

(4-1)

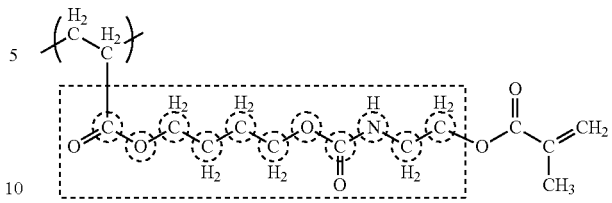

The alkylene group represented by SP4 may be linear or branched.

From the viewpoint of obtaining a polarizer with an excellent degree of alignment, the number of carbon atoms of the alkylene group represented by SP4 is preferably in a range of 8 to 80, more preferably in a range of 15 to 80, still more preferably in a range of 25 to 70, and particularly preferably in a range of 25 to 60.

From the viewpoint of obtaining a polarizer with more excellent adhesiveness and planar uniformity, it is preferable that one or more —$CH_2$— constituting the alkylene group represented by SP4 are substituted with "SP-C" described above.

Further, in a case where a plurality of —$CH_2$— constituting the alkylene group represented by SP4 are present, it is more preferable that only some of the plurality of —$CH_2$— are substituted with "SP-C" described above from the viewpoint of obtaining a polarizer with more excellent adhesiveness and planar uniformity.

Among the examples of "SP-C", —O—, —S—, —N($R^{21}$)—, —C(=O)—, —C(=S)—, —C($R^{22}$)=C($R^{2}$)—, an alkynylene group, —Si($R^{24}$)($R^{25}$)—, —N=N—, —C($R^{26}$)=N—N—C($R^{27}$)—, —C($R^{25}$)=N—, and —S(=O)$_2$— are preferable, and from the viewpoint of obtaining a polarizer with more excellent adhesiveness and planar uniformity, at least one group selected from the group consisting of —O—, —N($R^{21}$)—, —C(=O)—, and —S(=O)$_2$— is more preferable, and at least one group selected from the group consisting of —O—, —N($R^{21}$)—, and —C(=O)— is particularly preferable.

Particularly, it is preferable that SP4 represents a group having at least one selected from the group consisting of an oxyalkylene structure in which one or more —$CH_2$— constituting an alkylene group are substituted with —O—, an ester structure in which one or more —$CH_2$—$CH_2$— constituting an alkylene group are substituted with —O— and —C(=O)—, and a urethane bond in which one or more —$CH_2$—$CH_2$—$CH_2$— constituting an alkylene group are substituted with —O—, —C(=O)—, and —NH—.

The hydrogen atoms contained in one or more —$CH_2$— constituting the alkylene group represented by SP4 may be substituted with "SP-H" described above. In this case, one or more hydrogen atoms contained in —$CH_2$— may be substituted with "SP-H". That is, only one hydrogen atom contained in —$CH_2$— may be substituted with "SP-H" or all (two) hydrogen atoms contained in —$CH_2$— may be substituted with "SP-H".

Among the examples of "SP-H", at least one group selected from the group consisting of a halogen atom, a cyano group, a nitro group, a hydroxyl group, a linear alkyl group having 1 to 10 carbon atoms, a branched alkyl group having 1 to 10 carbon atoms, and a halogenated alkyl group having 1 to 10 carbon atoms is preferable, and at least one group selected from the group consisting of a hydroxyl group, a linear alkyl group having 1 to 10 carbon atoms, and a branched alkyl group having 1 to 10 carbon atoms is more preferable.

As described above, T4 represents the same terminal group as that for T1, and examples thereof include a hydrogen atom, a methyl group, a hydroxyl group, a carboxy group, a sulfonic acid group, a phosphoric acid group, a boronic acid group, an amino group, a cyano group, a nitro group, a phenyl group which may have a substituent, and -L-CL. Further, L represents a single bond or a linking group, and specific examples of the linking group are the same as those for LW and SPW described above. Further, CL represents a crosslinkable group, and examples thereof include a group represented by Q1 or Q2 in Formula (LC) described above, and a group represented by any of Formulae (P-1) to (P-30) is preferable, and a vinyl group, a butadiene group, a (meth)acryl group, a (meth)acrylamide group, a vinyl acetate group, a fumaric acid ester group, a styryl group, a vinylpyrrolidone group, a maleic acid anhydride, a maleimide group, a vinyl ether group, an epoxy group, or an oxetanyl group is preferable.

The epoxy group may be an epoxycycloalkyl group, and the number of carbon atoms of the cycloalkyl group moiety in the epoxycycloalkyl group is preferably in a range of 3 to 15, more preferably in a range of 5 to 12, and particularly preferably 6 (that is, the epoxycycloalkyl group is an epoxycyclohexyl group).

Examples of the substituent of the oxetanyl group include an alkyl group having 1 to 10 carbon atoms. Among the examples, an alkyl group having 1 to 5 carbon atoms is preferable. The alkyl group as a substituent of the oxetanyl group may be linear or branched, but is preferably linear.

Examples of the substituent of the phenyl group include a boronic acid group, a sulfonic acid group, a vinyl group, and an amino group. Among these, a boronic acid group is preferable.

Specific examples of the repeating unit (4) include the following structures. Further, in the following specific examples, n1 represents an integer of 2 or greater, and n2 represents an integer of 1 or greater.

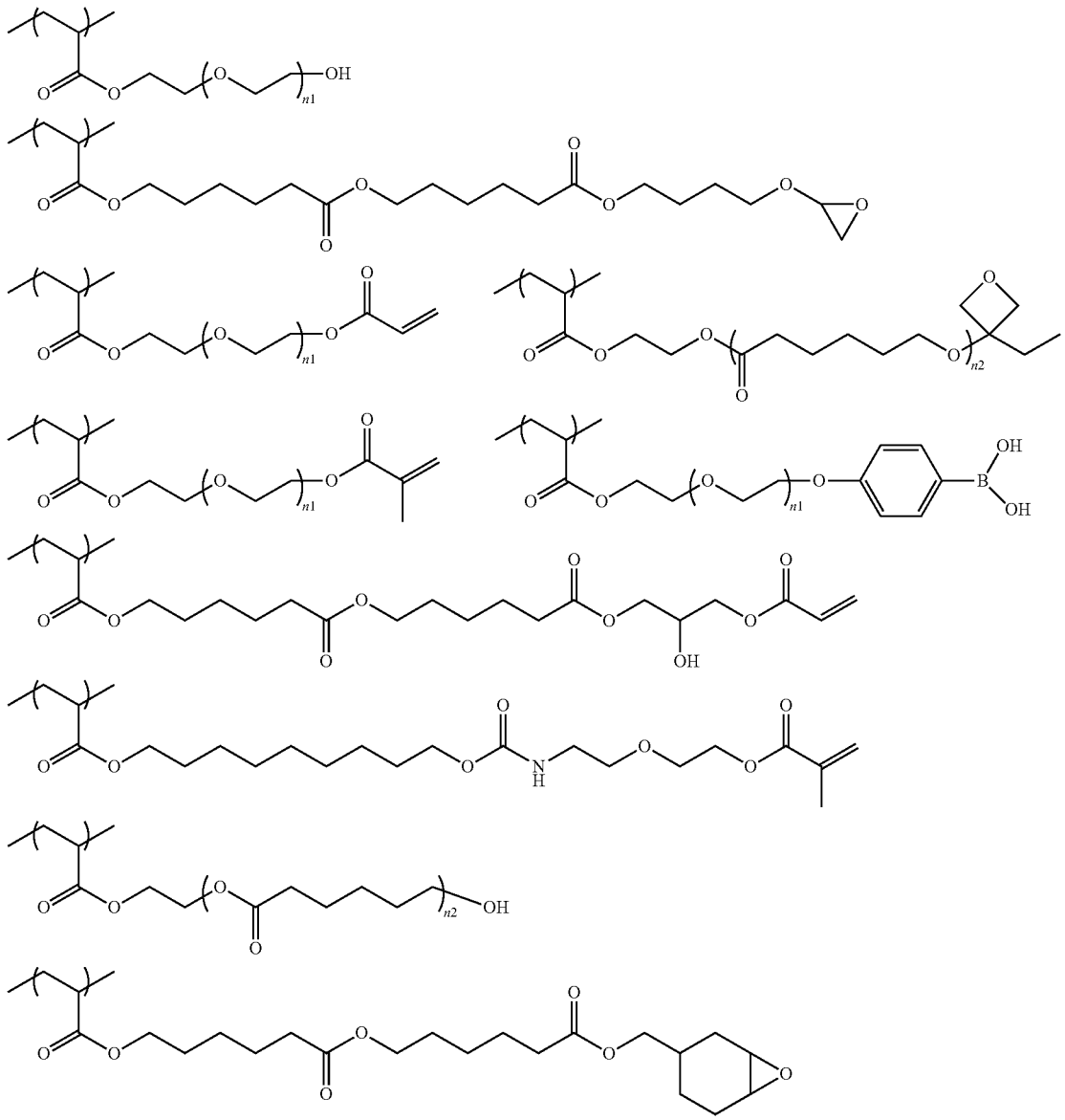

-continued

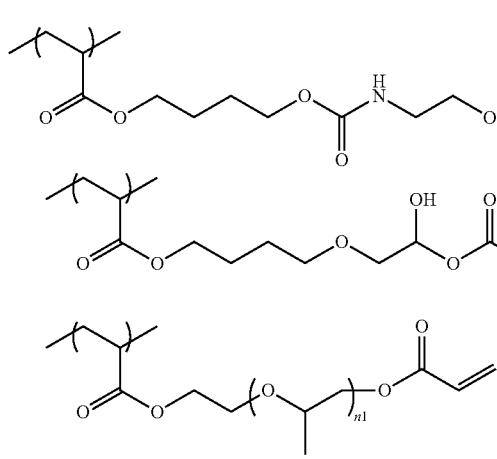

The content of the repeating unit (4) is preferably in a range of 2% to 20% by mass and more preferably in a range of 3% to 18% by mass with respect to all the repeating units (100% by mass) of the polymer liquid crystal compound. In a case where the content of the repeating unit (4) is 2% by mass or greater, a polarizer having more excellent adhesiveness can be obtained. Further, in a case where the content of the repeating unit (4) is 20% by mass or less, a polarizer having more excellent planar uniformity can be obtained.

The polymer liquid crystal compound may have only one or two or more kinds of repeating units (4). In a case where the polymer liquid crystal compound has two or more kinds of repeating units (4), the content of the repeating unit (4) indicates the total content of the repeating units (4).

From the viewpoint of the planar uniformity, the side-chain type polymer liquid crystal compound may have a repeating unit (5) to be introduced by polymerizing a polyfunctional monomer. Particularly in order to improve the planar uniformity while suppressing a decrease in the degree of alignment, it is preferable that the side-chain type polymer liquid crystal compound has 10% by mass or less of the repeating unit (5) to be introduced by polymerizing a polyfunctional monomer. As described above, the reason why the planar uniformity can be improved while a decrease in the degree of alignment is suppressed by allowing the side-chain type polymer liquid crystal compound to have 10% by mass or less of the repeating unit (5) is assumed as follows.

The repeating unit (5) is a unit to be introduced to the polymer liquid crystal compound by polymerizing a polyfunctional monomer. Therefore, it is considered that the polymer liquid crystal compound contains a high-molecular-weight body in which a three-dimensional crosslinked structure is formed by the repeating unit (5). Here, since the content of the repeating unit (5) is small, the content of the high-molecular-weight body having the repeating unit (5) is considered to be small.

It is assumed that a polarizer in which cissing of the liquid crystal composition is suppressed and the planar uniformity is excellent is obtained due to the presence of a small amount of the high-molecular-weight body with the three-dimensional crosslinked structure that has been formed as described above.

Further, it is assumed that the effect of suppressing a decrease in the degree of alignment can be maintained because the content of the high-molecular-weight body is small.

It is preferable that the repeating unit (5) to be introduced by polymerizing a polyfunctional monomer is a repeating unit represented by Formula (5).

(5)

In Formula (5), PC5A and PC5B represent the main chain of the repeating unit and more specifically the same structure as that for PC1 in Formula (1), L5A and L5B represent a single bond or a divalent linking group and more specifically the same structure as that for L1 in Formula (1), SP5A and SP5B represent a spacer group and more specifically the same structure as that for SP1 in Formula (1), MG5A and MG5B represent a mesogen structure and more specifically the mesogen group MG in Formula (LC), and a and b represent an integer of 0 or 1.

PC5A and PC5B may represent the same group or different groups, but it is preferable that PC5A and PC5B represent the same group from the viewpoint of further improving the degree of alignment of the polarizer.

L5A and L5B may represent a single bond, the same group, or different groups, but L5A and L5B represent preferably a single bond or the same group and more preferably the same group from the viewpoint of further improving the degree of alignment of the polarizer.

SP5A and SP5B may represent a single bond, the same group, or different groups, but SP5A and SP5B represent preferably a single bond or the same group and more preferably the same group from the viewpoint of further improving the degree of alignment of the polarizer.

Here, the same group in Formula (5) indicates that the chemical structures are the same as each other regardless of the orientation in which each group is bonded. For example, even in a case where SP5A represents *—$CH_2$—$CH_2$—O—** (* represents a bonding position with respect to L5A, and ** represents a bonding position with respect to MG5A) and SP5B represents *—O—$CH_2$—$CH_2$—** (* represents a bonding position with respect to MG5B, and ** represents a bonding position with L5B), SP5A and SP5B represent the same group.

a and b each independently represent an integer of 0 or 1 and preferably 1 from the viewpoint of further improving the degree of alignment of the polarizer.

a and b may be the same as or different from each other, but from the viewpoint of further improving the degree of alignment of the polarizer, it is preferable that both a and b represent 1.

From the viewpoint of further improving the degree of alignment of the polarizer, the sum of a and b is preferably 1 or 2 (that is, the repeating unit represented by Formula (5) contains a mesogen group) and more preferably 2.

From the viewpoint of further improving the degree of alignment of the polarizer, it is preferable that the partial structure represented by -(MG5A)$_a$-(MG5B)$_b$— has a cyclic structure. In this case, from the viewpoint of further improving the degree of alignment of the polarizer, the number of cyclic structures in the partial structure represented by -(MG5A2)$_a$-(MG5B)$_b$- is preferably 2 or greater, more preferably in a range of 2 to 8, still more preferably in a range of 2 to 6, particularly preferably in a range of 2 to 4, and most preferably 4.

From the viewpoint of further improving the degree of alignment of the polarizer, the mesogen groups represented by MG5A and MG5B each independently have preferably one or more cyclic structures, more preferably 2 to 4 cyclic structures, still more preferably 2 or 3 cyclic structures, and particularly preferably 2 cyclic structures.

Specific examples of the cyclic structure include an aromatic hydrocarbon group, a heterocyclic group, and an alicyclic group. Among these, an aromatic hydrocarbon group is preferable.

MG5A and MG5B may represent the same group or different groups, but from the viewpoint of further improving the degree of alignment of the polarizer, it is preferable that MG5A and MG5B represent the same group.

From the viewpoints of exhibiting the liquid crystallinity, adjusting the liquid crystal phase transition temperature, and the availability of raw materials and synthetic suitability, it is preferable that the mesogen group represented by MG5A and MG5B is the mesogen group MG in Formula (LC).

Particularly in the repeating unit (5), it is preferable that PC5A and PC5B represent the same group, L5A and L5B represent a single bond or the same group, SP5A and SP5B represent a single bond or the same group, and MG5A and MG5B represent the same group. In this manner, the degree of alignment of the polarizer is further improved.

The content of the repeating unit (5) is preferably 10% by mass or less, more preferably in a range of 0.001% to 5% by mass, and still more preferably in a range of 0.05% to 3% by mass with respect to the content (100% by mass) of all the repeating units of the polymer liquid crystal compound.

The polymer liquid crystal compound may have only one or two or more kinds of repeating units (5). In a case where the polymer liquid crystal compound has two or more kinds of repeating units (5), it is preferable that the total amount thereof is in the above-described range.

In the present invention, the polymer liquid crystal compound may be a star-shaped polymer. The star-shaped polymer in the present invention indicates a polymer having three or more polymer chains extending from the nucleus and is specifically represented by Formula (6).

The star-shaped polymer represented by Formula (6) as the polymer liquid crystal compound can form a light absorption anisotropic film having a high degree of alignment while having high solubility (excellent solubility in a solvent).

$$A\text{---}(\text{PI})_{n_A} \qquad (6)$$

In Formula (6), $n_A$ represents an integer of 3 or greater and preferably an integer of 4 or greater. The upper limit of $n_A$ is not limited thereto, but is commonly 12 or less and preferably 6 or less.

A plurality of PI's each independently represent a polymer chain having any of repeating units represented by Formulae (1), (21), (22), (3), (4), and (5). Here, at least one of the plurality of PI's represents a polymer chain having a repeating unit represented by Formula (1).

A represents an atomic group that is the nucleus of the star-shaped polymer.

Specific examples of A include structures obtained by removing hydrogen atoms from thiol groups of the polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and P1 are bonded to each other through a sulfide bond.

The number of thiol groups of the polyfunctional thiol compound from which A is derived is preferably 3 or greater and more preferably 4 or greater. The upper limit of the number of thiol groups of the polyfunctional thiol compound is commonly 12 or less and preferably 6 or less.

Specific examples of the polyfunctional thiol compound are shown below.

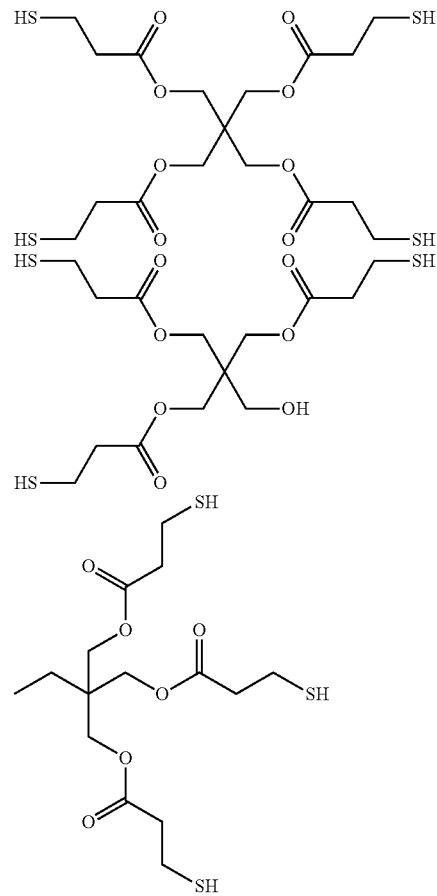

51
-continued
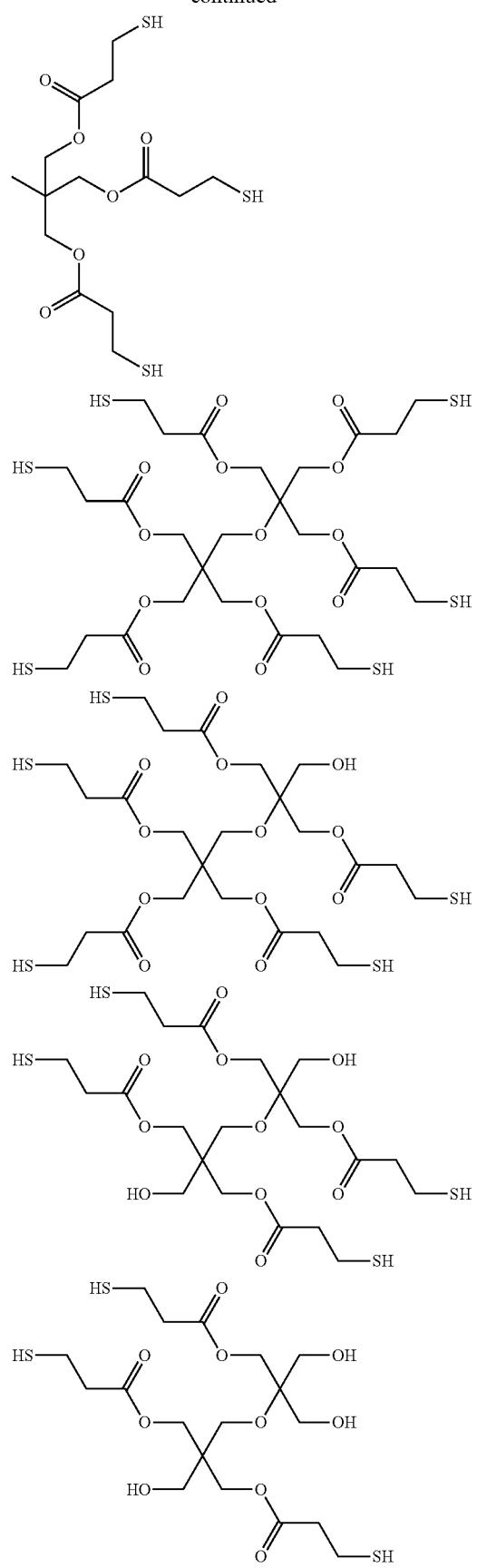
52
-continued
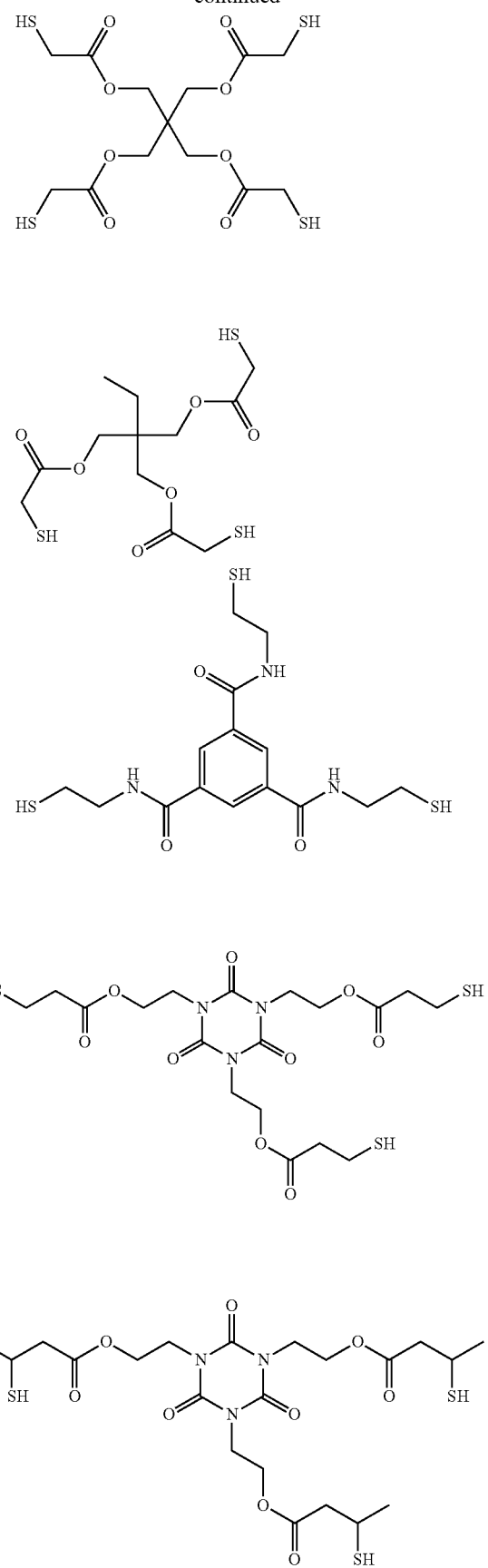

-continued

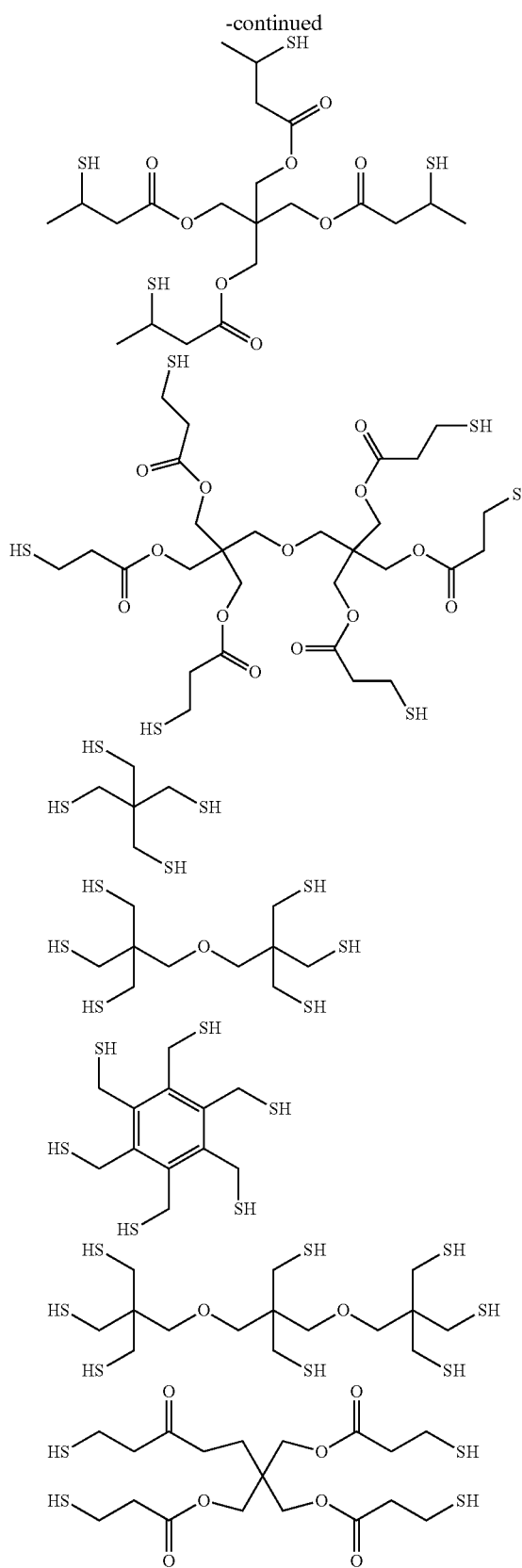

From the viewpoint of further improving the degree of alignment, the polymer liquid crystal compound may be a thermotropic liquid crystal and a crystalline polymer.

(Thermotropic Liquid Crystal)

A thermotropic liquid crystal is a liquid crystal that shows transition to a liquid crystal phase due to a change in temperature.

The temperature at which the nematic phase is exhibited is preferably in a range of room temperature (23° C.) to 450° C. and from the viewpoints of handleability and manufacturing suitability, more preferably in a range of 50° C. to 400° C.

(Crystalline Polymer)

A crystalline polymer is a polymer showing a transition to a crystal layer due to a change in temperature. The crystalline polymer may show a glass transition other than the transition to the crystal layer.

The presence or absence of crystallinity of the polymer liquid crystal compound is evaluated as follows.

Two polarizers of an optical microscope (ECLIPSE E600 POL, manufactured by Nikon Corporation) are disposed so as to be orthogonal to each other, and a sample table is set between the two polarizers. Further, a small amount of the polymer liquid crystal compound is placed on slide glass, and the slide glass is set on a hot stage placed on the sample table. While the state of the sample is observed, the temperature of the hot stage is increased to a temperature at which the polymer liquid crystal compound exhibits liquid crystallinity, and the polymer liquid crystal compound is allowed to enter a liquid crystal state. After the polymer liquid crystal compound enters the liquid crystal state, the behavior of the liquid crystal phase transition is observed while the temperature of the hot stage is gradually lowered, and the temperature of the liquid crystal phase transition is recorded. In a case where the polymer liquid crystal compound exhibits a plurality of liquid crystal phases (for example, a nematic phase and a smectic phase), all the transition temperatures are also recorded.

Next, approximately 5 mg of a sample of the polymer liquid crystal compound is put into an aluminum pan, and the pan is covered and set on a differential scanning calorimeter (DSC) (an empty aluminum pan is used as a reference). The polymer liquid crystal compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the polymer liquid crystal compound has crystallinity.

Meanwhile, in a case where an exothermic peak is not observed at a temperature other than the liquid crystal phase transition temperature, it can be said that the polymer liquid crystal compound does not have crystallinity.

The polymer liquid crystal compound may exhibit nematic or smectic liquid crystallinity, but it is preferable that the polymer liquid crystal compound exhibits at least the nematic liquid crystallinity.

The temperature at which the nematic phase is exhibited is preferably in a range of room temperature (23° C.) to 450° C. and from the viewpoints of handleability and manufacturing suitability, more preferably in a range of 50° C. to 400° C.

[Dichroic Material]

The dichroic material contained in the polarizer-forming composition of the present invention is not particularly limited, and examples thereof include a visible light absorbing material (dichroic dye), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic materials (dichroic dyes) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] of JP2011-213610A, paragraphs [0074] to [0246] of JP2011-237513A, paragraphs [0005] to [0051] of JP2016-006502, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] of WO2017/195833A, and paragraphs [0014] to [0034] of WO2018/164252A.

In the present invention, two or more kinds of dichroic materials may be used in combination. For example, from the viewpoint of making the color of the polarizer closer to black, it is preferable that at least one dichroic material having a maximal absorption wavelength in a wavelength range of 370 to 550 nm and at least one dichroic material having a maximal absorption wavelength in a wavelength range of 500 to 700 nm are used in combination.

In the present invention, from the viewpoint of further increasing the degree of alignment of the polarizer to be formed and further improving the heat resistance, the content of the dichroic material is preferably in a range of 1% to 80% by mass, more preferably in a range of 2% to 70% by mass, and still more preferably in a range of 3% to 60% by mass with respect to the total mass of the solid content of the polarizer-forming composition.

Further, from the viewpoint of further increasing the degree of alignment of the polarizer to be formed, the content of the dichroic material is preferably in a range of 1 to 400 parts by mass, more preferably in a range of 2 to 100 parts by mass, and still more preferably in a range of 4 to 40 parts by mass with respect to 100 parts by mass of the liquid crystal compound.

[Solvent]

From the viewpoint of workability and the like, it is preferable that the polarizer-forming composition of the present invention contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, tetrahydropyran, dioxolane, tetrahydrofurfuryl alcohol, and cyclopentyl methyl ether), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane (chloroform), dichloroethane, dichlorobenzene, and chlorotoluene), esters (such as methyl acetate, ethyl acetate, butyl acetate, and diethyl carbonate), alcohols (such as ethanol, isopropanol, butanol, and cyclohexanol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine), and water.

These solvents may be used alone or in combination of two or more kinds thereof.

Among these solvents, from the viewpoint of further improving the degree of alignment of the polarizer to be formed and further improving the heat resistance, it is preferable to use an organic solvent and more preferable to use halogenated carbons or ketones.

In a case where the polarizer-forming composition of the present invention contains a solvent, from the viewpoint of further improving the degree of alignment of the polarizer to be formed and further improving the heat resistance, the content of the solvent is preferably in a range of 70% to 99.5% by mass, more preferably in a range of 80% to 99% by mass, and still more preferably in a range of 85% to 98% by mass with respect to the total mass of the polarizer-forming composition according to the embodiment of the present invention.

[Surfactant]

It is preferable that the polarizer-forming composition of the present invention contains a surfactant. In a case where the polarizer-forming composition contains a surfactant, the smoothness of the coated surface is improved, the degree of alignment is improved, and cissing and unevenness are suppressed so that the in-plane uniformity is expected to be improved.

As the surfactant, surfactants that allow liquid crystal compounds to be horizontally aligned are preferable, and compounds (horizontal alignment agents) described in paragraphs [0253] to [0293] of JP2011-237513A can be used. Further, fluorine (meth)acrylate-based polymers described in [0018] to [0043] of JP2007-272185A can also be used. Compounds other than the compounds described above may be used as the surfactant.

In a case where the polarizer-forming composition of the present invention contains a surfactant, from the viewpoint of further increasing the degree of alignment of the polarizer to be formed and further improving the heat resistance, the content of the surfactant is preferably in a range of 0.001 to 5 parts by mass and more preferably in a range of 0.01 to 3 parts by mass with respect to 100 parts by mass which is the total amount of the liquid crystal compound and the dichroic material in the polarizer-forming composition of the present invention.

[Polymerization Initiator]

From the viewpoint of further increasing the degree of alignment of the polarizer to be formed and further improving the heat resistance, it is preferable that the polarizer-forming composition of the present invention contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722, 512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), and acylphosphine oxide compounds (JP1988-40799B (JP-S63-40799B), JP1993-29234B (JP-H05-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, and IRGACURE OXE-01 (all manufactured by BASF SE).

In a case where the polarizer-forming composition of the present invention contains a polymerization initiator, the viewpoint of further increasing the degree of alignment of the polarizer to be formed and further improving the heat resistance, the content of the polymerization initiator is preferably in a range of 0.01 to 30 parts by mass and more preferably in a range of 0.1 to 15 parts by mass with respect to 100 parts by mass which is the total amount of the liquid crystal compound and the dichroic material in the polarizer-forming composition.

[Polarizer]

The polarizer according to the embodiment of the present invention is a polarizer formed from the above-described polarizer-forming composition of the present invention.

[Method of Producing Polarizer]

A method of producing the polarizer according to the embodiment of the present invention is not particularly limited, but from the viewpoint of further increasing the degree of alignment of the polarizer to be formed, a method comprising a step of coating an alignment film with the above-described polarizer-forming composition of the present invention to form a coating film (hereinafter, also referred to as a "coating film forming step") and a step of aligning a liquid crystal component contained in the coating film (hereinafter, also referred to as an "aligning step") in this order (hereinafter, also referred to as the "present production method") is preferable.

Further, the liquid crystal component is a component that also includes a dichroic material having liquid crystallinity in a case where the above-described dichroic material has liquid crystallinity, in addition to the above-described liquid crystal compound.

Hereinafter, each step will be described.

<Coating Film Forming Step>

The coating film forming step is a step of coating the alignment film with the above-described polarizer-forming composition of the present invention to form a coating film. The liquid crystal compound in the coating film is horizontally aligned due to an interaction between the alignment film and a surfactant (in a case where the polarizer-forming composition of the present invention contains a surfactant).

The alignment film can be easily coated with the polarizer-forming composition of the present invention by using the above-described polarizer-forming composition of the present invention which contains a solvent or using a liquid such as a melt obtained by heating the polarizer-forming composition of the present invention.

Examples of the method of coating the alignment film with the polarizer-forming composition of the present invention include known methods such as a roll coating method, a gravure printing method, a spin coating method, a wire bar coating method, an extrusion coating method, a direct gravure coating method, a reverse gravure coating method, a die coating method, a spraying method, and an ink jet method.

(Alignment Film)

The alignment film may be any film as long as the film allows the liquid crystal compound contained in the polarizer-forming composition of the present invention to be horizontally aligned.

An alignment film can be provided by means such as a rubbing treatment performed on a film surface of an organic compound (preferably a polymer), oblique vapor deposition of an inorganic compound, formation of a layer having microgrooves, or accumulation of an organic compound (such as ca-tricosanoic acid, dioctadecylmethylammonium chloride, or methyl stearylate) according to a Langmuir-Blodgett method (LB film). Further, an alignment film in which an alignment function is generated by application of an electric field, application of a magnetic field, or irradiation with light is also known. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

(1) Rubbing Treatment Alignment Film

A polymer material used for the alignment film formed by performing a rubbing treatment is described in multiple documents, and a plurality of commercially available products can be used. In the present invention, polyvinyl alcohol or polyimide and derivatives thereof are preferably used. The alignment film can refer to the description on page 43, line 24 to page 49, line 8 of WO2001/88574A1. The thickness of the alignment film is preferably in a range of 0.01 to 10 μm and more preferably in a range of 0.01 to 1 μm.

(2) Photo-Alignment Film

A photo-alignment material used for an alignment film formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, photocrosslinkable polyimides, polyamides, or esters described in JP2003-520878A, JP2004-529220A, and JP4162850B. Among these, azo compounds, photocrosslinkable polyimides, polyamides, or esters are more preferable.

The photo-alignment film formed of the above-described material is irradiated with linearly polarized light or non-polarized light to produce a photo-alignment film.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 un, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic material polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter or a wavelength conversion element.

In a case where light to be applied is linearly polarized light, a method of applying light vertically or obliquely to the upper surface with respect to the alignment film or the surface of the alignment film from the rear surface is employed. The incidence angle of light varies depending on the photo-alignment material, but is preferably in a range of 0° to 90° (vertical) and more preferably in a range of 40° to 90°.

In a case where light to be applied is non-polarized light, the alignment film is irradiated with non-polarized light obliquely. The incidence angle is preferably in a range of 10° to 80°, more preferably in a range of 20° to 60°, and still more preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

<Aligning Step>

The aligning step is a step of aligning the liquid crystal component contained in the coating film. In this manner, a liquid crystal layer can be obtained.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the liquid crystal component contained in the above-described polarizer-forming composition of the present invention may be aligned by the coating film forming step or the drying treatment described above. For example, in an embodiment in which the polarizer-forming composition of the present invention is prepared as a coating solution containing a solvent, a coating film having light absorption anisotropy (that is, a polarizer) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the polarizer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling means is not particularly limited and can be performed according to a known method.

The polarizer can be obtained by performing the above-described steps.

In the present embodiment, examples of the method of aligning the liquid crystal component contained in the coating film include a drying treatment and a heat treatment, but the method is not limited thereto, and the liquid crystal component can be aligned by a known alignment treatment.

<Other Steps>

The production method described below may include a step of curing the polarizer after the aligning step (hereinafter, also referred to as a "curing step").

The curing step is performed by, for example, heating the film and/or irradiating (exposing) the film with light. Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

Further, the exposure may be performed under a nitrogen atmosphere. In a case where the curing of the polarizer proceeds by radical polymerization, from the viewpoint of reducing inhibition of polymerization by oxygen, it is preferable that exposure is performed in a nitrogen atmosphere.

[Laminate]

The laminate of the present invention includes a base material, an alignment film provided on the base material, and the above-described polarizer according to the embodiment of the present invention provided on the alignment film.

Further, the laminate of the present invention may include a λ/4 plate on the polarizer according to the embodiment of the present invention.

Further, the laminate of the present invention may include a barrier layer between the polarizer according to the embodiment of the present invention and the λ/4 plate.

Hereinafter, each layer constituting the laminate of the present invention will be described.

[Base Material]

The base material can be appropriately selected, and examples thereof include glass and a polymer film. The light transmittance of the base material is preferably 80% or greater.

In a case where a polymer film is used as the base material, it is preferable to use an optically isotropic polymer film. As specific examples and preferred embodiments of the polymer, the description in paragraph [0013] of JP2002-22942A can be applied. Further, even in a case of a polymer easily exhibiting the birefringence such as polycarbonate and polysulfone which has been known in the related art, a polymer with the exhibiting property which has been decreased by modifying the molecules described in WO2000/26705A can be used.

[Alignment Film]

The alignment film is as described above, and thus the description thereof will not be repeated.

[Polarizer]

The polarizer according to the embodiment of the present invention is as described above, and thus the description will not be repeated.

[λ/4 Plate]

A "λ/4 plate" is a plate having λ/4 function, specifically, a plate having a function of converting linearly polarized light having a specific wavelength into circularly polarized light (or converting circularly polarized light into linearly polarized light).

For example, specific examples of a form in which a λ/4 plate has a single-layer structure include a stretched polymer film and a phase difference film in which an optically anisotropic layer having a λ/4 function is provided on a support. Further, specific examples of a form in which a λ/4 plate has a multilayer structure include a broadband λ/4 plate obtained by laminating a λ/4 plate and a λ/2 plate.

The λ/4 plate and the polarizer according to the embodiment of the present invention may be provided by coming into contact with each other, or another layer may be provided between the λ/4 plate and the polarizer according to the embodiment of the present invention. Examples of such a layer include a pressure sensitive adhesive layer or an adhesive layer for ensuring the adhesiveness, and a barrier layer.

[Barrier Layer]

In a case where the laminate of the present invention comprises a barrier layer, the barrier layer is provided between the polarizer according to the embodiment of the present invention and the λ/4 plate. Further, in a case where a layer other than the barrier layer (for example, a pressure sensitive adhesive layer or an adhesive layer) is comprised between the polarizer according to the embodiment of the present invention and the λ/4 plate, the barrier layer can be provided, for example, between the polarizer according to the embodiment of the present invention and the layer other than the barrier layer.

The barrier layer is also referred to as a gas barrier layer (oxygen barrier layer) and has a function of protecting the polarizer according to the embodiment of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] of JP2017-115076A, paragraphs [0010] to [0061] of JP2012-213938A, and paragraphs [0021] to [0031] of JP2005-169994A.

[Applications]

The laminate of the present invention can be used as a polarizing element (polarizing plate) or the like, for example, as a linear polarizing plate or a circularly polarizing plate. In a case where the laminate of the present invention does not include an optically anisotropic layer such as the λ/4 plate, the laminate can be used as a linear polarizing plate.

Meanwhile, in a case where the laminate of the present invention includes the λ/4 plate, the laminate can be used as a circularly polarizing plate.

[Image Display Device]

An image display device according to the embodiment of the present invention includes the above-described polarizer according to the embodiment of the present invention or the above-described laminate of the present invention.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, in the image display device of the present invention, a liquid crystal display device obtained by using a liquid crystal cell as a display element or an organic EL display device obtained by using an organic EL display panel as a display element is preferable, and a liquid crystal display device is more preferable.

[Liquid Crystal Display Device]

As a liquid crystal display device which is an example of the image display device according to the embodiment of the present invention, a form of a liquid crystal display device including the above-described polarizer according to the embodiment of the present invention and a liquid crystal cell is preferably exemplified. A liquid crystal display device including the above-described laminate of the present invention (here, the laminate does not include a λ/4 plate) and a liquid crystal cell is more suitable.

In the present invention, between the polarizing elements provided on both sides of the liquid crystal cell, it is preferable that the laminate of the present invention is used as a front-side polarizing element and more preferable that the laminate of the present invention is used as a front-side polarizing element and a rear-side polarizing element.

Hereinafter, the liquid crystal cell constituting the liquid crystal display device will be described in detail.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystalline molecules are substantially horizontally aligned at the time of no voltage application and further twisted aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystalline molecules are aligned substantially vertically at the time of no voltage application and substantially horizontally at the time of voltage application (described in JP1990-176625A (JP-H02-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

[Organic EL Display Device]

As an organic EL display device which is an example of the image display device according to the embodiment of the present invention, a form of a display device including the above-described polarizer according to the embodiment of the present invention, a λ/4 plate, and an organic EL display panel in this order from the viewing side is suitably exemplified.

A form of a display device including the above-described laminate of the present invention which includes a λ/4 plate and an organic EL display panel in this order from the viewing side is more suitably exemplified. In this case, the laminate is formed such that a base material, an alignment film, the polarizer according to the embodiment of the present invention, a barrier layer provided as necessary, and a λ/4 plate are disposed in this order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

Synthesis Example 1

The polymer liquid crystal compound L1 was synthesized by the following procedures.

<Synthesis of Compound (L1-2)>

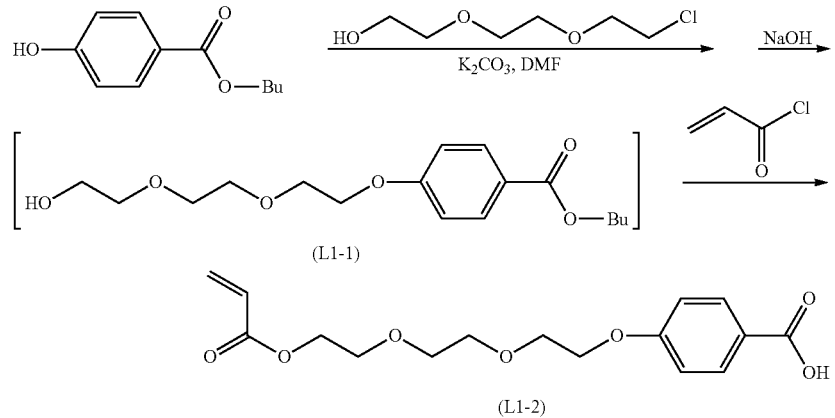

As shown in the scheme above, 2-chloroethoxyethoxyethanol (244 g) and potassium carbonate (200 g) were added to a solution (300 mL) of butylparaben (201 g) in N,N-dimethylformamide (DMF). The solution was stirred at 95° C. for 9 hours, toluene (262 mL) and water (660 mL) were added thereto, and concentrated hydrochloric acid (147 g) was added dropwise thereto. The reaction solution was stirred for 10 minutes, allowed to stand, and washed by performing a liquid separation operation. A 28 mass % sodium methoxide methanol solution (500 g) and water (402 mL) were added to the obtained organic layer, and the solution was stirred at 50° C. for 2 hours. Thereafter, the organic solvent was distilled off by concentration, water (402 mL) was added thereto, and the solution was concentrated again at 50° C. until the weight thereof reached 1.13 kg. Water (478 mL) was added to the obtained solution, and concentrated hydrochloric acid (278 g) was added dropwise thereto. Ethyl acetate (1.45 kg) was added thereto, and the solution was stirred at 30° C. for 10 minutes, and the aqueous layer was removed by performing the liquid separation operation. Next, a 20 mass % sodium chloride solution (960 mL) was added thereto, the solution was stirred at 30° C. for 10 minutes, and the aqueous layer was removed by performing the liquid separation operation. N-methylpyrrolidone (824 g) was added to the obtained organic layer, and a concentration operation was performed thereon at 70° C. for 4 hours to obtain 1.13 kg of a N-methylpyrrolidone solution containing a compound (L1-1) represented by Formula (L1-1). In the structural formula, Bu represents a butyl group.

The next step was performed using 1085 g of the obtained N-methylpyrrolidone solution containing the compound (L1-1).

N,N-dimethylaniline (189 g) and 2,2,6,6-tetramethylpiperazine (1.5 g) were added to the obtained N-methylpyrrolidone (NMP) solution (1085 g) containing the compound (L1-1), the internal temperature was lowered, and acrylic acid chloride (122 g) was added dropwise thereto such that the internal temperature did not rise above 10° C. The solution was stirred at an internal temperature of 10° C. for 2 hours, methanol (81 g) was added dropwise thereto, and the resulting solution was stirred for 30 minutes. Ethyl acetate (1.66 kg), 10 mass % sodium chloride solution (700 mL), and 1 N aqueous hydrochloric acid (840 mL) were added thereto, and the aqueous layer was removed by performing the liquid separation operation. Next, a 10 mass % sodium chloride solution (800 mL) was added thereto, the solution was stirred at 30° C. for 10 minutes, and the aqueous layer was removed by performing the liquid separation operation. Next, a 20 mass % sodium chloride solution (800 mL) was added thereto, the solution was stirred at 30° C. for 10 minutes, and the aqueous layer was removed by performing the liquid separation operation. A mixed solvent of hexane/isopropyl alcohol (1780 mL/900 mL) was added to the obtained organic layer, and the solution was cooled to 5° C., stirred for 30 minutes, and then filtered, thereby obtaining 209 g of a compound (L1-2) (yield of 65%) represented by Formula (L1-2) as a white solid.

Further, $^1$H-NMR (Nuclear Magnetic Resonance) of the obtained compound (L1-2) is shown below.

$^1$H-NMR (solvent: CDCl$_3$) δ (ppm): 3.67-3.78 (m, 6H), 3.87-3.92 (m, 2H), 4.18-4.23 (m, 2H), 4.31-4.35 (m, 2H), 5.80-5.85 (m, 1H), 6.11-6.19 (m, 1H), 6.40-6.46 (m, 1H), 6.93-6.98 (m, 2H), 8.02-8.07 (m, 2H)

<Synthesis of Compound (L1-3)>

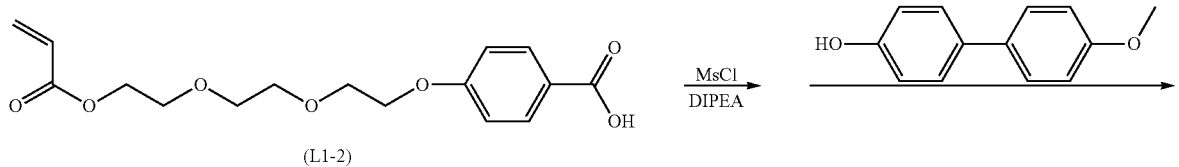

(L1-2)

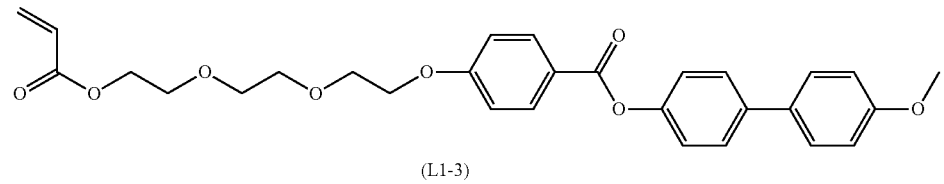

(L1-3)

As shown in the scheme above, dibutylhydroxytoluene (BHT) (200 mg) was added to a solution (70 mL) of methanesulfonyl chloride (MsCl) (73.4 mmol, 5.7 mL) in tetrahydrofuran (THF), and the internal temperature thereof was lowered to −5° C. A THF solution of the compound (L1-2) (66.7 mmol, 21.6 g) and diisopropylethylamine (DIPEA) (75.6 mmol, 13.0 mL) was added dropwise thereto such that the internal temperature thereof did not rise above 0° C. or higher. The solution was stirred at −5° C. for 30 minutes, N,N-dimethyl-4-aminopyridine (DMAP) (200 mg) was added thereto, and a solution of diisopropylethylamine (75.6 mmol, 13.0 mL) and 4-hydroxy-4'-methoxy biphenyl (60.6 mmol, 12.1 g) in tetrahydrofuran (THF) and dimethylacetamide (DMAc) was added dropwise thereto such that the internal temperature thereof did not rise above 0° C. or higher. Thereafter, the solution was stirred at room temperature for 4 hours. The reaction was stopped by adding methanol (5 mL) to the solution, water and ethyl acetate were added thereto. The solvent was removed from the organic layer extracted with ethyl acetate using a rotary evaporator, and the organic layer was purified by column chromatography using ethyl acetate and hexane, thereby obtaining 18.7 g of a compound (L1-3) (yield of 61%) represented by Formula (L1-3) as a white solid.

$^1$H-NMR of the obtained compound (L1-3) is shown below.

$^1$H-NMR (solvent: CDCl$_3$) δ (ppm): 3.65-3.82 (m, 6H), 3.85 (s, 3H), 3.85-3.95 (m, 2H), 4.18-4.28 (m, 2H), 4.28-4.40 (m, 2H), 5.82 (dd, 1H), 6.15 (dd, 1H), 6.43 (dd, 1H), 6.90-7.05 (m, 4H), 7.20-7.30 (m, 2H), 7.45-7.65 (m, 4H), 8.10-8.20 (m, 2H)

Further, the following compound (L1-b) was contained as an impurity.

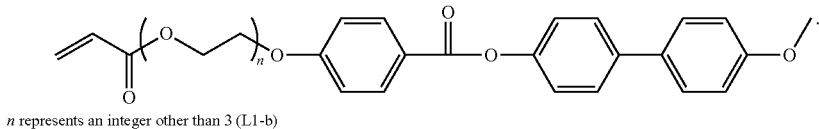

n represents an integer other than 3 (L1-b)

<Synthesis of Compound (L1-4)>

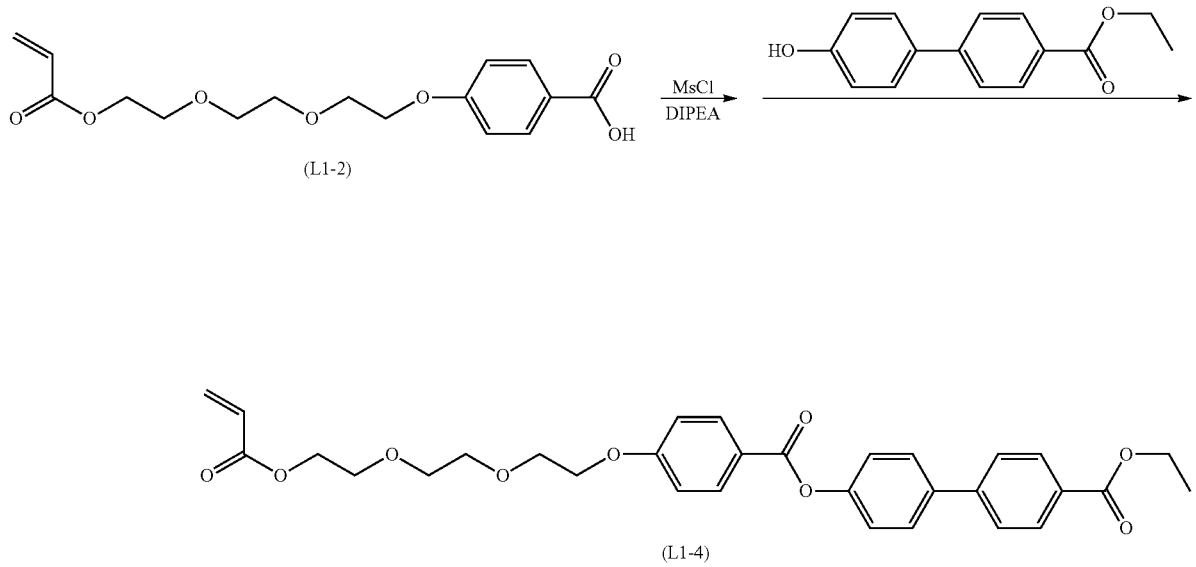

Ethyl 4-(4-hydroxyphenyl) benzoate used in the scheme shown above was synthesized by the method described in Macromolecules, 2002, 35, pp. 1663 to 1671.

As shown in the scheme above, 2,2,6,6-tetramethylpiperidine 1-oxyl (68 mg) was added to a solution of methanesulfonyl chloride (MsCl) (54.8 mmol, 6.27 g) in ethyl acetate (44 mL), and the internal temperature thereof was lowered to −5° C. A THF solution of the compound (P1-1) (52.6 mmol, 17.1 g) and diisopropylethylamine (DIPEA) (57.0 mol, 7.36 g) was added dropwise thereto such that the internal temperature thereof did not rise above 0° C. or higher. After the solution was stirred at −5° C. for 30 minutes, a solution of ethyl 4-(4-hydroxyphenyl) benzoate (43.8 mmol, 10.6 g) in DMAc and N-methyl-imidazole (NMI) (1.8 g) were added thereto, and diisopropylethylamine (75.6 mmol, 13.0 mL) was added dropwise thereto such that the internal temperature thereof did not rise above 0° C. or higher. Thereafter, the solution was stirred at room temperature for 4 hours. The reaction was stopped by adding water and ethyl acetate to the solution. Liquid separation was performed so that the solvent was removed from the organic layer extracted with ethyl acetate using a rotary evaporator, and the organic layer was purified by column chromatography using ethyl acetate and hexane, thereby obtaining 20.6 g (yield of 86%) of a compound (L1-4) represented by Formula (L1-4) as a white solid.

$^1$H-NMR of the obtained compound (L1-4) is shown below.

$^1$H-NMR (solvent: CDCl$_3$) δ (ppm): 1.41 (t, 3H), 3.68-3.80 (m, 6H), 3.88-3.95 (m, 2H), 4.20-4.27 (m, 2H), 4.31-4.38 (m, 2H), 4.41 (q, 2H), 5.83 (dd, 1H), 6.16 (dd, 1H), 6.43 (dd, 1H), 6.97-7.05 (m, 2H), 7.28-7.35 (m, 2H), 7.64-7.72 (m, 4H), 8.08-8.20 (m, 4H)

<Synthesis of Polymer Liquid Crystal Compound L1>

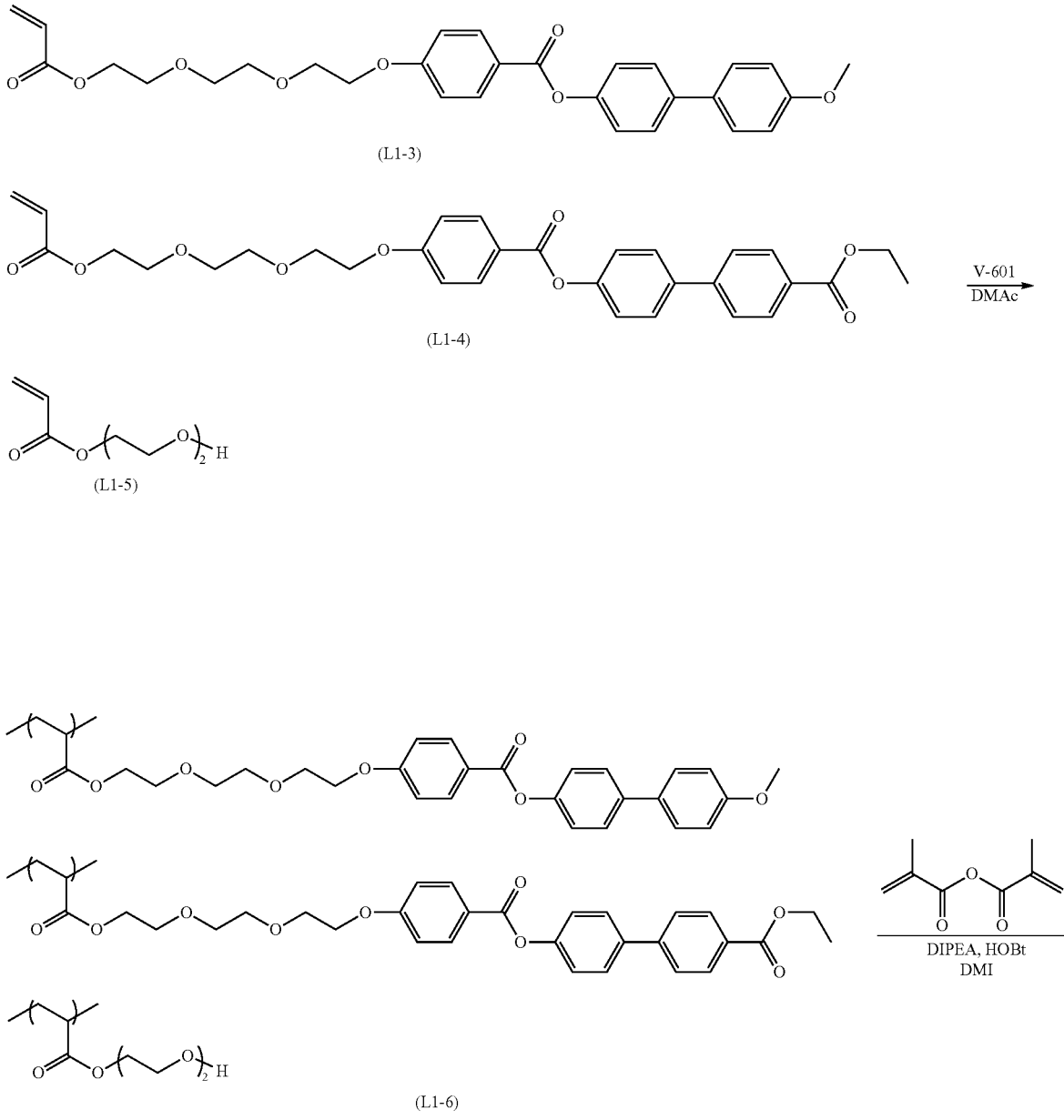

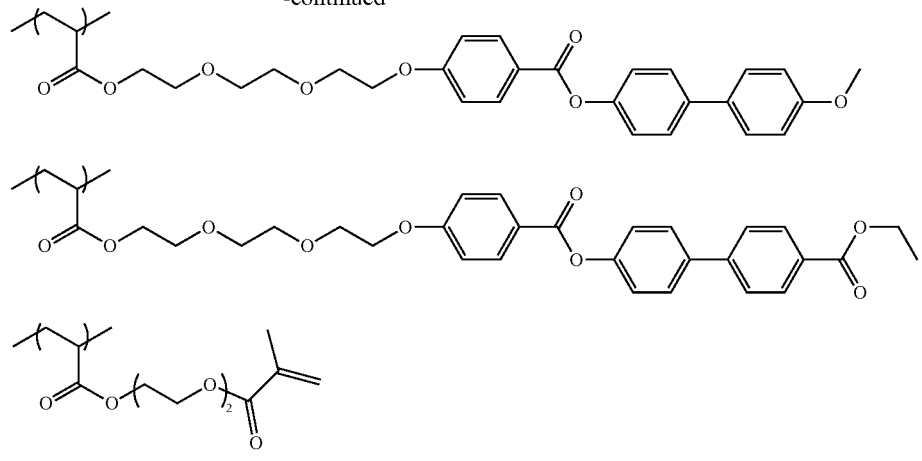

L1

The DMAc solution (10 mL) was heated to an internal temperature of 80° C. in a nitrogen stream. A mixed solution of the compound L1-3 (8.0 g), the compound L1-4 (1.6 g), a compound L1-5 (0.6 g), dimethyl 2,2'-azobis(2-methylpropionate) (0.12 g) (trade name, "V-601", manufactured by Wako Pure Chemical Industries, Ltd.) and DMAc (25 mL) was added dropwise thereto for 2 hours for the polymerization reaction at 80° C. After completion of the dropwise addition, a solution (1 mL) of dimethyl 2,2'-azobis(2-methylpropionate) (0.10 g) in DMAc was added thereto, and the solution was stirred at 90° C. for 1 hour. Thereafter, elimination of the polymerizable group was confirmed by $^1$H-NMR spectrum measurement, and the solution was cooled to room temperature. The reaction solution was added to methanol/water (volume ratio of 50/50), the precipitated solid was filtered, and the residue was washed with methanol/water (volume ratio of 50/50), thereby obtaining 9.8 g of a polymer liquid crystal compound (L1-6) represented by Formula (L1-6) as a white solid.

Next, 1.77 g of the obtained polymer liquid crystal compound (L1-6), 22.7 mg (0.15 mmol) of 2,2,6,6-tetramethylpiperidine 1-oxyl, and 5.34 g of 1,3-dimethylimidazolidinone were added to a 100 mL flask and heated to 40° C. while being stirred. 64.7 mg (0.48 mmol) of 1-hydroxybenzotriazole and 0.31 g (2.41 mmol) of N-ethyldiisopropylamine were added thereto and confirmed to be completely dissolved therein, 0.36 g (2.36 mmol) of a methacrylic anhydride was added thereto, and the resulting solution was washed with 0.27 g of 1,3-dimethylimidazolidinone (DMI). After dropwise addition, the solution was stirred at 40° C. for 6 hours, and it was confirmed by NMR whether the reaction was completed. The reaction solution was added dropwise to a mixed solvent of 20 mL of hexane and 20 mL of acetone while being stirred. The solution was stirred at room temperature for 60 minutes and filtered. The obtained crude product was added to 100 mL of acetone, and the mixture was stirred at 5° C. for 30 minutes and filtered.

The obtained crude product was added to 100 mL of acetone again, and the mixture was stirred at 5° C. for 30 minutes and filtered, thereby obtaining 1.62 g (91.5%) of a polymer liquid crystal compound L1 represented by Formula LL.

As a result of analysis performed on the obtained polymer liquid crystal compound L1 (2.0 g) by gel permeation chromatography (GPC), the weight-average molecular weight (Mw) thereof was 14000 (in terms of polystyrene) and the content of the components having a number average molecular weight (Mn) of 1000 or less was 3.4% by mass.

Further, the obtained polymer liquid crystal compound L1 was fractionated using a GPC for fractionation (LC-9130GNEXT, manufactured by Japan Analytic Industry Co., Ltd.) into L1-H (high-molecular-weight side) and L1-L (low-molecular-weight side).

In a case where these compounds were analyzed by gel permeation chromatography (GPC), the weight-average molecular weight (Mw) of L1-H was 14600, and the content of the components having a number average molecular weight (Mn) of 1000 or less was 0.09% by mass. Further, the weight-average molecular weight (Mw) of L1-L was 9000, and the content of the components having a number average molecular weight (Mn) of 1000 or less was 6.3% by mass.

Synthesis Example 2

A dichroic material Y1 was synthesized in the following manner.

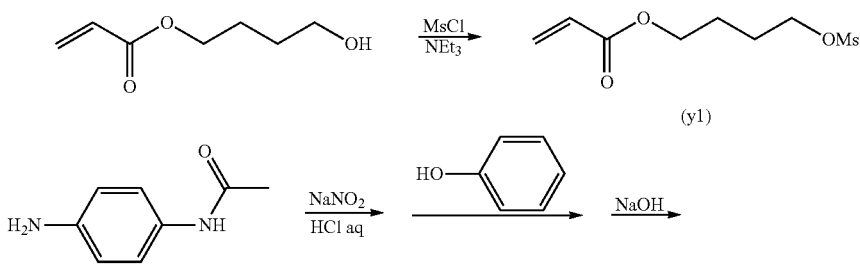

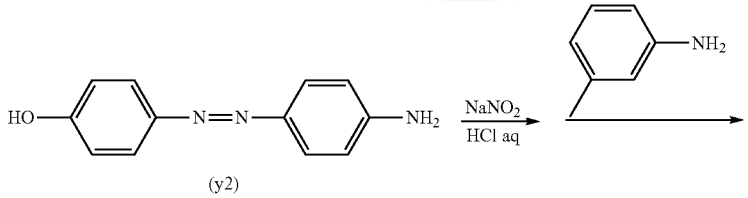

(y2)

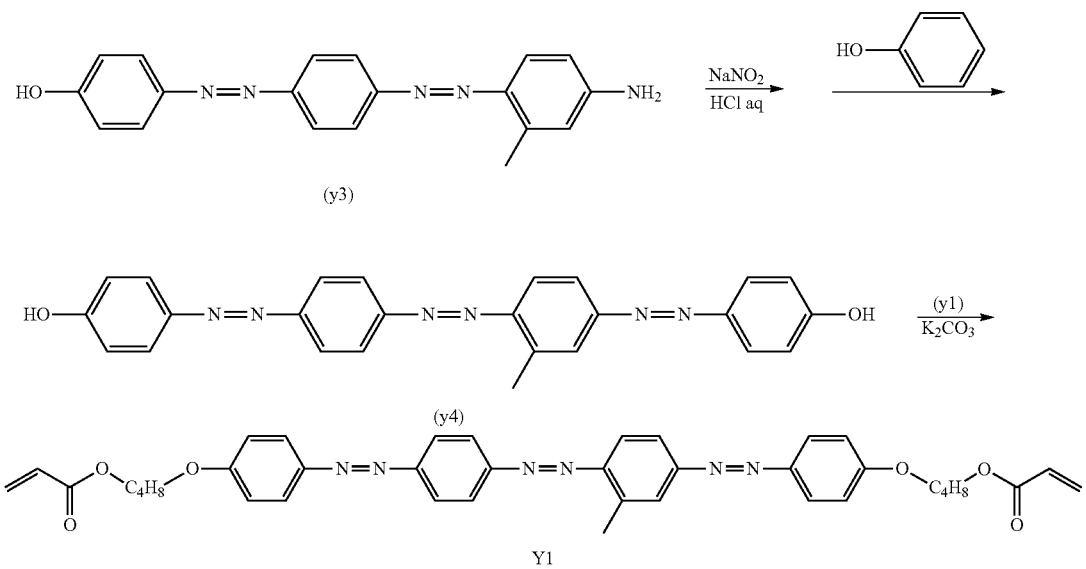

As shown in the scheme above, 4-hydroxybutyl acrylate (20 g) and mesyl chloride (16.8 g, MsCl) were dissolved in ethyl acetate (90 mL), and triethylamine (16.4 g, NEt$_3$) was added dropwise thereto while the solution was cooled in an ice bath. Thereafter, the resulting solution was stirred at room temperature for 2 hours, and 1 N HCl was added thereto to perform liquid separation. The obtained organic layer was distilled off under reduced pressure, thereby obtaining a compound (y1) (30 g) represented by Formula (y1).

Next, a compound (y2) (10 g) represented by Formula (y2) was synthesized according to the document (Chem. Eur. J. 2004. 10. 2011).

The compound (y2) (10 g) was dissolved in water (300 mL) and hydrochloric acid (17 mL), the solution was cooled in an ice bath, sodium nitrite (3.3 g) was added thereto, and the resulting solution was stirred for 30 minutes. Further, m-toluidine (5.1 g) was added thereto after amidosulfuric acid (0.5 g) was further added thereto, and the solution was stirred at room temperature for 1 hour. After the solution was stirred, the solid obtained by neutralization with hydrochloric acid was collected by suction filtration, thereby obtaining a compound (y3) (3.2 g).

The compound (y3) (1 g) was dissolved in a THF solution consisting of tetrahydrofuran (30 mL, THF), water (10 mL), and hydrochloric acid (1.6 mL), the solution was cooled in an ice bath, sodium nitrite (0.3 g) was added thereto, the resulting solution was stirred for 30 minutes, and amidosulfuric acid (0.5 g) was further added thereto. Separately, phenol (0.4 g) was dissolved in potassium carbonate (2.76 g) and water (50 mL), the solution was cooled in an ice bath, the above-described THF solution was added dropwise thereto, and the resulting solution was stirred at room temperature for 1 hour. After the solution was stirred, water (200 mL) was added, and the obtained compound (y4) (1.7 g) was suction-filtered.

The compound (y$^4$) (0.6 g), the compound (y1) (0.8 g), and potassium carbonate (0.95 g) were dissolved in DMAc (30 mL, dimethylacetamide) and the solution was stirred at 90° C. for 3.5 hours. After the solution was stirred, water (300 mL) was added thereto, the obtained solid was suction-filtered, thereby obtaining a dichroic material Y1 (0.3 g).

Synthesis Example 3

A dichroic material M1 was synthesized in the following manner.

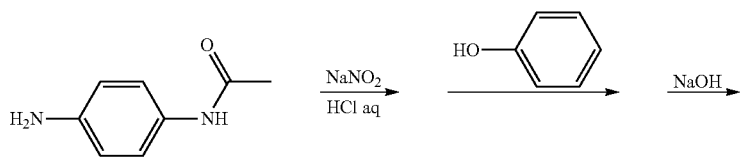

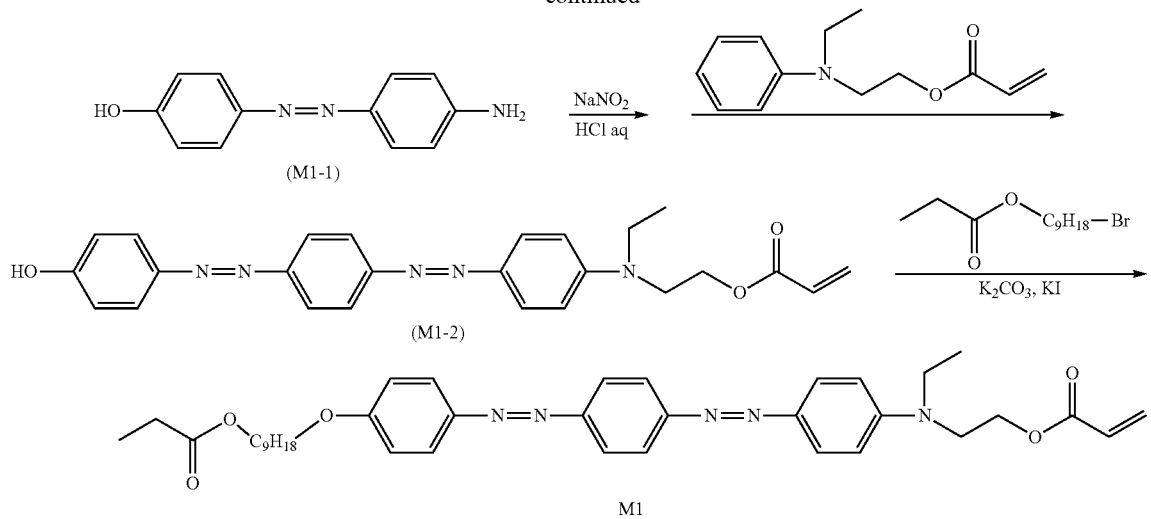

As shown in the scheme above, 100 ml of water was added to 27 g of p-acetylaminoaniline, and the solution was cooled to 0° C. and stirred. 66 ml of concentrated hydrochloric acid was added dropwise to the solution. Next, an aqueous solution obtained by dissolving 12.5 g of sodium nitrite (manufactured by Wako Pure Chemical Industries, Ltd.) in 30 ml of water was added dropwise thereto. The internal temperature was maintained at 0° C. to 5° C. After completion of the dropwise addition, the solution was stirred at 0° C. or lower for 1 hour to prepare a diazonium salt solution.

20 ml of methanol was added to 17.5 g of phenol, and the solution was stirred for dissolution. An aqueous solution obtained by dissolving 28.8 g of NaOH in 150 ml of water was added to the solution, and the solution was cooled to 0° C. and stirred. The diazonium salt solution prepared by the above-described method was added dropwise to the solution at 0° C. to 5° C. After completion of the dropwise addition, the solution was stirred at 5° C. for 1 hour and then stirred at room temperature for 1 hour to complete the reaction. Next, an aqueous solution obtained by dissolving 36.0 g of NaOH in 150 ml of water, and the solution was heated under reflux for 3 hours. After completion of the reaction, the solution was cooled to room temperature, an aqueous hydrochloric acid solution was added thereto so that the pH thereof was adjusted to 7.0, and the precipitated crystals were filtered, thereby obtaining 40.2 g of a compound (M1-1) (yield of 87.2%, brown crystals) represented by Formula (M1-1).

Further, N-ethyl-N-(2-acryloyloxyethyl)aniline was synthesized using N-ethylaniline as a raw material according to U.S. Pat. No. 7,601,849B and a known method.

100 ml of acetic acid, 10 ml of water, and 20 ml of methanol were added to 5.0 g of the compound (M1-1), and the solution was cooled to 0° C. and stirred. 7 ml of concentrated hydrochloric acid was added dropwise to the solution. Next, an aqueous solution obtained by dissolving 1.8 g of sodium nitrite in 5 ml of water was added dropwise thereto. The internal temperature was maintained at 0 to 5° C. After completion of the dropwise addition, the solution was stirred at 0° C. or lower for 1 hour to prepare a diazonium salt solution.

7.7 g of sodium acetate, 100 ml of methanol, and 100 ml of water were added to 8.4 g of N-ethyl-N-(2-acryloyloxyethyl)aniline synthesized above, and the solution was stirred for dissolution, cooled to 0° C., and stirred. The diazonium salt solution prepared by the above-described method was added dropwise to the solution at 0° C. to 5° C. After completion of the dropwise addition, the solution was stirred at 5° C. for 1 hour and then stirred at room temperature for 1 hour to complete the reaction. The precipitated crystals were separated by filtration, thereby obtaining 6.2 g of a compound (M1-2) (yield of 86.8%, brown crystals) represented by Formula (M1-2).

50.0 g of 1-bromononanol was dissolved in 500 ml of ethyl acetate, 26.5 g of triethylamine was added dropwise thereto, and the resulting solution was stirred at 5° C. 22.8 g of propionyl chloride was added dropwise thereto, the solution was stirred at room temperature for 1 hour to complete the reaction. After the completion of the reaction, 175 ml of water was added thereto, the solution was subjected to liquid separation, and 10 g of magnesium sulfate was added to the organic layer for dehydration. The obtained organic layer was concentrated using a rotary evaporator, thereby obtaining 9-bromononyl propionate (52 g, colorless transparent liquid).

72 ml of dimethylacetamide was added to the compound (M1-2) (7.2 g), potassium carbonate (7.7 g, 0.014 mmol), and potassium iodide (0.15 g, 0.002 mol), and the solution was heated to 80° C. and stirred. 8.4 g of 9-bromononyl propionate synthesized above was added dropwise to the solution. After the dropwise addition, the solution was heated to 80° C. and stirred for 4 hours to complete the reaction. After the completion of the reaction, the reaction solution was poured into water, and the precipitated crystals were filtered and washed with water. The crystals were separated and purified by silica gel column chromatography (as an eluent, chloroform, and chloroform and ethyl acetate at a ratio of 50/1 were used in this order). Methanol was added to the residues, the precipitated crystals were filtered, and the resultant was washed with methanol and dried. In this manner, 5.5 g of a dichroic material M1 (orange crystals) was obtained.

$^1$H-NMR of the obtained dichroic material M1 is shown below.

$^1$H-NMR (solvent: CDCl$_3$) δ (ppm): 1.13 (t, 3H), 1.25 (t, 3H), 1.29 (br-s, 8H), 1.49 (m, 2H), 1.64 (m, 2H), 1.82 (m, 2H), 2.33 (q, 2H), 2.53 (m, 2H), 2.73 (t, 2H), 4.03 (q, 4H), 4.38 (t, 2H), 5.86 (d, 1H), 6.12 (dd, 1H), 6.43 (d, 1H), 6.83 (d, 2H), 7.00 (d, 2H), 7.94 (m, 8H)

Synthesis Example 4

A dichroic material C1 was synthesized in the following manner.

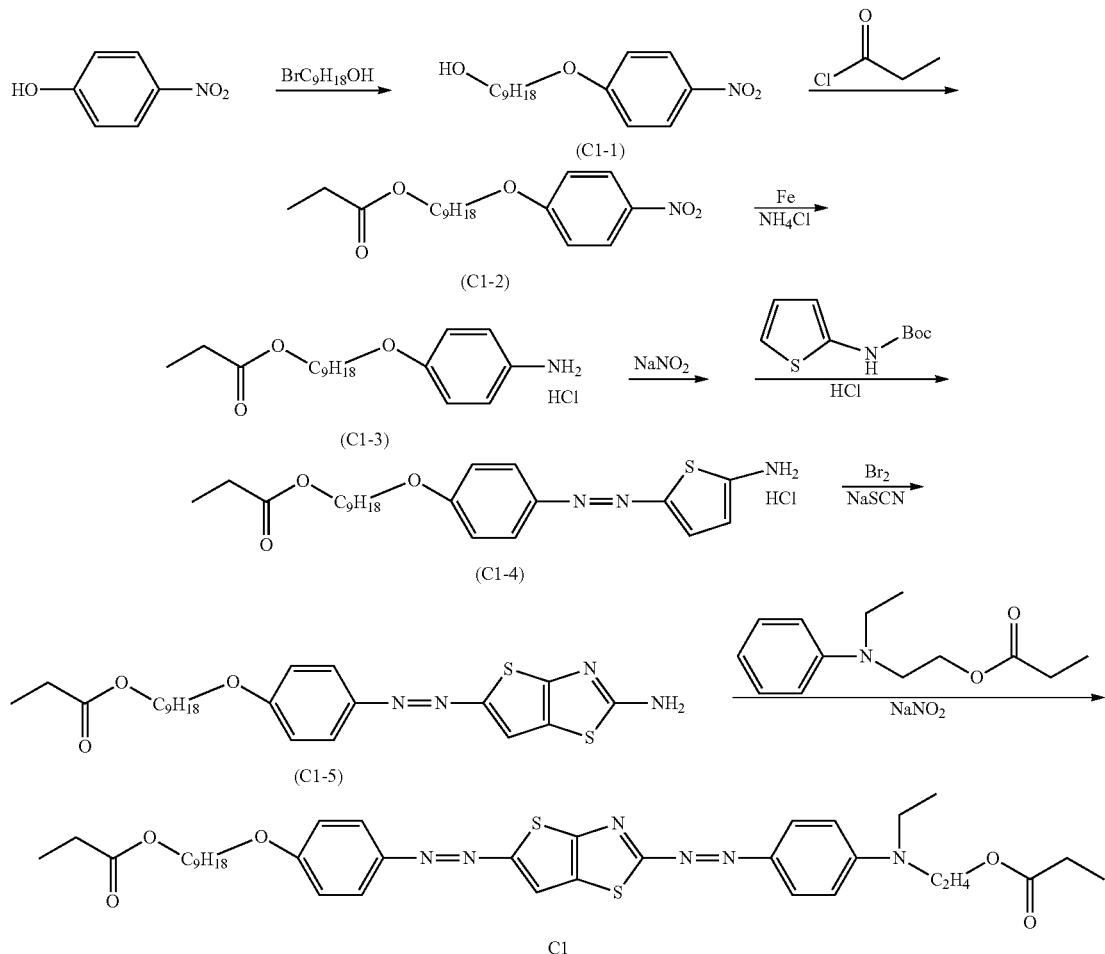

As shown in the scheme above, 12.6 g of 4-nitrophenol, 20.0 g of 9-bromononanol, and 13.8 g of potassium carbonate were dissolved in 30 ml of N,N-dimethylacetamide (DMAc), and the solution was stirred at an external temperature of 105° C. for 2 hours. The temperature was lowered to room temperature, the solution was subjected to liquid separation and then washed with an ethyl acetate/10% ammonium chloride aqueous solution. The organic layer was dried over magnesium sulfate and then concentrated using a rotary evaporator, thereby obtaining a brown liquid (C1-1) represented by Formula (C1-1).

Next, 25 ml of DMAc was added to the obtained brown liquid (C1-1), and the solution was stirred in an ice bath. The temperature of the reaction system was maintained at 15° C. or lower, 9.5 g of propionic acid chloride was added dropwise thereto, and the resulting solution was stirred at room temperature for 1 hour after the dropwise addition. An ethyl acetate/10% ammonium chloride aqueous solution was added thereto, and the solution was subjected to liquid separation and then washed. The organic layer was dried over magnesium sulfate and then concentrated using a rotary evaporator, thereby obtaining a brown solid (C1-2) represented by Formula (C1-2).

15.2 g of Fe powder, 7.2 g of ammonium chloride, 20 ml of 2-propanol, and 10 ml of water were mixed and refluxed at an external temperature of 105° C. The brown solid (C1-2) which had been heated and dissolved in 30 ml of ethyl acetate was added dropwise to the refluxed system. After completion of the dropwise addition, the solution was allowed to react for 30 minutes under reflux. The solution was cooled to room temperature, iron powder was removed by Celite filtration, the filtrate was separated into ethyl acetate and water, and the organic layer was washed with water three times.

The organic layer was concentrated using a rotary evaporator, and 15 ml of tetrahydrofuran (THF) and 15 ml of ethyl acetate were added thereto. A mixed solution of 240 ml of water and 20 ml of concentrated hydrochloric acid was added dropwise to the solution, thereby obtaining 15.3 g of a compound (C1-3) represented by Formula (C1-3).

$^1$H-NMR of the obtained compound (C1-3) is shown below.

$^1$H-NMR (solvent: CDCl$_3$) δ (ppm): 1.03 (t, 3H), 1.25-1.48 (m, 11H), 1.58 (m, 2H), 1.71 (m, 2H), 2.30 (m, 2H), 3.97 (m, 4H), 7.01 (d, 2H), 7.29 (d, 2H), 10.04 (br-s, 3H)

2-Aminothiophene hydrochloride was synthesized by 2-nitrothiophene according to the method described in the document (Journal of Medicinal Chemistry, 2005, Vol. 48, p. 5794).

6.2 g of the compound (C1-3) obtained in the above-described manner was added to a mixed solution of 15 ml of 12 mol/L hydrochloric acid, 30 ml of water, and 30 ml of THF, the solution was cooled to an internal temperature of 5° C. or lower, and 1.4 g of sodium nitrite was dissolved in 9 ml of water and added dropwise to the solution. The solution was stirred at an internal temperature of 5° C. or lower for 1 hour to prepare a diazonium solution.

Next, 2.4 g of 2-aminothiophene hydrochloride was dissolved in 12 ml of water and 6 ml of hydrochloric acid, and the diazonium solution prepared in the above-described manner was added dropwise at an internal temperature of 0° C. The reaction solution was heated to room temperature and stirred for 2 hours. The precipitated solid was separated by filtration and dried, thereby obtaining 6.3 g of a reddish orange solid (C1-4) represented by Formula (C14). Further, in the formula, "Boc" represents a tert-butoxycarbonyl group.

$^1$H-NMR of the obtained reddish orange solid (C1-4) is shown below.

$^1$H-NMR (solvent: CDCl$_3$) δ (ppm): 1.01 (t, 3H), 1.29-1.40 (m, 11H), 1.55 (m, 2H), 1.69 (m, 21H), 2.29 (m, 2H), 3.17 (s, 2H), 3.97 (m, 4H), 6.88 (br-s, 1H), 6.97 (d, 2H), 7.39 (d, 2H), 7.85 (m, 1H)

5.6 g of the reddish orange solid (C1-4) obtained in the above-described manner was suspended and dissolved in 100 ml of acetic acid, and 1.5 g of sodium thiocyanate was added thereto at room temperature. 2.0 g of bromine was added dropwise to the solution while the solution was water-cooled and the internal temperature was maintained at 20° C. or lower.

After the resulting solution was stirred at room temperature for 2 hours, 100 ml of water was added thereto, and the obtained solid was separated by filtration and dried, thereby obtaining 5.3 g of a black solid (C1-5) represented by Formula (C1-5).

$^1$H-NMR of the obtained black solid (C1-5) is shown below.

$^1$H-NMR (solvent: CDCl$_3$) δ (ppm): 1.14 (t, 3H), 1.30-1.50 (m, 11H), 1.60 (m, 6H), 1.81 (m, 2H), 2.32 (q, 2H), 4.04 (m, 4H), 5.31 (br, 2H), 6.95 (d, 2H), 7.66 (s, 1H), 7.78 (d, 2H)

4.7 g of the black solid (C1-5) obtained in the above-described manner was added to 6 ml of hydrochloric acid and 6 ml of acetic acid, 5 ml of an aqueous solution containing 0.72 g of sodium nitrite was added dropwise thereto at 0° C. or lower under ice-cooling, the solution was stirred for 1 hour, and 0.52 mg of amidosulfuric acid was added thereto, thereby obtaining a diazonium solution.

The diazonium solution was added dropwise to a 10 ml methanol solution containing 2.2 g of N-ethyl-N-(2-acryloyloxyethyl)aniline while the methanol solution was maintained at 0° C. or lower. After the solution was heated to room temperature and stirred for 1 hour, 30 ml of water was added thereto, and the obtained solid was separated by filtration. The resultant was purified by a column, thereby obtaining 0.6 g of a dichroic material C1 (black green solid). Further, N-ethyl-N-(2-propionoxy)ethylaniline was synthesized using N-ethylaniline as a raw material according to U.S. Pat. No. 7,601,849B and a known method.

$^1$H-NMR of the obtained dichroic material C1 is shown below.

$^1$H-NMR (solvent: CDCl$_3$) δ (ppm): 1.13 (m, 6H), 1.25-1.52 (m, 15H), 1.82 (m, 2H), 2.35 (m, 4H), 3.54 (m, 2H), 3.72 (m, 2H), 4.08 (m, 4H), 4.31 (m, 2H), 6.81 (d, 2H), 7.00 (d, 2H), 7.86 (m, 3H) 7.94 (d, 2H)

Example 1-1

<Preparation of Alignment Film>

A TAC base material (TG40, manufactured by Fujifilm Corporation) subjected to a saponification treatment and having a thickness of 40 μm was coated with an alignment film coating solution 1 having the following composition using a #17 wire bar.

Thereafter, the base material was dried with warm air at 110° C. for 2 minutes, thereby obtaining a polyvinyl alcohol (PVA) alignment film on the TAC base material.

Further, modified polyvinyl alcohol was added to the alignment film coating solution such that the concentration of solid contents was set to 4 wt %.

Composition of Alignment Film Coating Solution

Modified vinyl alcohol (PVA-1 shown below): 4.00 parts by mass

Water: 74.08 parts by mass

Methanol: 21.86 parts by mass

Photopolymerization initiator (IRGACURE 2959, manufactured by BASF SE): 0.06 parts by mass Modified Polyvinyl Alcohol

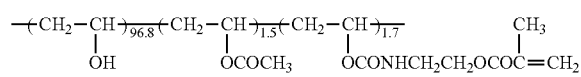

<Preparation of Polarizer>

The obtained alignment film was subjected to a rubbing treatment (roller rotation speed: 1000 rotations/spacer thickness of 1.8 mm, stage speed of 1.8 m/min) once and coated with the following polarizer-forming composition 1A using a #7 wire bar, thereby forming a coating film.

Next, the coating film 1 was heated at 140° C. for 40 seconds, and the coating film 1 was cooled to room temperature (23° C.).

Next, the coating film 1 was heated at 85° C. for 10 seconds and cooled to room temperature again.

Thereafter, the coating film 1 was irradiated under an irradiation condition of an illuminance of 28 mW/cm$^2$ for 60 seconds using a high-pressure mercury lamp, thereby preparing a polarizer 1A on the alignment film 1.

Composition of Polarizer-Forming Composition 1A

Liquid crystal compound L1-H shown below: 4.574 parts by mass

Liquid crystal compound L1-L shown below: 0.051 parts by mass

Dichroic material Y1 shown below: 0.198 parts by mass

Dichroic material M1 shown below: 0.330 parts by mass

Dichroic material C1 shown below: 0.727 parts by mass

Surfactant F1 shown below: 0.067 parts by mass

Polymerization initiator I1 (IRGACURE 819, manufactured by BASF SE): 0.053 parts by mass Tetrahydrofuran: 51.700 parts by mass Cyclopentanone: 42.300 parts by mass

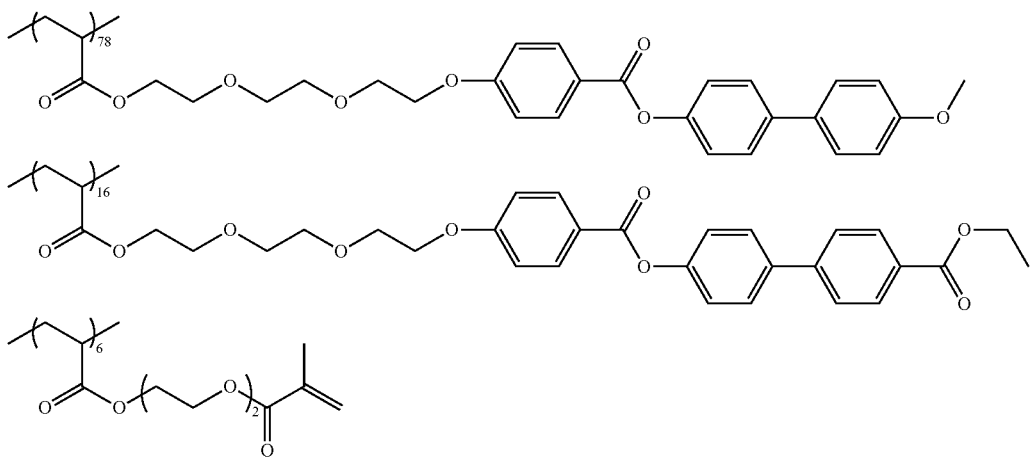
L1

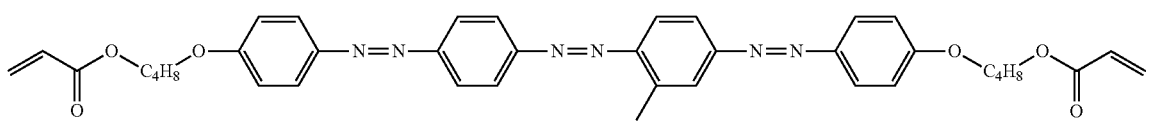
Y1

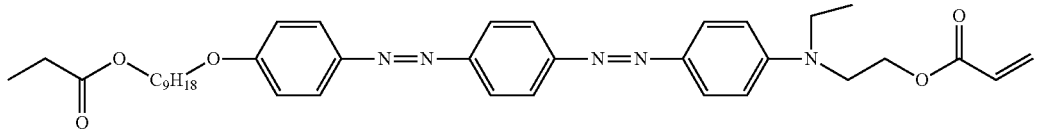
M1

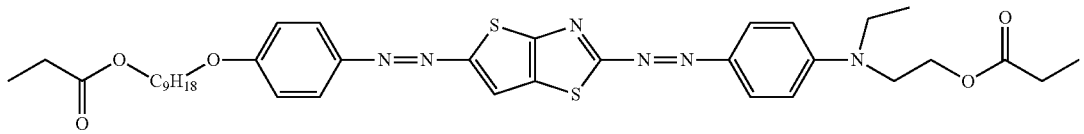
C1

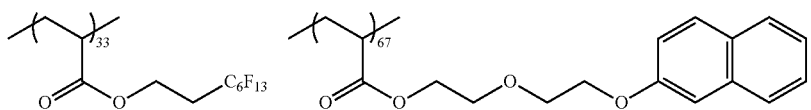
F1

Example 1-2

A polarizer 1B was prepared in the same manner as in Example 1-1 except that the composition of the polarizer-forming composition 1A was changed to the composition listed in Table 1 below.

Comparative Example 1-1

A polarizer 1C was prepared in the same manner as in Example 1-1 except that the composition of the polarizer-forming composition 1A was changed to the composition listed in Table 1 below.

Comparative Example 1-2

A polarizer 1D was prepared in the same manner as in Example 1-1 except that the composition of the polarizer-forming composition 1A was changed to the composition listed in Table 1 below.

Examples 2-1 and 2-2 and Comparative Examples 2-1 and 2-2

Each of polarizers 2A to 2D was prepared in the same manner as in Example 1-1 except that the composition of the polarizer-forming composition 1A was changed to the composition listed in Table 1 below.

Examples 3-1 and 3-2 and Comparative Examples 3-1 and 3-2

Each of polarizers 3A to 3D was prepared in the same manner as in Example 1-1 except that the composition of the polarizer-forming composition 1A was changed to the composition listed in Table 1 below.

Examples 4-1 and 4-2 and Comparative Examples 4-1 and 4-2

Each of polarizers 4A to 4D was prepared in the same manner as in Example 1-1 except that the composition of the polarizer-forming composition 1A was changed to the composition listed in Table 1 below.

Examples 5-1 and 5-2 and Comparative Examples 5-1 and 5-2

Each of polarizers 5A to 5D was prepared in the same manner as in Example 1-1 except that the composition of the polarizer-forming composition 1A was changed to the composition listed in Table 1 below.

Examples 6-1 and 6-2 and Comparative Examples 6-1 and 6-2

Each of polarizers 6A to 6D was prepared in the same manner as in Example 1-1 except that the composition of the polarizer-forming composition 1A was changed to the composition listed in Table 1 below.

Examples 7-1 and 7-2 and Comparative Examples 7-1 and 7-2

Each of polarizers 7A to 7D was prepared in the same manner as in Example 1-1 except that the composition of the polarizer-forming composition 1A was changed to the composition listed in Table 1 below.

Examples 8-1 and 8-2 and Comparative Examples 8-1 and 8-2

Each of polarizers 8A to 8D was prepared in the same manner as in Example 1-1 except that the composition of the polarizer-forming composition 1A was changed to the composition listed in Table 1 below.

Examples 9-1 and 9-2 and Comparative Examples 9-1 and 9-2

Each of polarizers 9A to 9D was prepared in the same manner as in Example 1-1 except that the composition of the polarizer-forming composition 1A was changed to the composition listed in Table 1 below.

[Content of Component Having Number Average Molecular Weight (Mn) of 1000 or Less]

The high-molecular-weight side and low-molecular-weight side of each polymer liquid crystal compound used in the examples and the comparative examples, which had been fractionated by GPC for fractionation, were mixed so as to have the same proportions as in the columns of parts by mass listed in Table 1, thereby obtaining 500 mg of a mixture.

The obtained mixture was dissolved in 500 mL of tetrahydrofuran to prepare a sample.

The obtained sample was measured by a gel permeation chromatography (GPC) method under the following conditions, an integrated value of a number average molecular weight of 1000 or less was calculated from the molecular weight distribution curve of the number average molecular weight, and the integrated value was set as the content of the component having a number average molecular weight of 1000 or less. The results are listed in Table 1.

Solvent (eluent): tetrahydrofuran
Equipment name: TOSOH HLC-8220GPC
Column: Connect and use TOSOH TSKgel Super HZM-H, HZ4000, and HZ2000
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

[Evaluation]

<Degree of Alignment>

Each polarizer in the examples and the comparative examples was set on a sample table in a state in which a linear polarizer was inserted on a light source side of an optical microscope (product name, "ECLIPSE E600 POL", manufactured by Nikon Corporation), the absorbance of the polarizer in a wavelength range of 380 nm to 780 nm was measured at a pitch of 1 nm using a multi-channel spectrometer (product name, "QE65000", manufactured by Ocean Optics, Inc.), and the degrees of alignment in a wavelength range of 400 nm to 700 nm was calculated according to the following equation. The results are listed in Table 1.

Degree of alignment: $S=((Az0/Ay0)-1)/((Az0/Ay0)+2)$

Az0: Absorbance of dye film with respect to polarized light in absorption axis direction Ay0: Absorbance of dye film with respect to polarized light in polarization axis direction In the equation described above, "Az0" represents the absorbance of the polarizer with respect to polarized light in the absorption axis direction, and "Ay0" represents the absorbance of the polarizer with respect to polarized light in the polarization axis direction.

<Heat Resistance>

Each polarizer in the examples and the comparative examples was set on a sample table in a state in which a linear polarizer was inserted on a light source side of an optical microscope (product name, "ECLIPSE E600 POL", manufactured by Nikon Corporation), and the haze was visually evaluated. Further, each polarizer was heated at 80° C. for 5 minutes, and the haze was evaluated according to the same method as described above. The results are listed in Table 1.

A: Haze was not visually recognized on the entire surface.
B: A small amount of haze was visually recognized on a part of the surface.
C: A small amount haze was visually recognized on the entire surface or turbidity was visually recognized on a part of the surface.
D: Turbidity was visually recognized on the entire surface.

TABLE 1

| | | Polymer liquid crystal compound | | | | | | | | | | |
|---|---|---|---|---|---|---|---|---|---|---|---|---|
| | | High-molecular-weight side | | | Low-molecular-weight side | | | | | First dichroic material | | Second dichroic material |
| | Polarizer | Type | Mw | Content of component having Mn of 1000 or less | Parts by mass | Type | MW | Content of component having Mn of 1000 or less | Parts by mass | Content of component having Mn of 1000 or less | Type | Parts by mass | Type | Parts by mass |
| Example 1-1 | 1A | L1-H | 14600 | 0.09% | 4.574 | L1-L | 9000 | 6.3% | 0.051 | 0.16% | Y1 | 0.198 | M1 | 0.330 |
| Example 1-2 | 1B | L1-H | 14600 | 0.09% | 3.370 | L1-L | 9000 | 6.3% | 1.255 | 1.8% | Y1 | 0.198 | M1 | 0.330 |
| Comparative Example 1-1 | 1C | L1-H | 14600 | 0.09% | 4.625 | L1-L | 9000 | 6.3% | 0.000 | 0.09% | Y1 | 0.198 | M1 | 0.330 |
| Comparative Example 1-2 | 1D | L1-H | 14600 | 0.09% | 0.653 | L1-L | 9000 | 6.3% | 3.972 | 5.5% | Y1 | 0.198 | M1 | 0.330 |

TABLE 1-continued

| | | | | | | | | | | | | | | |
|---|---|---|---|---|---|---|---|---|---|---|---|---|---|---|
| Example 2-1 | 2A | L2-H | 15000 | 0.08% | 4.402 | L2-L | 8700 | 5.8% | 0.093 | 0.2% | Y3 | 0.397 | M2 | 0.264 |
| Example 2-2 | 2B | L2-H | 15000 | 0.08% | 3.240 | L2-L | 8700 | 5.8% | 1.256 | 1.7% | Y3 | 0.397 | M2 | 0.264 |
| Comparative Example 2-1 | 2C | L2-H | 15000 | 0.08% | 4.495 | L2-L | 8700 | 5.8% | 0.000 | 0.08% | Y3 | 0.397 | M2 | 0.264 |
| Comparative Example 2-2 | 2D | L2-H | 15000 | 0.08% | 0.605 | L2-L | 8700 | 5.8% | 3.891 | 5.1% | Y3 | 0.397 | M2 | 0.264 |
| Example 3-1 | 3A | L3-H | 17400 | 0.09% | 4.231 | L3-L | 8700 | 5.8% | 0.239 | 0.4% | Y1 | 0.432 | M5 | 0.372 |
| Example 3-2 | 3B | L3-H | 17400 | 0.09% | 3.152 | L3-L | 8700 | 5.8% | 1.318 | 1.8% | Y1 | 0.432 | M5 | 0.372 |
| Comparative Example 3-1 | 3C | L3-H | 17400 | 0.09% | 4.470 | L3-L | 8700 | 5.8% | 0.000 | 0.09% | Y1 | 0.432 | M5 | 0.372 |
| Comparative Example 3-2 | 3D | L3-H | 17400 | 0.09% | 0.532 | L3-L | 8700 | 5.8% | 3.938 | 5.2% | Y1 | 0.432 | M5 | 0.372 |
| Example 4-1 | 4A | L4-H | 17400 | 0.09% | 4.290 | L4-L | 9000 | 5.3% | 0.177 | 0.3% | Y1 | 0.441 | M1 | 0.350 |
| Example 4-2 | 4B | L4-H | 17400 | 0.09% | 2.857 | L4-L | 9000 | 5.3% | 1.610 | 2.0% | Y1 | 0.441 | M1 | 0.350 |
| Comparative Example 4-1 | 4C | L4-H | 17400 | 0.09% | 4.467 | L4-L | 9000 | 5.3% | 0.000 | 0.09% | Y1 | 0.441 | M1 | 0.350 |
| Comparative Example 4-2 | 4D | L4-H | 17400 | 0.09% | 0.244 | L4-L | 9000 | 5.3% | 4.222 | 5.1% | Y1 | 0.441 | M1 | 0.350 |
| Example 5-1 | 5A | L1-H | 14600 | 0.09% | 4.252 | L2-L | 8700 | 5.8% | 0.410 | 0.6% | Y2 | 0.165 | M4 | 0.295 |
| Example 5-2 | 5B | L1-H | 14600 | 0.09% | 3.207 | L2-L | 8700 | 5.8% | 1.455 | 1.9% | Y2 | 0.165 | M4 | 0.295 |
| Comparative Example 5-1 | 5C | L1-H | 14600 | 0.09% | 4.662 | L2-L | 8700 | 5.8% | 0.000 | 0.09% | Y2 | 0.165 | M4 | 0.295 |
| Comparative Example 5-2 | 5D | L1-H | 14600 | 0.09% | 0.393 | L2-L | 8700 | 5.8% | 4.264 | 5.4% | Y2 | 0.164 | M4 | 0.295 |
| Example 6-1 | 6A | L3-H | 17400 | 0.09% | 4.328 | L1-L | 9000 | 6.3% | 0.301 | 0.5% | Y3 | 0.301 | M5 | 0.240 |
| Example 6-2 | 6B | L3-H | 17400 | 0.09% | 3.079 | L1-L | 9000 | 6.3% | 1.550 | 2.2% | Y3 | 0.301 | M5 | 0.240 |
| Comparative Example 6-1 | 6C | L3-H | 17400 | 0.09% | 4.629 | L1-L | 9000 | 6.3% | 0.000 | 0.09% | Y3 | 0.301 | M3 | 0.240 |
| Comparative Example 6-2 | 6D | L3-H | 17400 | 0.09% | 0.654 | L1-L | 9000 | 6.3% | 3.975 | 5.5% | Y3 | 0.301 | M5 | 0.240 |
| Example 7-1 | 7A | L4-H | 17400 | 0.09% | 4.588 | L3-L | 8700 | 5.8% | 0.089 | 0.2% | Y1 | 0.200 | M3 | 0.334 |
| Example 7-2 | 7B | L4-H | 17400 | 0.09% | 3.217 | L3-L | 8700 | 5.8% | 1.459 | 1.9% | Y1 | 0.200 | M3 | 0.334 |
| Comparative Example 7-1 | 7C | L4-H | 17400 | 0.09% | 4.677 | L3-L | 8700 | 5.8% | 0.000 | 0.09% | Y1 | 0.200 | M3 | 0.334 |
| Comparative Example 7-2 | 7D | L4-H | 17400 | 0.09% | 0.637 | L3-L | 8700 | 5.8% | 4.040 | 5.10% | Y1 | 0.200 | M3 | 0.334 |
| Example 8-1 | 8A | L5-H | 15000 | 0.08% | 4.853 | L5-L | 10000 | 5.3% | 0.065 | 0.15% | Y1 | 0.219 | M3 | 0.219 |
| Example 8-2 | 8B | L5-H | 15000 | 0.08% | 3.507 | L5-L | 10000 | 5.3% | 1.410 | 1.6% | Y1 | 0.219 | M3 | 0.219 |
| Comparative Example 8-1 | 8C | L5-H | 15000 | 0.08% | 4.918 | L5-L | 10000 | 5.3% | 0.000 | 0.08% | Y1 | 0.219 | M3 | 0.219 |
| Comparative Example 8-2 | 8D | L5-H | 15000 | 0.09% | 0.260 | L5-L | 10000 | 5.3% | 4.658 | 5.1% | Y1 | 0.219 | M3 | 0.219 |
| Example 9-1 | 9A | L6-H | 19000 | 0.08% | 4.257 | L6-L | 9000 | 6.5% | 0.046 | 0.15% | Y3 | 0.380 | M1 | 0.253 |
| Example 9-2 | 9B | L6-H | 19000 | 0.08% | 3.302 | L6-L | 9000 | 6.5% | 1.002 | 1.6% | Y3 | 0.380 | M1 | 0.253 |
| Comparative Example 9-1 | 9C | L6-H | 19000 | 0.08% | 4.303 | L6-L | 9000 | 6.5% | 0.000 | 0.08% | Y3 | 0.380 | M1 | 0.253 |
| Comparative Example 9-2 | 9D | L6-H | 19000 | 0.08% | 0.980 | L6-L | 9000 | 6.5% | 3.324 | 5.1% | Y3 | 0.380 | M1 | 0.253 |

| | Third dichroic material | | Surfactant | | Polymerization initiator | | Tetrahydrofuran Parts by mass | Cyclopentanone Parts by mass | Degree of alignment | Heat resistance | | |
|---|---|---|---|---|---|---|---|---|---|---|---|---|
| | | | | | | | | | | Temperature for heat resistance test | Haze | |
| | Type | Parts by mass | Type | Parts by mass | Type | Parts by mass | | | | | Before heating | After heating |
| Example 1-1 | C1 | 0.727 | F1 | 0.067 | I1 | 0.053 | 51.700 | 42.300 | 0.964 | 80° C. | A | A |
| Example 1-2 | C1 | 0.727 | F1 | 0.067 | I1 | 0.053 | 51.700 | 42.300 | 0.964 | 80° C. | A | B |
| Comparative Example 1-1 | C1 | 0.727 | F1 | 0.067 | I1 | 0.053 | 51.700 | 42.300 | 0.957 | 80° C. | A | A |
| Comparative Example 1-2 | C1 | 0.727 | F1 | 0.067 | I1 | 0.053 | 51.700 | 42.300 | 0.951 | 80° C. | B | D |
| Example 2-1 | C1 | 0.727 | F2 | 0.063 | I1 | 0.054 | 51.700 | 42.300 | 0.959 | 85° C. | A | A |
| Example 2-2 | C1 | 0.727 | F2 | 0.063 | I1 | 0.054 | 51.700 | 42.300 | 0.957 | 85° C. | B | C |
| Comparative Example 2-1 | C1 | 0.727 | F2 | 0.063 | I1 | 0.054 | 51.700 | 42.300 | 0.950 | 85° C. | A | A |
| Comparative Example 2-2 | C1 | 0.727 | F2 | 0.063 | I1 | 0.054 | 51.700 | 42.300 | 0.946 | 85° C. | B | D |
| Example 3-1 | C2 | 0.636 | F2 | 0.060 | I1 | 0.030 | 51.700 | 42.300 | 0.967 | 80° C. | A | A |
| Example 3-2 | C2 | 0.636 | F2 | 0.060 | I1 | 0.030 | 51.700 | 42.300 | 0.966 | 80° C. | A | B |
| Comparative Example 3-1 | C2 | 0.636 | F2 | 0.060 | I1 | 0.030 | 51.700 | 42.300 | 0.959 | 80° C. | A | A |
| Comparative Example 3-2 | C2 | 0.636 | F2 | 0.060 | I1 | 0.030 | 51.700 | 42.300 | 0.954 | 80° C. | B | C |
| Example 4-1 | C1 | 0.652 | F2 | 0.060 | I1 | 0.030 | 51.700 | 42.300 | 0.969 | 80° C. | A | A |
| Example 4-2 | C1 | 0.652 | F2 | 0.060 | I1 | 0.030 | 51.700 | 42.300 | 0.969 | 80° C. | A | B |

TABLE 1-continued

| | | | | | | | | | | | |
|---|---|---|---|---|---|---|---|---|---|---|---|
| Comparative Example 4-1 | C1 | 0.652 | F2 | 0.060 | I1 | 0.030 | 51.700 | 42.300 | 0.963 | 80° C. | A | A |
| Comparative Example 4-2 | C1 | 0.652 | F2 | 0.060 | I1 | 0.030 | 51.700 | 42.300 | 0.960 | 80° C. | B | C |
| Example 5-1 | C3 | 0.754 | F1 | 0.069 | I1 | 0.055 | 51.700 | 42.300 | 0.958 | 80° C. | A | A |
| Example 5-2 | C3 | 0.754 | F1 | 0.068 | I1 | 0.055 | 51.700 | 42.300 | 0.957 | 80° C. | A | B |
| Comparative Example 5-1 | C3 | 0.754 | F1 | 0.069 | I1 | 0.055 | 51.700 | 42.300 | 0.950 | 80° C. | A | A |
| Comparative Example 5-2 | C3 | 0.753 | F1 | 0.069 | I1 | 0.061 | 51.700 | 42.300 | 0.944 | 80° C. | B | D |
| Example 6-1 | C2 | 0.721 | F1 | 0.061 | I1 | 0.048 | 51.700 | 42.300 | 0.962 | 80° C. | A | A |
| Example 6-2 | C2 | 0.721 | F1 | 0.061 | I1 | 0.048 | 51.700 | 42.300 | 0.961 | 80° C. | A | B |
| Comparative Example 6-1 | C2 | 0.721 | F1 | 0.061 | I1 | 0.048 | 51.700 | 42.300 | 0.955 | 80° C. | A | A |
| Comparative Example 6-2 | C2 | 0.721 | F1 | 0.061 | I1 | 0.048 | 51.700 | 42.300 | 0.950 | 80° C. | A | C |
| Example 7-1 | C1 | 0.668 | F2 | 0.067 | I1 | 0.053 | 51.700 | 42.300 | 0.965 | 80° C. | A | A |
| Example 7-2 | C1 | 0.668 | F2 | 0.067 | I1 | 0.053 | 51.700 | 42.300 | 0.963 | 80° C. | A | B |
| Comparative Example 7-1 | C1 | 0.668 | F2 | 0.067 | I1 | 0.053 | 51.700 | 42.300 | 0.960 | 80° C. | A | A |
| Comparative Example 7-2 | C1 | 0.668 | F2 | 0.067 | I1 | 0.053 | 51.700 | 42.300 | 0.956 | 80° C. | B | D |
| Example 8-1 | C4 | 0.546 | F2 | 0.055 | I1 | 0.044 | 51.700 | 42.300 | 0.960 | 90° C. | A | A |
| Example 8-2 | C4 | 0.546 | F2 | 0.055 | I1 | 0.044 | 51.700 | 42.300 | 0.955 | 90° C. | A | B |
| Comparative Example 8-1 | C4 | 0.546 | F2 | 0.055 | I1 | 0.044 | 51.700 | 42.300 | 0.955 | 90° C. | B | B |
| Comparative Example 8-2 | C4 | 0.546 | F2 | 0.055 | I1 | 0.044 | 51.700 | 42.300 | 0.950 | 90° C. | A | C |
| Example 9-1 | C1 | 0.949 | F1 | 0.064 | I1 | 0.051 | 51.700 | 42.300 | 0.960 | 90° C. | A | A |
| Example 9-2 | C1 | 0.949 | F1 | 0.064 | I1 | 0.051 | 51.700 | 42.300 | 0.957 | 90° C. | A | B |
| Comparative Example 9-1 | C1 | 0.949 | F1 | 0.064 | I1 | 0.051 | 51.700 | 42.300 | 0.952 | 90° C. | A | A |
| Comparative Example 9-2 | C1 | 0.949 | F1 | 0.064 | I1 | 0.051 | 51.700 | 42.300 | 0.946 | 90° C. | A | C |

In Table 1, the structures of the polymer liquid crystal compounds and the like are shown below.

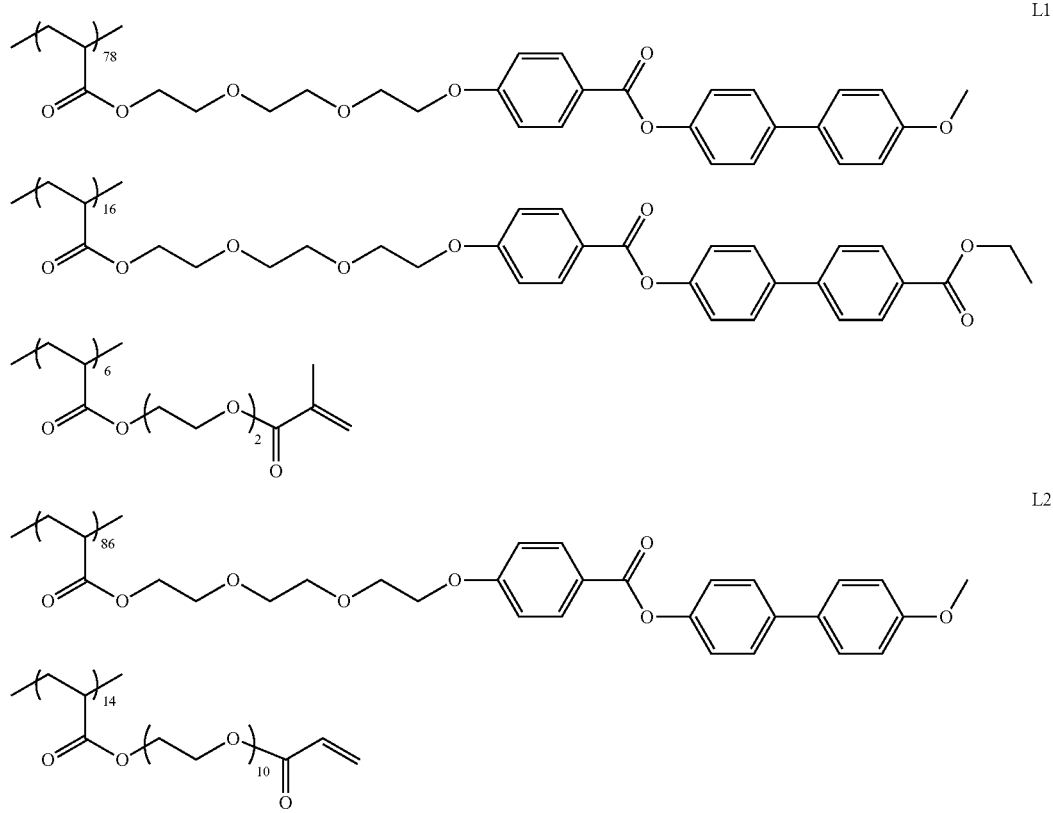

-continued
L3
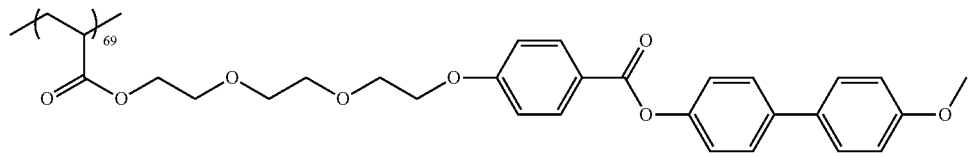
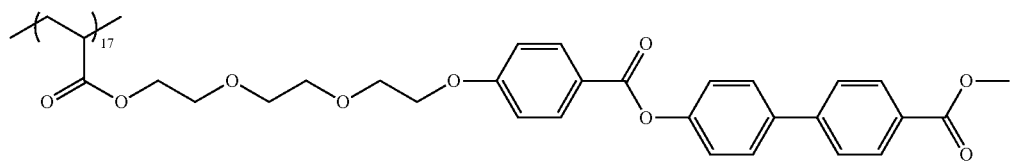
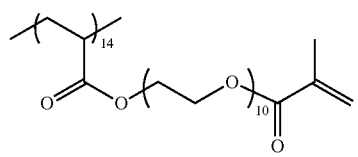
L4
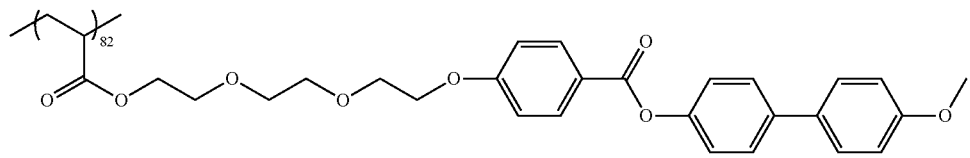
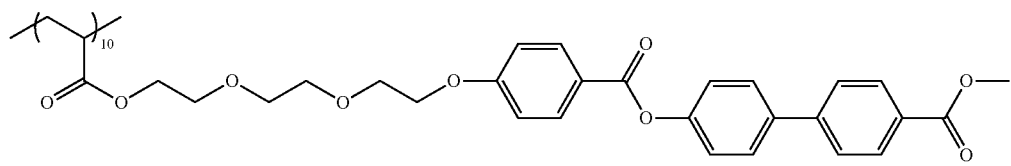
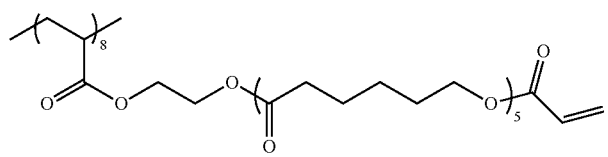
L5
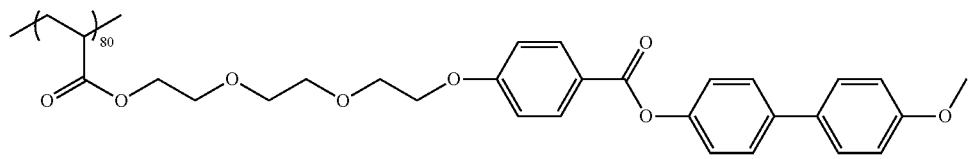
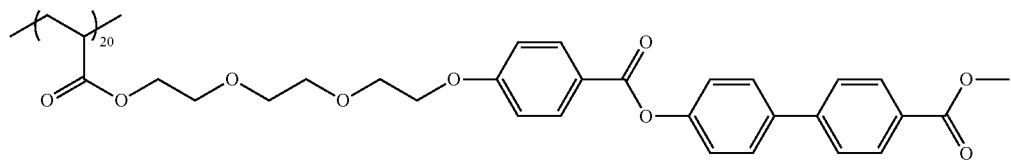
Y1
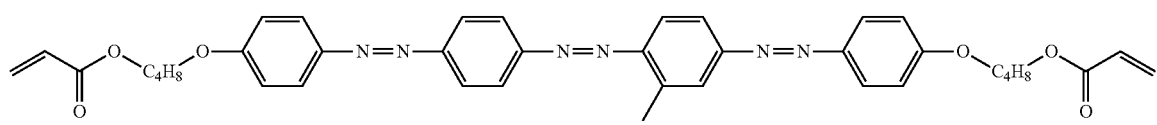
Y2
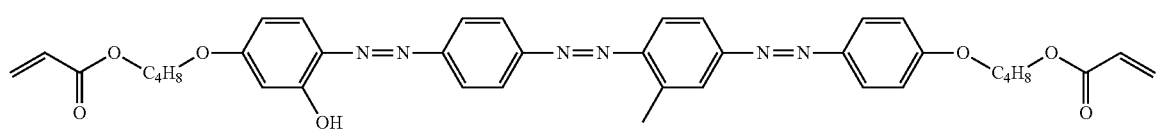

-continued
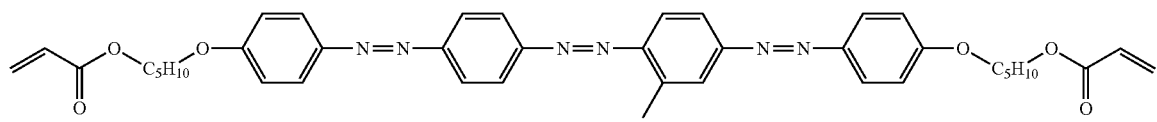
Y3
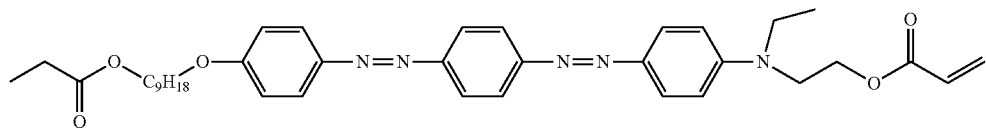
M1
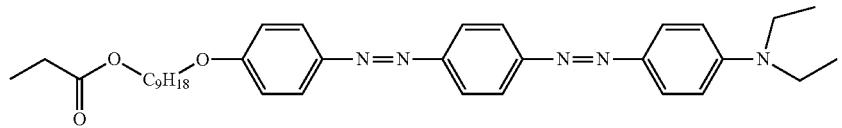
M2
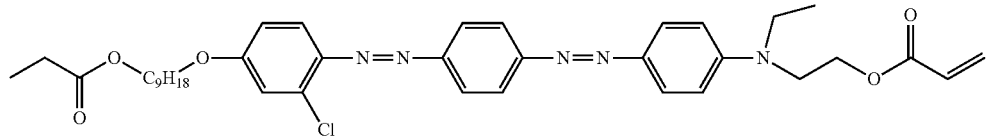
M3
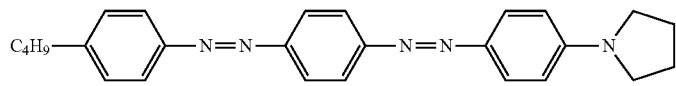
M4
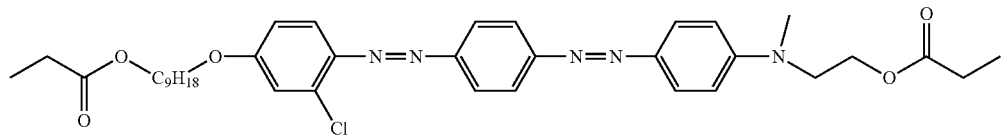
M5
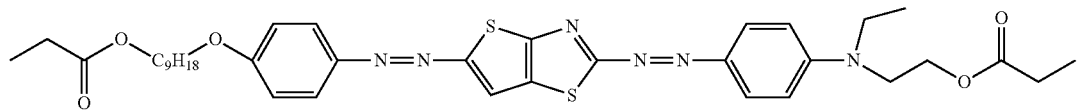
C1
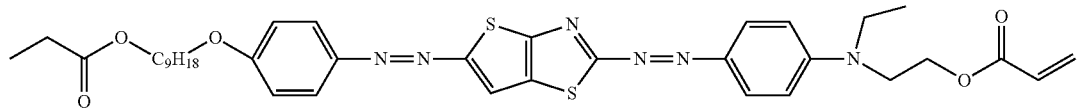
C2
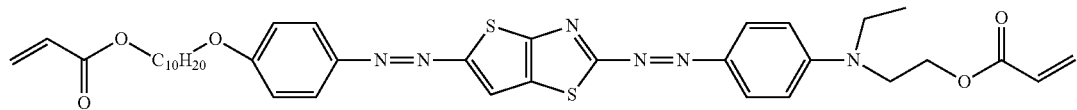
C3
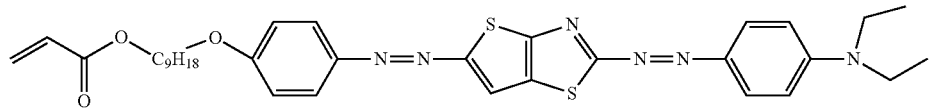
C4
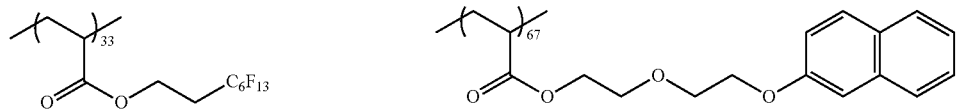
F1
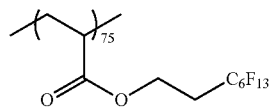
F2

-continued

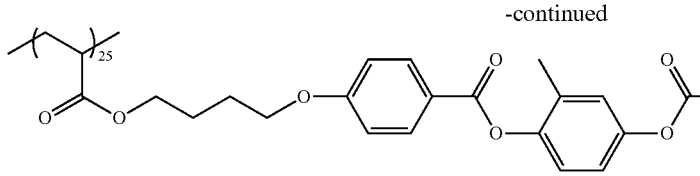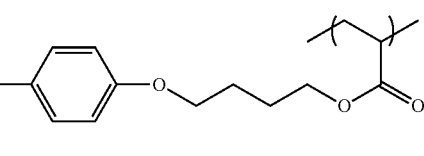

As shown in the results listed in Table 1, it was found that based on the comparison of a case where the content of the component having a number average molecular weight of 1000 or less which is contained in the polymer liquid crystal compound is in a range of 0.10% to 5.0% by mass with a case where the content thereof is out of the range of 0.10% to 5.0% by mass in the system obtained by blending the same kind of polymer liquid crystal compound, the dichroic material, and the like, the degree of alignment and the heat resistance are improved by setting the content of the component having a number average molecular weight of 1000 or less to be in a range of 0.10% to 5.0% by mass.

What is claimed is:
1. A polarizer-forming composition comprising:
a liquid crystal compound; and
a dichroic material,
wherein the liquid crystal compound is a polymer liquid crystal compound,
wherein the polymer liquid crystal compound comprises a component having a number average molecular weight of 1000 or less, and
wherein a content of the component is in a range of 0.10% to 5.0% by mass with respect to a total mass of the polymer liquid crystal compound.
2. The polarizer-forming composition according to claim 1,
wherein the content of the component is in a range of 0.15% to 1.5% by mass with respect to the total mass of the polymer liquid crystal compound.
3. A polarizer which is formed of the polarizer-forming composition according to claim 1.
4. An image display device comprising:
the polarizer according to claim 3.
5. A polarizer which is formed of the polarizer-forming composition according to claim 2.
6. An image display device comprising:
the polarizer according to claim 5.

* * * * *